US008809409B2

(12) United States Patent  
Cooper et al.

(10) Patent No.: US 8,809,409 B2  
(45) Date of Patent: Aug. 19, 2014

(54) MICROPOROUS POLYMERS, METHODS FOR THE PREPARATION THEREOF, AND USES THEREOF

(75) Inventors: Andrew Cooper, Tarporley (GB); Jiaxing Jiang, Liverpool (GB); Neil Campbell, Liverpool (GB); Fabing Su, Liverpool (GB); Abbie Trewin, Runcorn (GB)

(73) Assignee: The University of Liverpool, Liverpool (GB)

( * ) Notice: Subject to any disclaimer, the term of this patent is extended or adjusted under 35 U.S.C. 154(b) by 862 days.

(21) Appl. No.: 12/673,336

(22) PCT Filed: Aug. 15, 2008

(86) PCT No.: PCT/GB2008/050717
§ 371 (c)(1),
(2), (4) Date: Jun. 2, 2010

(87) PCT Pub. No.: WO2009/022187
PCT Pub. Date: Feb. 19, 2009

(65) Prior Publication Data
US 2010/0240781 A1   Sep. 23, 2010

(30) Foreign Application Priority Data
Aug. 15, 2007   (GB) .................................. 0715896.7

(51) Int. Cl.
*C08F 38/00* (2006.01)
*C08G 61/02* (2006.01)
*C08J 9/00* (2006.01)

(52) U.S. Cl.
USPC ......................................... 521/148; 521/152

(58) Field of Classification Search
USPC .................. 521/50, 52, 77, 148, 152; 252/570
See application file for complete search history.

(56) References Cited

U.S. PATENT DOCUMENTS

| 2004/0046155 A1 | 3/2004 | Li et al. |
| 2004/0053033 A1 | 3/2004 | Niu et al. |

(Continued)

FOREIGN PATENT DOCUMENTS

| EP | 1099719 A1 | 5/2001 |
| EP | 1254917 A1 | 11/2002 |

(Continued)

OTHER PUBLICATIONS

"Cationic, Water-Soluble, Fluorene-Containing Poly(arylene ethynylene)s: Effects of Water Solubility on Aggregation, Photoluminescence Efficiency, and Amplified Fluorescence Quenching in Aqueous Solutions," Huang et al., Journal of Polymer Science: Part A: Polymer Chemistry, vol. 44, pp. 5778-5794 (2006).*

(Continued)

*Primary Examiner* — Kara Boyle
(74) *Attorney, Agent, or Firm* — Marshall, Gerstein & Borun LLP

(57) ABSTRACT

A method for preparing a conjugated microporous polymer comprises the coupling of an alkynyl aryl monomer having a plurality of terminal alkyne groups with an iodo-or bromo-aryl monomer having a plurality of halogen atoms in the presence of a palladium (0) catalyst. The conjugated microporous polymer comprises nodes comprising at least one aryl unit and struts comprising at least one alkyne unit and at least one aryl unit, wherein a node is bonded from its aryl unit or units to at least two struts via alkyne units. Such polymers are useful in numerous areas such as separations, controlled release, gas storage and supports for catalysts.

2 Claims, 33 Drawing Sheets

(56) References Cited

U.S. PATENT DOCUMENTS

| | | |
|---|---|---|
| 2005/0025892 A1 | 2/2005 | Satoh et al. |
| 2006/0199928 A1 | 9/2006 | Tang et al. |

FOREIGN PATENT DOCUMENTS

| | | |
|---|---|---|
| JP | 2004169012 A | 6/2004 |
| JP | 2007238866 A | 9/2007 |
| WO | WO-02/08308 A1 | 1/2002 |
| WO | WO-03/057749 A1 | 7/2003 |
| WO | WO-03/060979 A2 | 7/2003 |

OTHER PUBLICATIONS

Hurwitz, "Ethynylated Aromatics as High Temperature Matrix Resins," from SAMPE Journal, Mar./Apr. 1987.*

Hurwitz et al., "Copolymerization of di- and trifunctional arylacetylenes," from Polymer, 1988, vol. 29.*

Budd et al., Polymers of intrinsic microporosity (PIMs): robust, solution-processable, organic nanoporous materials, *Chem. Commun.* (*Camb.*), Jan. 21:230-1 (2004).

Bunz et al., Poly(aryleneethynylene)s: Syntheses, Properties, Structures, and Applications, *Chem. Rev.*, 100:1605-44 (2000).

Cote et al., Porous, crystalline, covalent organic frameworks, *Science*, 310:1166-70 (2005).

Hittinger et al., Synthesis and characterization of cross-linked conjugated polymer milli-, micro-, and nanoparticles, *Angew. Chem. Int. Ed. Engl.*, 43:1808-11 (2004).

International Preliminary Report on Patentability for corresponding International Application No. PCT/GB2008/050717 (dated Feb. 16, 2010).

International Search Report and Written Opinion for corresponding International Application No. PCT/GB2008/050717 (dated Nov. 18, 2008).

Kijima et al., Efficient thermal conversion of polyyne-type conjugated polymers to nano-structured porous carbon materials, *J. Thermal Analysis*, 81:549-54 (2005).

Kobayashi et al., Microporous materials derived from two- and three-dimensional hyperbranched conjugated polymers by thermal elimination of substituents, *J. Mater. Chem.*, 17:4289-96 (2007).

Lee et al., Hydrogen adsorption in macroporous hypercrosslinked polymers, *Chem. Commun.* (*Camb.*), Jul. 5: 2670-2 (2006).

Mendez et al., Hyperbranched Poly(p-phenylene ethynylene)s, *Macromolecular Chem. Phys.*, 208:1625-36 (2007).

Sing, Reporting physisorption data for gas/solid systems with special reference to the determination of surface area and porosity (Recommendations 1984), *Pure Appl. Chem.*, 57:603-19 (1985).

Trumbo et al., Polymerization using palladium (II) salts: Homopolymers and copolymers from phenylethynyl compounds and aromatic bromides, *J. Polymer Sci.*, 24:2311-26 (1986).

United Kingdom search report for corresponding UK patent application no. GB0715896.7 (Feb. 7, 2008).

United Kingdom Search Report for corresponding UK patent application No. GB0715896.7 (Jun. 25, 2008).

* cited by examiner

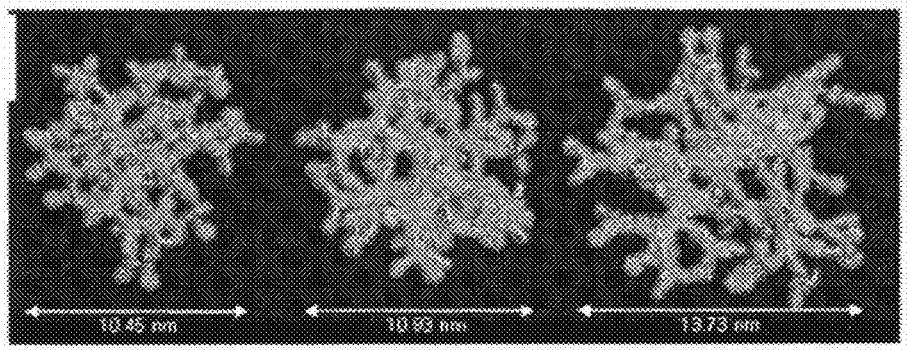
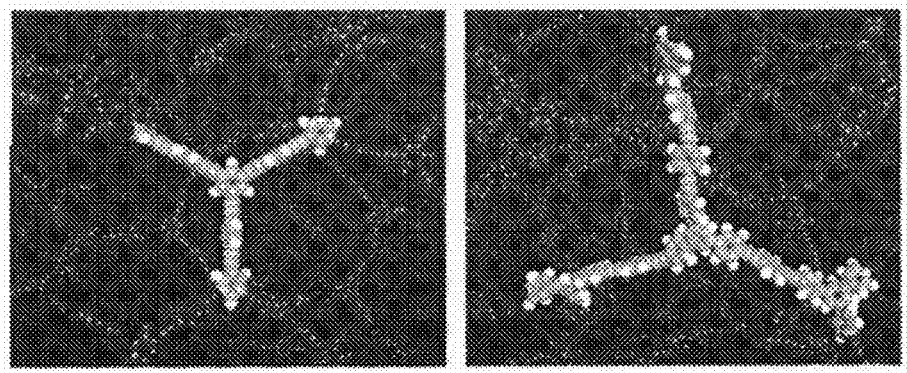
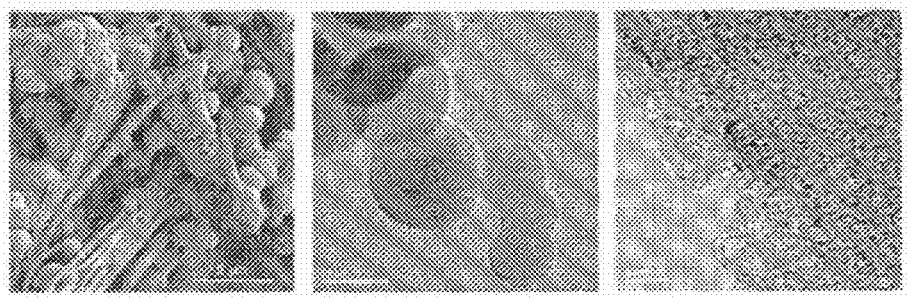

MICROPOROUS POLYMERS, METHODS FOR THE PREPARATION THEREOF, AND USES THEREOF

This invention relates to conjugated microporous polymers.

Microporous organic polymers have high surface areas and as such are useful in numerous areas such as separations, controlled release, gas storage and supports for catalysts.

There are only a handful of ways to synthesize microporous organic polymers.

One method is to form hypercrosslinked polymers (HCPs) (Lee et al. *Chem. Commun.* 2006, 2670) but the degree of direct synthetic control over average pore size is limited and the materials are not conjugated.

A second method is to form "polymers of intrinsic microporosity" (PIMs) (Budd et al. *Chem. Commun.* 2004, 230); these are rigid, contorted polymers which display permanent microporosity. Again, there is no direct synthetic control over pore size and the materials are not conjugated.

A third method is to produce covalent organic frameworks (COFs) (Cote et al. *Science* 2005, 310, 1166) by condensation reactions of 1,4-benzenediboronic acid (BDBA). The materials, however, are also not conjugated and it is difficult to see how they could be made so given the boronate chemistry used. The materials are crystalline (ordered).

A fourth method is to form a conjugated polymer and then to pyrolyze this at high temperatures (M. Kijima et al., *Carbon* 2007 (45), 594-601). This method leads to microporosity and conjugation but does not allow direct synthetic control over pore size.

From a first aspect the present invention provides a method for preparing a conjugated microporous polymer comprising the coupling of:
- an alkynyl aryl monomer having a plurality of terminal alkyne groups, with
- an iodo- or bromo-aryl monomer having a plurality of halogen atoms, in the presence of a palladium (0) catalyst.

The term "conjugated microporous polymer" is in places abbreviated herein to "CMP".

Thus, during the above-mentioned coupling, the bond to the iodo or bromo group in the iodo- or bromo-aryl monomer is replaced by a bond to the terminal alkyne portion of the alkynyl aryl monomer.

Because the alkynyl aryl monomer has a plurality of terminal alkyne groups it is able to react with more than one iodo- or bromo-aryl monomer. Similarly, because the iodo- or bromo-aryl monomer has a plurality of halogen atoms it is able to react with more than one alkynyl aryl monomer. In this way a polymer network comprising aryl units and alkyne units is formed.

Some of the aryl units act as, or form part of, nodes; and the alkyne units act as, or form part of, struts connecting the nodes. Thus the method is highly advantageous in allowing the geometry and structure of the polymer networks to be controlled and tailored according to particular requirements. In particular, variation of the components can be carried out in order to effect different micropore sizes, pore volumes, and surface areas.

The alkyne units result in linear rigid linkages and therefore variation of the length of the struts allows the nodes to be held apart by particular predetermined distances. Nevertheless, the skilled person will understand that, just as in other areas of chemistry, the linearity and rigidity of the linkages are not absolute and deviations from true linearity can and do occur, so that various polymeric forms are possible, including for example sheets, amorphous structures, nets, loops, interpenetrated or "catenated" structures, cylinders and spheres. This variation of polymeric forms is not inconsistent with the reproducible preparation of products with particular properties, which reproducibility is shown below in the examples.

The present inventors have found that the use of a palladium (0) catalyst allows the polymer networks to be formed in high yield and results in polymers having high surface areas. In contrast, as shown below in a comparative example, the use of a palladium (II) catalyst was found to result in a product having higher residual halogen content and lower surface area. Higher residual halogen content is an indication that less coupling has taken place and is disadvantageous in resulting in less predictable geometric structures, greater cost, heavier products and adverse environmental and chemical effects.

A catalytic amount of a co-catalyst, for example copper iodide, may optionally be used to enhance the coupling as known to those skilled in the art.

Iodo-aryl monomers are generally more reactive than bromo-aryl monomers and therefore are preferable. Nevertheless, bromo-aryl monomers function well and are perfectly acceptable for use in the present invention.

The aryl component in either or both of the alkynyl aryl monomer and/or the iodo- or bromo-aryl monomer may be either aromatic or heteroaromatic, and may optionally contain more than one aromatic or heteroaromatic ring. Possible aromatic rings include for example benzene, naphthalene and anthracene. Other possible rings include for example pyridines, carbazol, phenyl groups bearing methyl or other groups, aniline, or rings with pendant amine groups. The present invention is thus compatible with the use of unsubstituted or substituted aromatic or heteroaromatic systems.

The aryl component in either or both of the alkynyl aryl monomer and/or the iodo- or bromo-aryl monomer may optionally carry one or more substituent. Optionally at least one of said substituents may be for example amino, alkyl (e.g. methyl or other $C_{1-5}$ alkyl), haloalkyl (e.g. trifluoromethyl), an azide, fluorine, alkenyl (e.g. $C_{1-5}$ alkenyl), hydroxyl, thiol, ester, amide, urethane, carbonate, acetate, ether, thioether, oligomer, or more complex chemical moiety (e.g., catalyst fragment, amino acid); furthermore said substituents may themselves be further optionally substituted.

The reagents and products may contain aryl units in various configurations and linked to various units. For example, aryl units (e.g. three phenyl rings) be bound to a central nitrogen atom; or porphyrin rings may be present; or aryl units (e.g. four phenyl rings) may be bound to a central silicon atom.

The alkynyl aryl monomer comprises at least one alkyne bond in conjugation with at least one aryl component.

The rigidity of the alkyne bond is in effect extended as required through as many conjugated linkages as are required.

By way of example, a relatively simple conjugated strut may comprise two alkyne bonds and a benzene ring as follows:

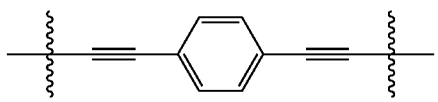 [SMILES: *C#Cc1ccc(C#C*)cc1]

A longer conjugated strut could for example be:—

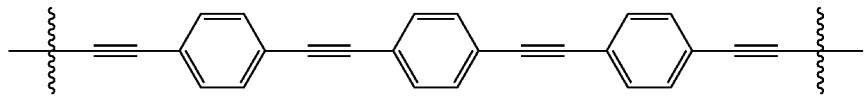

Nevertheless, the alkynyl aryl monomer does not necessarily need to contain exclusively alternating aryl and alkynyl structures. For example the following is an example of a medium-length strut:

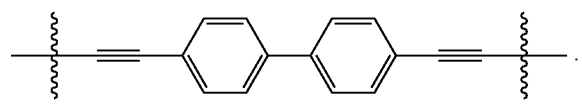

The aryl-containing nodes may be derived either from the alkynyl aryl monomer or from the iodo- or bromo-aryl monomer. Likewise, aryl portions linked to the alkyne bonds in the struts may be derived from either of the starting materials. For example, the combination of monomers in either row of the following table (wherein Hal denotes I or Br):—

| | Alkynyl aryl starting material | Bromo-aryl or iodo-aryl starting material |
|---|---|---|
| Combination 1 | 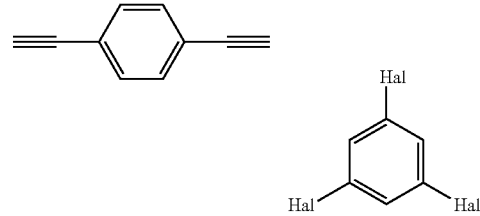 | |
| Combination 2 | | | may be used to make the following network, shown schematically:—

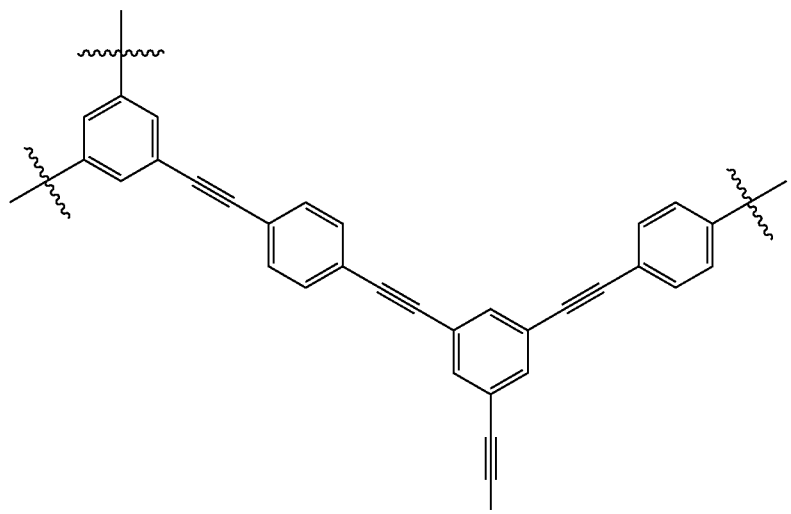

-continued

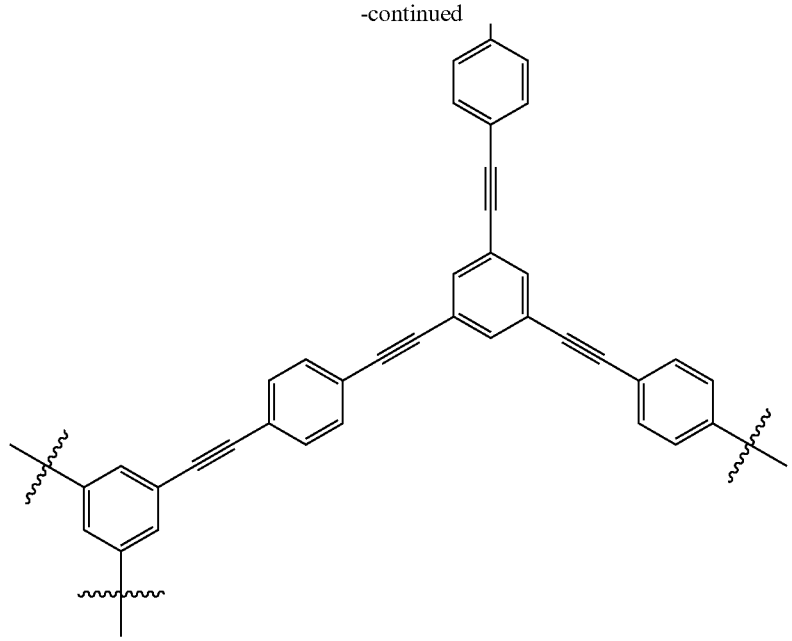

In the above-mentioned example the nodes are benzene rings:—

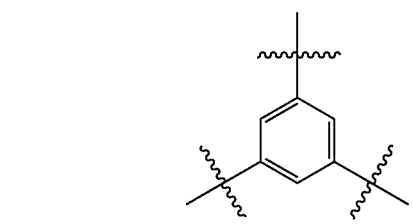 [SMILES: *c1cc(*)cc(*)c1]

whether deriving from

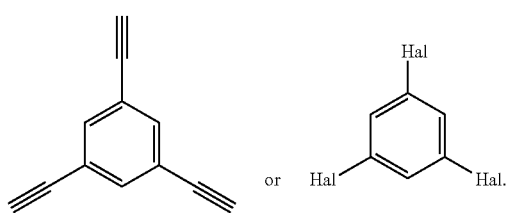

However, the node may comprise more than one aryl ring and/or the points of attachment to the node may be on different rings. Further examples of suitable nodes are:

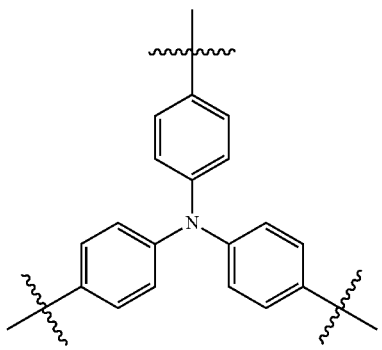

For some applications functionalized polymers are useful. Therefore in one preference at least one of the aryl groups in the alkynyl aryl monomer and the iodo- or bromo-aryl monomer is not unsubstituted benzene. Surprisingly the reaction works well with substituted or functionalized starting materials and this functionality is useful in allowing further reactions and subsequent derivatization to take place.

Preferably either the alkynyl aryl monomer has at least three terminal alkyne groups or the iodo-or bromo aryl monomer has at least three halogen atoms.

More preferably,
either:—
  the alkynyl aryl monomer has three terminal alkyne groups and the iodo- or bromo-aryl monomer has two or three (most preferably two) halogen atoms;
or:—
  the alkynyl aryl monomer has two or three (most preferably two) terminal alkyne groups and the iodo-bromo-aryl monomer has three halogen atoms.

This results in preferred polymers wherein the aryl-containing hubs are trifunctional, i.e. wherein a hub is linked to three struts. This is geometrically favourable and allows the formation of networks with useful pore sizes and specific surface areas.

Preferably the struts are approximately or exactly equally spaced around a hub. Thus for example a hub may be a 1,3,5-substituted benzene ring amongst many other possibilities.

In other examples the hub may have tetra or higher functionality in which case one of the monomers has tetra or higher functionality, i.e. four or more terminal alkyne groups or halogen atoms.

The monomers and their valency may be varied and chosen so that the present invention allows a flexible approach and the tailoring of polymer networks. In a further alternative, both monomers may be trifunctional. In a yet further alternative, more than one type of alkynyl aryl monomer and/or more than one type of halo aryl monomer may be used: for example a copolymer may be made when for example the monomers are an alkynyl aryl monomer, a first halo aryl monomer, and a second halo aryl monomer.

The ratio of functionalities in the reagents (for example the ratio of ethynyl to halogen functionalities) may optionally be 1.5 to 1.

Preferably the struts are symmetrical. The struts preferably contain at least two alkyne units, each of which are bound to the hub via an aryl unit, and between the alkyne units there is at least one aryl unit in the struts.

Optionally the reaction may be carried out in the present of a solvent. Such a solvent should be inert under the conditions used. For example, toluene is suitable whereas alcohols or water are not.

The reaction is carried out in the present of a base. The base may be an organic base such as a tertiary or secondary aliphatic amine for example triethylamine, diethylamine, or diisopropylamine.

The reaction medium may for example comprise both toluene and triethylamine, for example in a ratio of 1:5 to 5:1, for example 1:2 to 2:1, for example approximately 1:1, volume:volume ratio.

In some prior art processes there are alkene or allene linkages either present in the starting materials or produced during reaction to the polymer product. This results in cis/trans isomers and lower predictability in terms of geometric structure. In the present invention, alkyne bonds are present in the starting materials and are conserved in the polymer product. This allows polymers of predictable structure to be formed. In the present invention the majority of the unsaturated linkages in the polymer network are not alkene or allene linkages. Preferably the polymer networks of the present invention are substantially free from alkene or allene linkages.

Alkyne-containing polymers have different properties to alkene- or allene-containing polymer or polymers containing saturated linkages. Chemically, alkyne-containing polymers can be derivatized in useful ways, for example by addition, hydrogenation, "click" reactions with azides, or ligation with various metals or catalyst entities. Electronically, alkyne linkages are useful and advantageous because the resulting products may be photoluminescent or, if suitably doped, electrically conducting. The alkyne-containing polymers of the present invention have particular light emitting properties and are in some cases fluorescent. This is useful because it allows applications, for example, as microporous fluorescent chemical sensors.

The conjugated microporous polymer has conjugated segments in its struts. Optionally, the struts may be conjugated through the majority of their length, optionally substantially all of their length. Optionally, the conjugation may extend through the majority of the node, optionally substantially the entire node. Optionally the entire network may be conjugated. Any suitable palladium (0) catalyst may be used. For example, phosphine palladium (0) catalysts have been found to work well in the present invention. A preferred catalyst is tetrakis-(triphenylphosphine) palladium. Other suitable catalysts include tetrakis(methyldiphenylphosphine)palladium (0), bis(tri-tert-butylphosphine)palladium(0), bis-[1,2-bis (diphenylphosphino)ethane]palladium(0), and other similar catalysts.

The reaction is usually carried out at a temperature somewhere in the region of 0 to 300° C. The upper temperature limit may of course be limited by the reflux point of a solvent in which the reaction may be carried out. Other upper limits may be for example 200° C., 100° C. or 80° C. Other lower limits may be for example 15° C., 20° C., room temperature, 30° C., 40° C. or 50° C. Preferred temperature ranges include 30° C. to 100° C. and 50° C. to 80° C.

The reaction is usually carried out for a duration somewhere in the region of 1 hour to 150 hours. Other upper limits may be for example 120, 100 or 80 hours. Other lower limits may be for example 3, 6, 12, 24, 35, 50 or 60 hours. Preferred reaction times include 50 to 100 hours and 60 to 80 hours.

Preferably the reaction is carried out under inert atmosphere conditions, for example under nitrogen or argon. This is advantageous, inter alia to prevent homocoupling of alkyne monomers.

The reaction conditions may be varied so as to obtain optimal properties such as surface area properties.

Catalytic amounts of palladium (0) catalyst (and CuI if present) are used. Typically, 0.1 to 5 mol %, for example 1 to 5 mol %, have been found effective though other amounts could be used.

The microporous polymers made in accordance with the present invention are organic in the conventional sense that would be understood by the skilled person, and in contrast to inorganic polymers. In other words the element carbon is a key fundamental constituent thereof. The polymers also contain the element hydrogen and furthermore may also optionally comprise other elements, such as for example nitrogen, oxygen and various other elements.

The microporous polymers made in accordance with the present invention optionally have an average pore size of less than 10 nm, typically less than 2 nm.

From a further aspect the present invention provides a conjugated microporous polymer obtainable by a method according to the invention described herein.

From a further aspect the present invention provides a conjugated microporous polymer comprising:—
  nodes comprising at least one aryl unit; and
  struts comprising at least one alkyne unit and at least one aryl unit;
wherein a node is bonded from its aryl unit or units to at least two struts via alkyne units, and wherein the conjugated microporous polymer has a halogen content of not more than 10% by mass.

A low halogen content is advantageous because this minimizes possible adverse environmental effects. It is important that minimal halogen or halogen compounds escape from the products over time. Furthermore, high halogen content results in unnecessarily heavy products (which is particularly undesirable, for example, in gas storage applications where lightweight materials are advantageous) and products which react unpredictably in further derivatization reactions. A key advantage of the present invention is the reliability and adaptability of being able to produce products of particular structure and properties.

Preferably the halogen content is no more than 9%, more preferably no more than 8%, more preferably no more than 7%, preferably no more than 6%, preferably no more than 5% by mass.

Other preferred features of the structure and composition of the conjugated microporous polymer are as discussed herein in relation to the method of preparation.

From a further aspect of the present invention provides a conjugated microporous polymer comprising:—
    nodes comprising at least one aryl unit; and
    struts comprising at least one alkyne units and at least one aryl unit;
wherein a node is bonded from its aryl unit or units to at least two struts via alkyne units, and wherein the conjugated microporous polymer has a BET surface area of at least 400 $m^2/g$.

Thus it is possible, surprisingly, to combine the advantages of conjugation (fluorescence, chemical reactivity, electrical properties) with the properties of high surface areas and microporosity (of importance in, for example, areas such as molecular separations, high gas sorption, and catalytic activities) to produce materials with surprising and unprecedented combined properties.

Preferably the BET surface area is at least 450 $m^2/g$, more preferably the BET surface area is more than 600 $m^2/g$, most preferably the BET surface area is more than 750 $m^2/g$.

Other preferred features of the structure and composition of the conjugated microporous polymer are as discussed herein in relation to the method of preparation.

The present invention will now be described further by way of non-limiting example with reference to the following drawings in which:—

FIG. 3 shows atomistic simulations and electron micrographs of polymers according to the present invention;

FIGS. 1 to 33 and the features therein will now be described in more detail.

Figure 1:
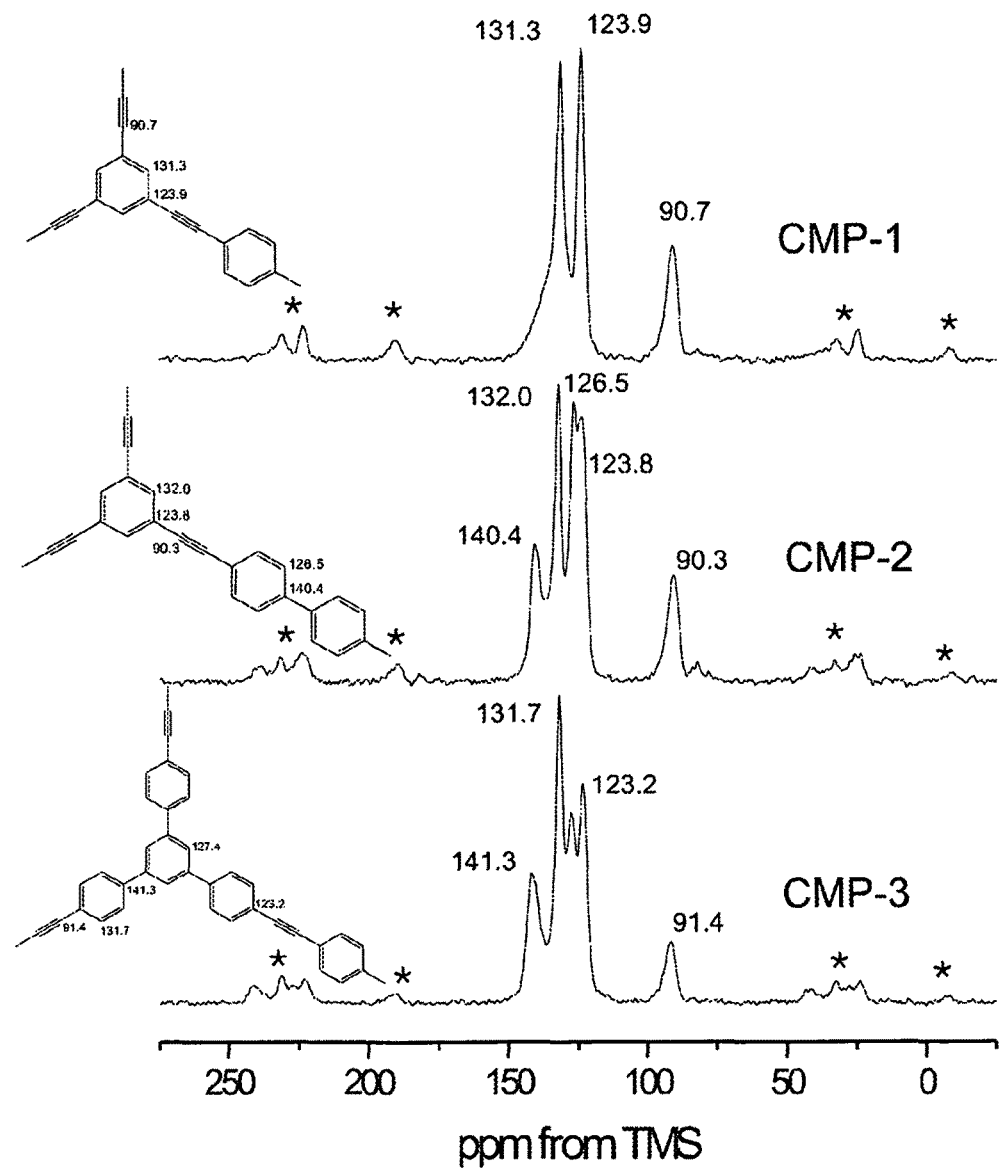
FIG. 1 shows NMR spectra of polymers according to the present invention.

FIG. 1. Solid state NMR for conjugated microporous polyyne networks (CMPs). $^1H$-$^{13}C$ CP/MAS NMR spectra recorded at MAS rate of 10 kHz, asterisks denote spinning sidebands.

Figure 2A:
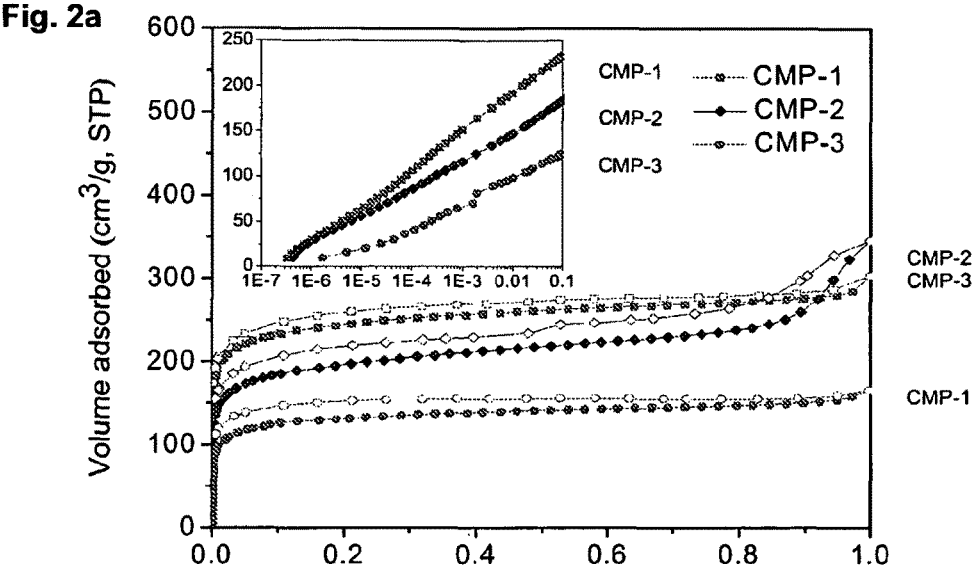
FIG. 2 shows nitrogen sorption analyses for polymers according to the present invention.
Figure 2B:
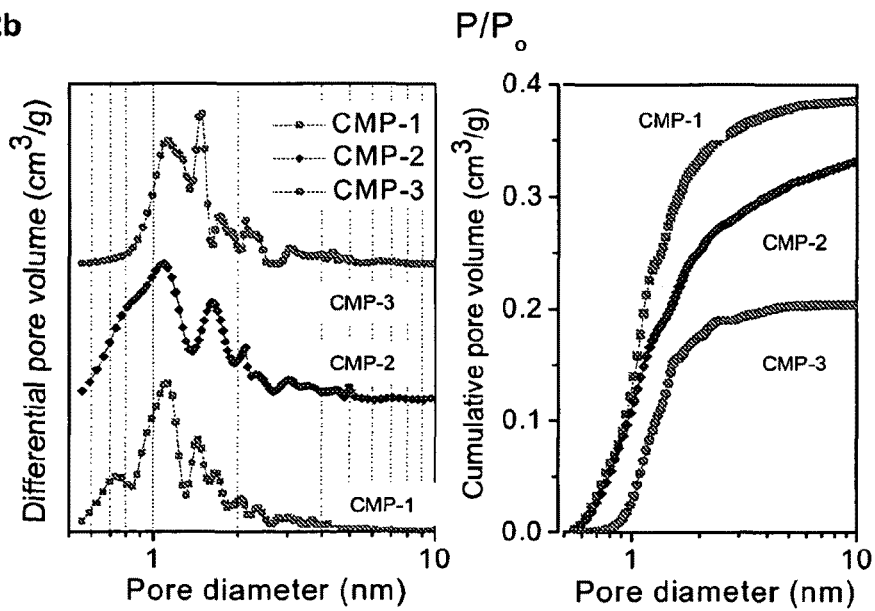

FIG. 2. Nitrogen sorption analysis for microporous polyyne networks. a) $N_2$ adsorption-desorption isotherms measured at 77.3 K (adsorption branch is labeled with filled symbols). The inset shows a semi-logarithmic plot in the pressure range $P/P_0<0.1$. b) Pore size distribution (left) and cumulative pore volume curve (right) calculated by application of non-local density functional theory (NLDFT).

FIG. 3. Atomistic simulations and microscopy for polyyne networks. a) Atomistic simulations of fragments of CMP-1 (left), CMP-2 (centre), and CMP-3 (right). Each model cluster consists of 65 monomer units. A solvent accessible surface is shown, calculated using a solvent diameter of 0.182 nm. The molecular weights of these simulated fragments are 19,843 g/mol (CMP-1), 29,844 g/mol (CMP-2), and 34,320 g/mol (CMP-3). b) Node-strut topology for simulated network fragments for CMP-1 (left) and CMP-3 (right). A 1,3,5-connected benzene node connecting three other nodes via rigid struts is highlighted in each case. c) SEM analysis for CMP-1A (left). High resolution TEM analysis for CMP-1A (middle and right).

Figure 4:
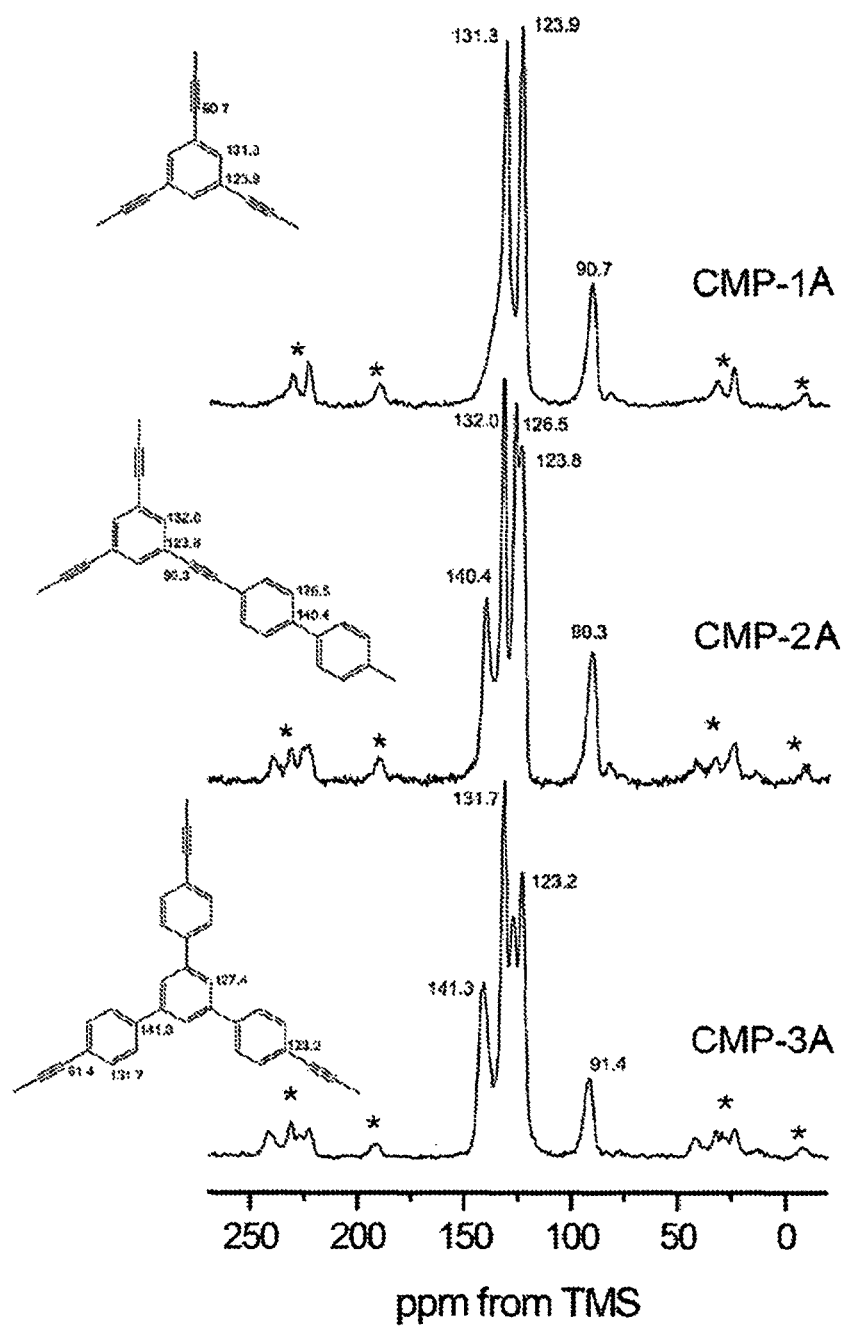
FIG. 4 shows further NMR spectra of polymers according to the present invention.

FIG. 4. Solid state NMR for conjugated microporous polyyne networks CMP1A-3A (repeat syntheses for CMP1-3). $^1H$-$^{13}C$ CP/MAS NMR spectra recorded at MAS rate of 10 kHz, asterisks denote spinning sidebands. These spectra are essentially identical to those obtained for CMP1-3, see FIG. 1.

Figure 5A:
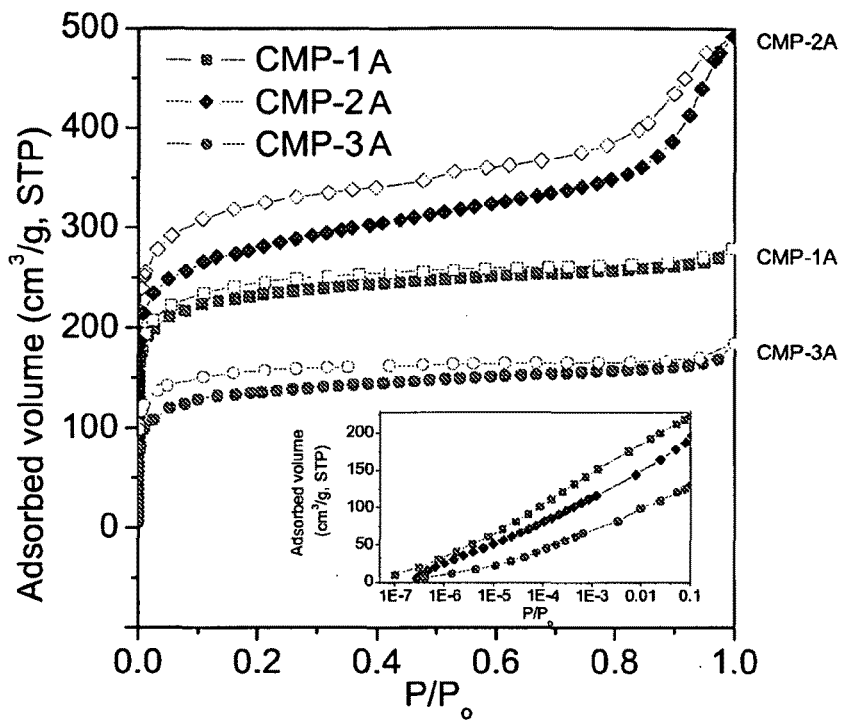
FIG. 5 shows further nitrogen sorption analyses for polymers according to the present invention.
Figure 5B:
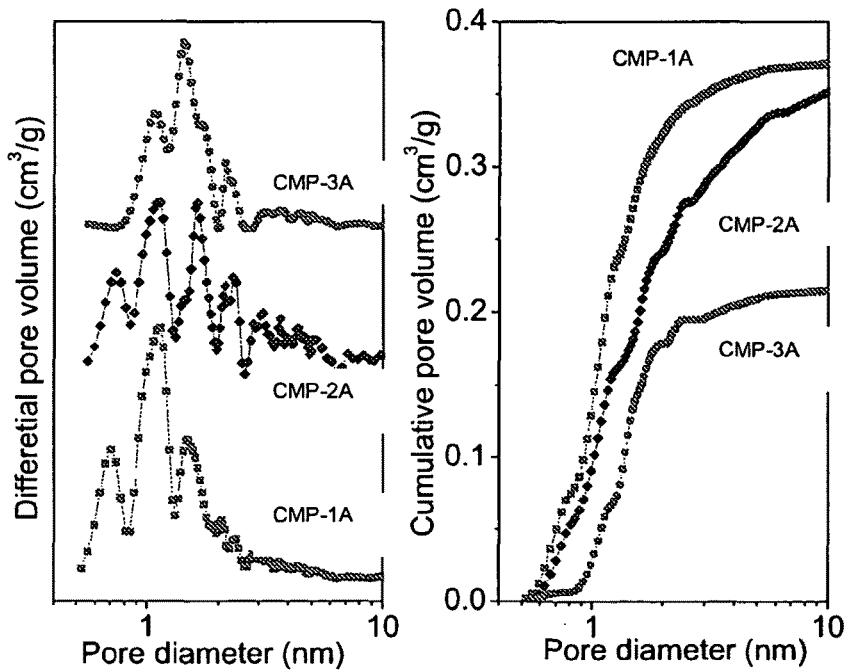

FIG. 5. Nitrogen sorption data for repeat synthesis and analysis for polymer networks CMP1-3. These replicate samples (CMP1A-3A) were produced under near identical conditions to samples CMP1-3. A comparison of FIG. 2 and this figure shows that the synthesis is highly reproducible in terms of the micropore structure that is obtained. a) $N_2$ adsorption-desorption isotherms for networks CMP1A-3A measured at 77.3 K (adsorption branch is labeled with filled symbols). For clarity, the isotherm of CMP-2A was vertically shifted by 70 $cm^3/g$; note that this was not done in FIG. 2. The inset shows a semi-logarithmic plot in the pressure range $P/P_0<0.1$. b) Pore size distribution (left) and cumulative pore volume curve (right) calculated by application of non-local density functional theory (NLDFT).

Figure 6:
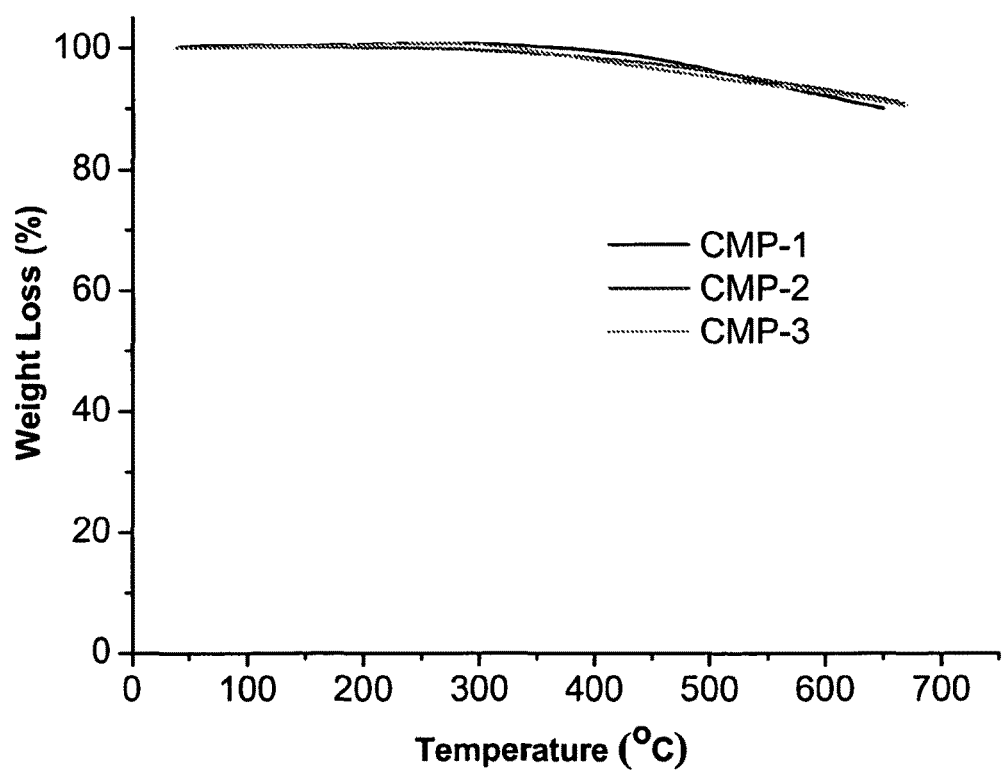
FIG. 6 shows results of thermogravimetric analysis for polymers according to the present invention.

FIG. 6. Thermogravimetric analysis for microporous conjugated polymer networks CMP-1, CMP-2, and CMP-3. The lines are substantially in the same place.

Figure 7:
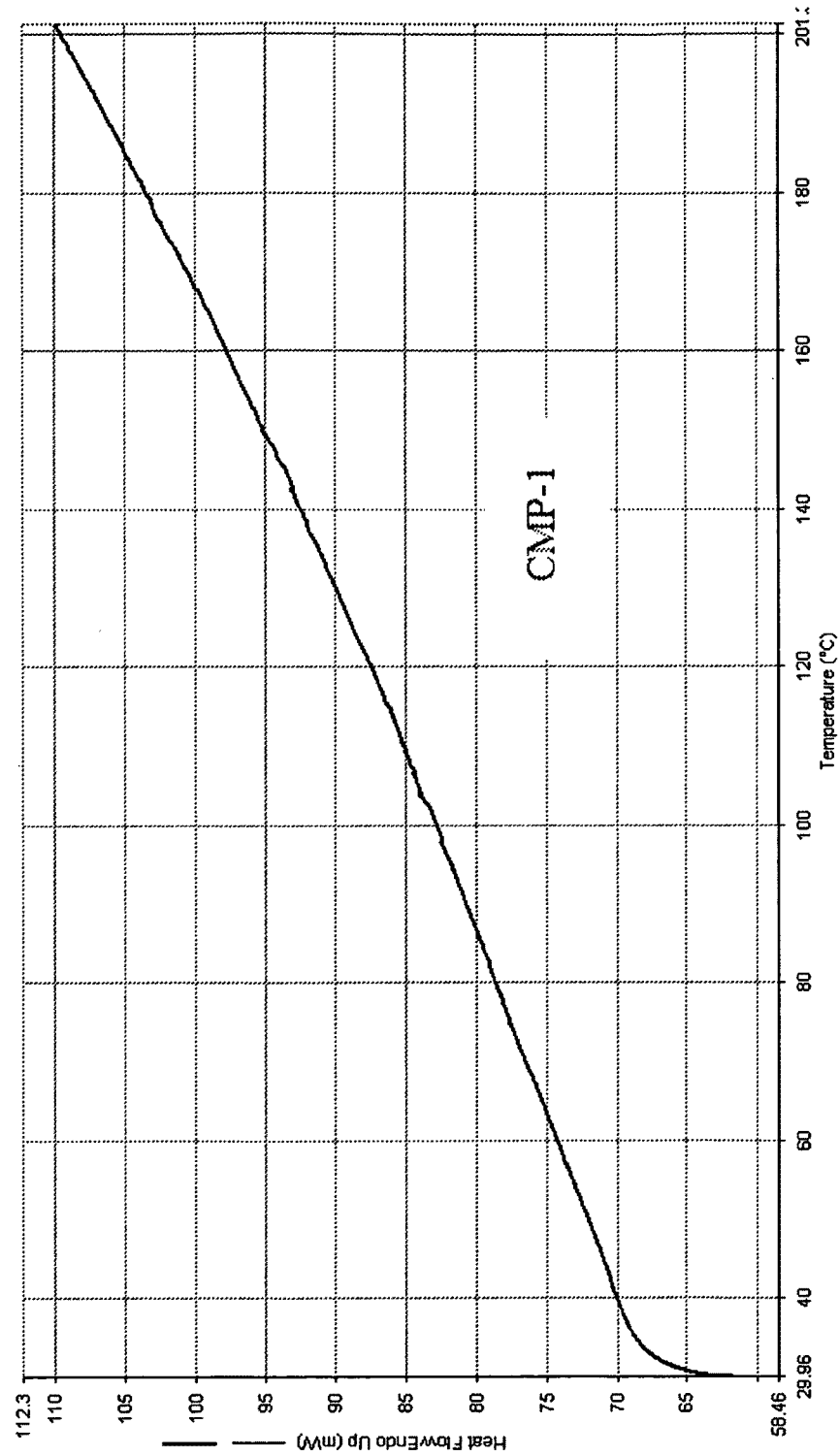
FIG. 7 shows results of DSC (Differential Scanning Calorimetry) measurement for a polymer according to the present invention.

FIG. 7. DSC measurement for network CMP-1 (30-200° C., 5° C./min). There is no evidence of any significant structural change in these networks (for example, alkyne-alkync cross-linking reactions) at least up to 200° C.

Figure 8:
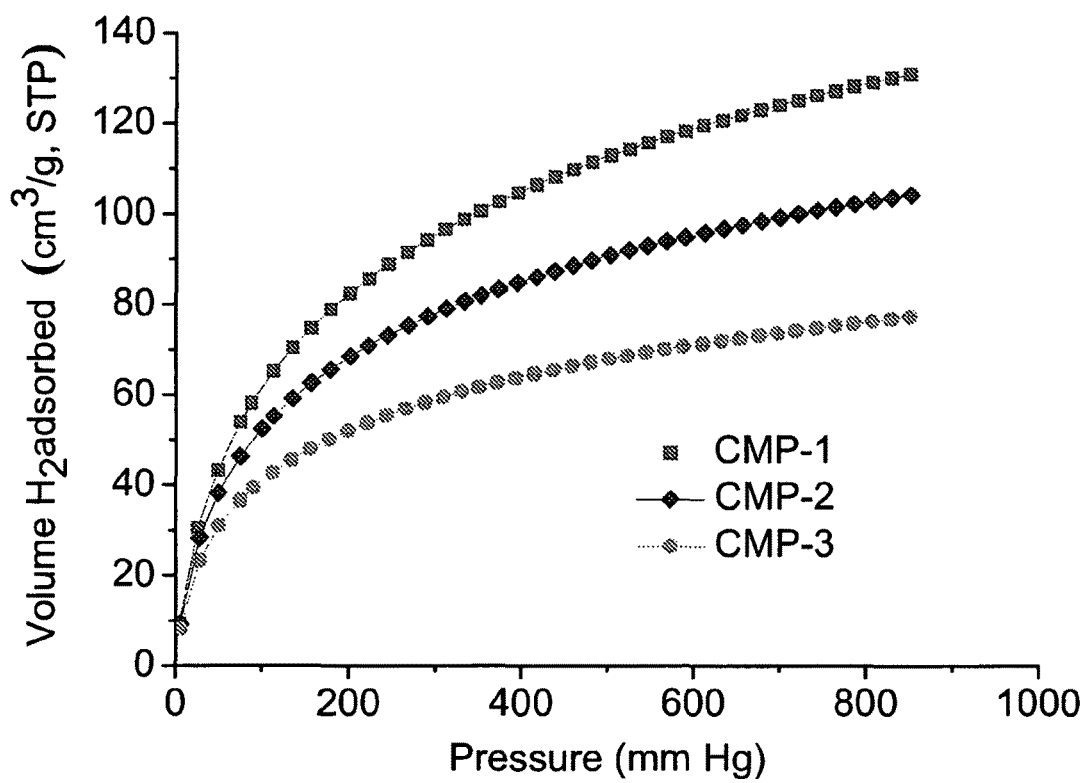
FIGS. 8 and 9 show volumetric $H_2$ sorbtion analyses for polymers according to the present invention.

FIG. 8. Volumetric $H_2$ sorption analysis for microporous conjugated polymer networks CMP-1, CMP2, and CMP-3.

Figure 9:
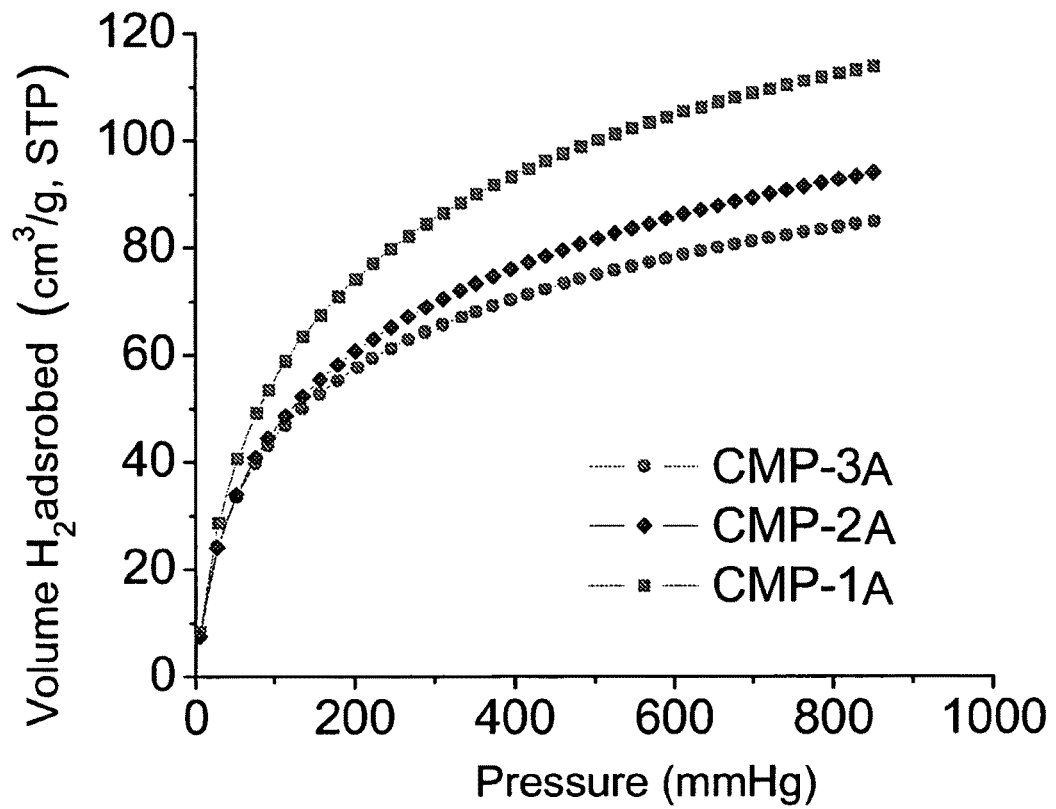

FIG. 9. Volumetric $H_2$ sorption analysis for microporous conjugated polymer networks CMP-1A, CMP2A, and CMP-3A.

Figure 10:
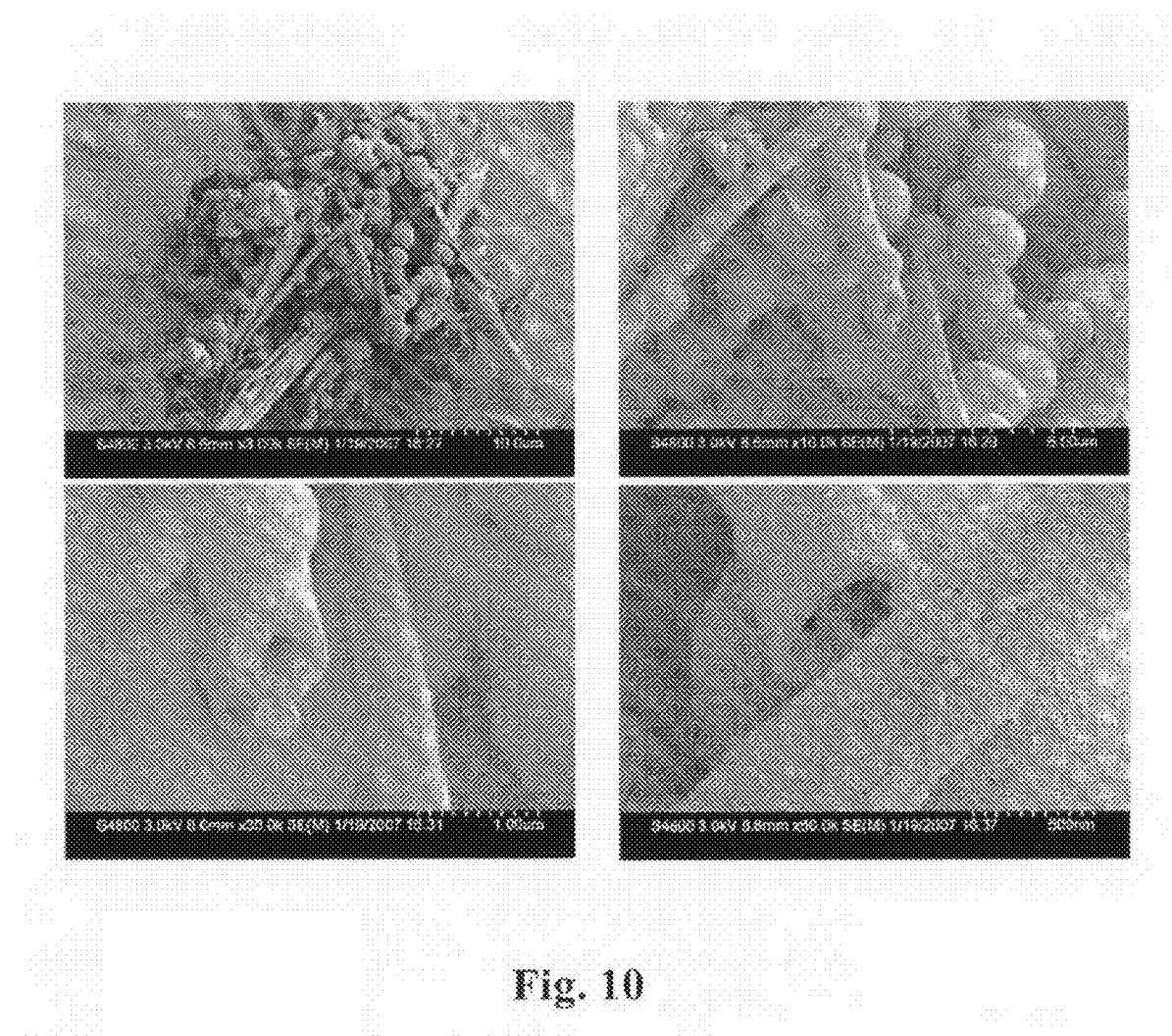
FIGS. 10 to 12 show scanning electron microscope images for microporous conjugated polymer networks according to the present invention.

FIG. 10. Scanning electron microscope images for microporous conjugated polymer network CMP-1A at various magnifications. The sample was sputter-coated with gold before analysis.

Figure 11:
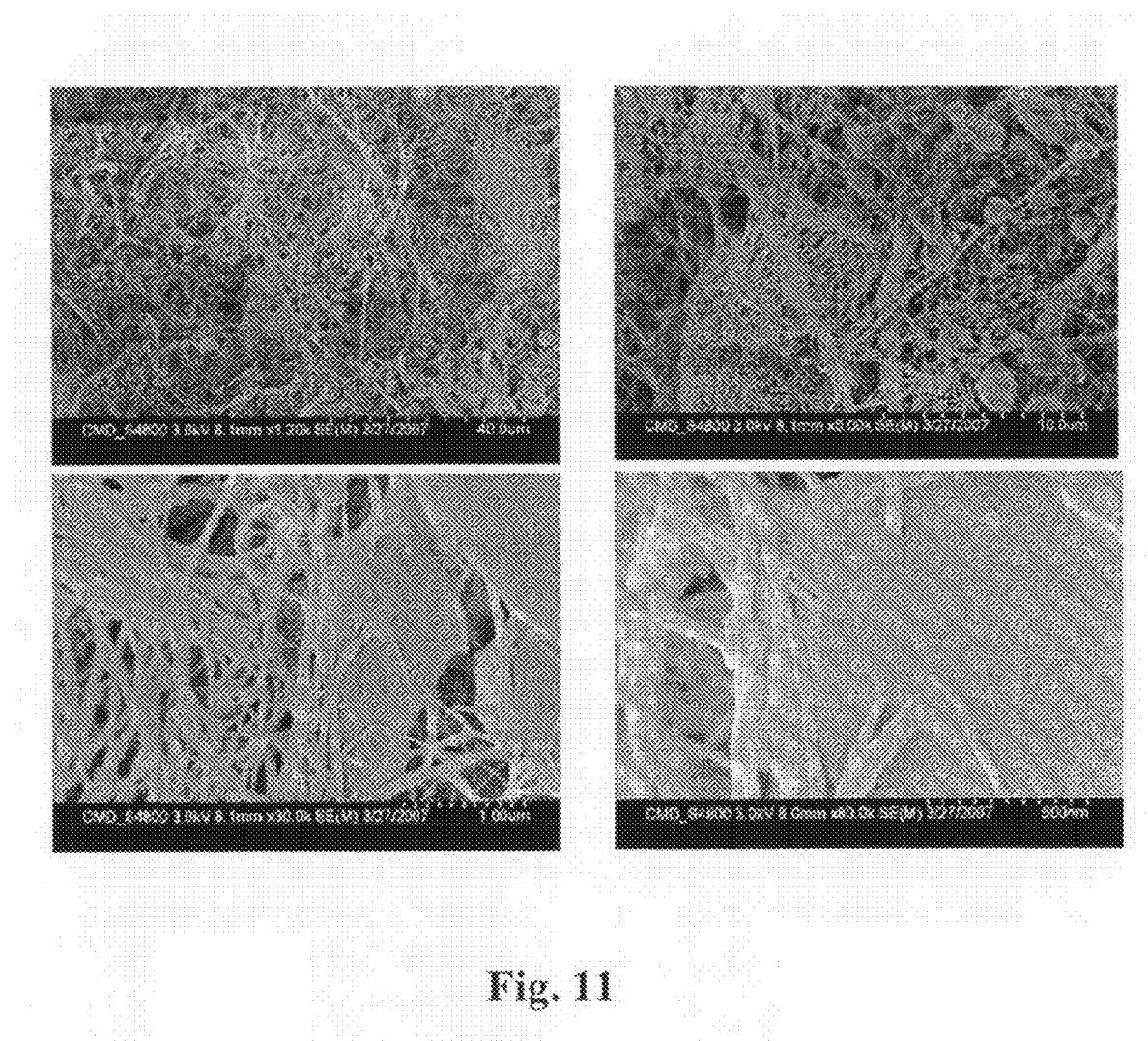

FIG. 11. Scanning electron microscope images for microporous conjugated polymer network CMP-2A at various magnifications. The sample was sputter-coated with gold before analysis.

Figure 12:
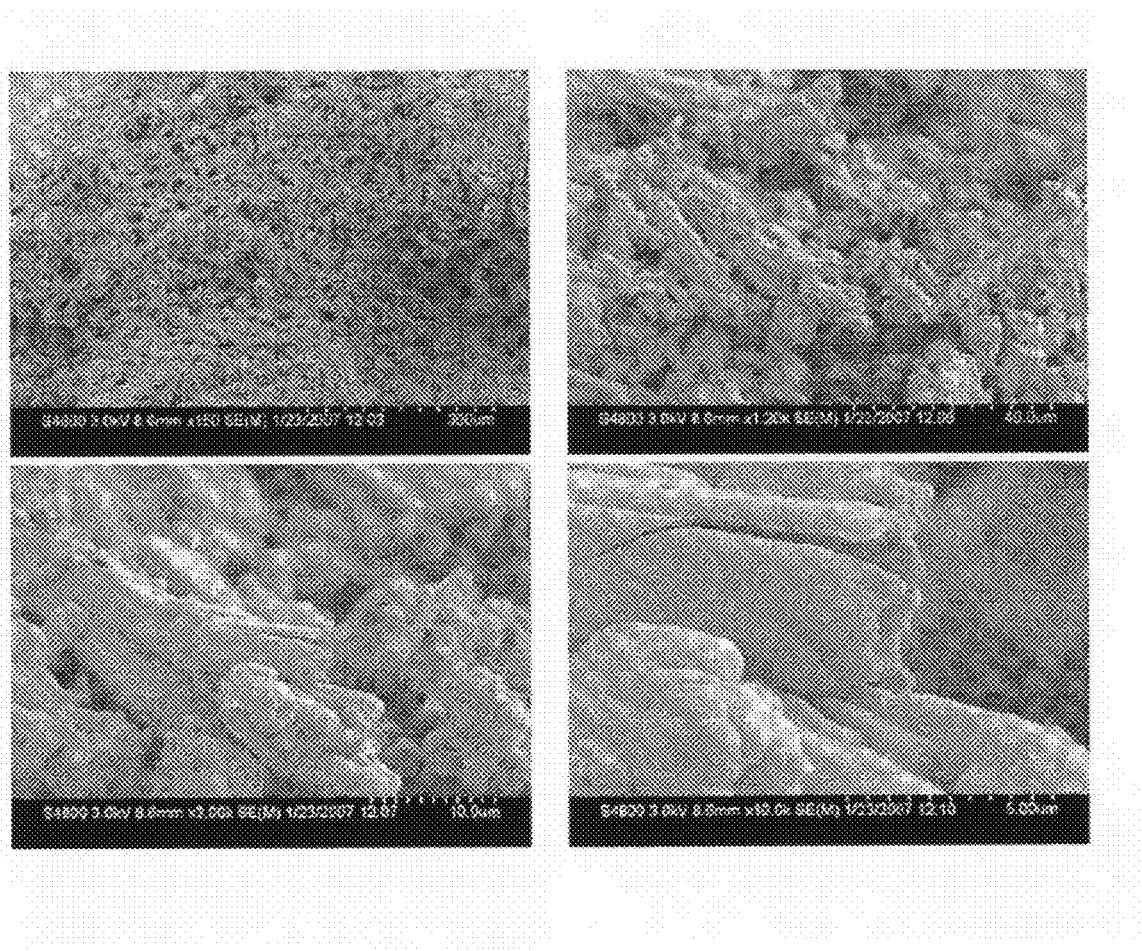

FIG. 12. Scanning electron microscope images for microporous conjugated polymer network CMP-3A at various magnifications. The sample was sputter-coated with gold before analysis.

Figure 13:
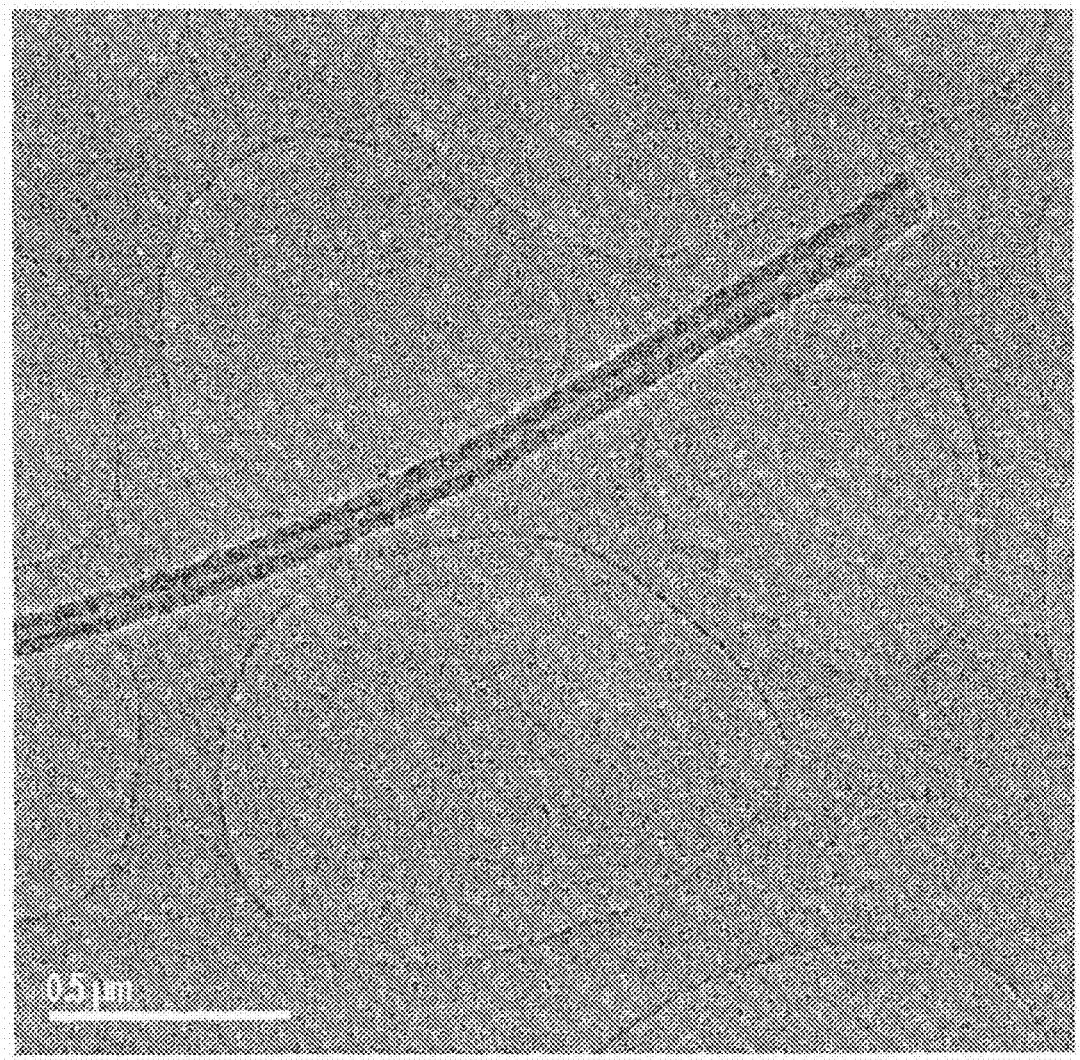
FIGS. 13 to 15 show transmission electron microscope images for microporous conjugated polymer networks according to the present invention.

FIG. 13. TEM image showing a single hollow tubular structure for sample CMP-1A.

Figure 14:
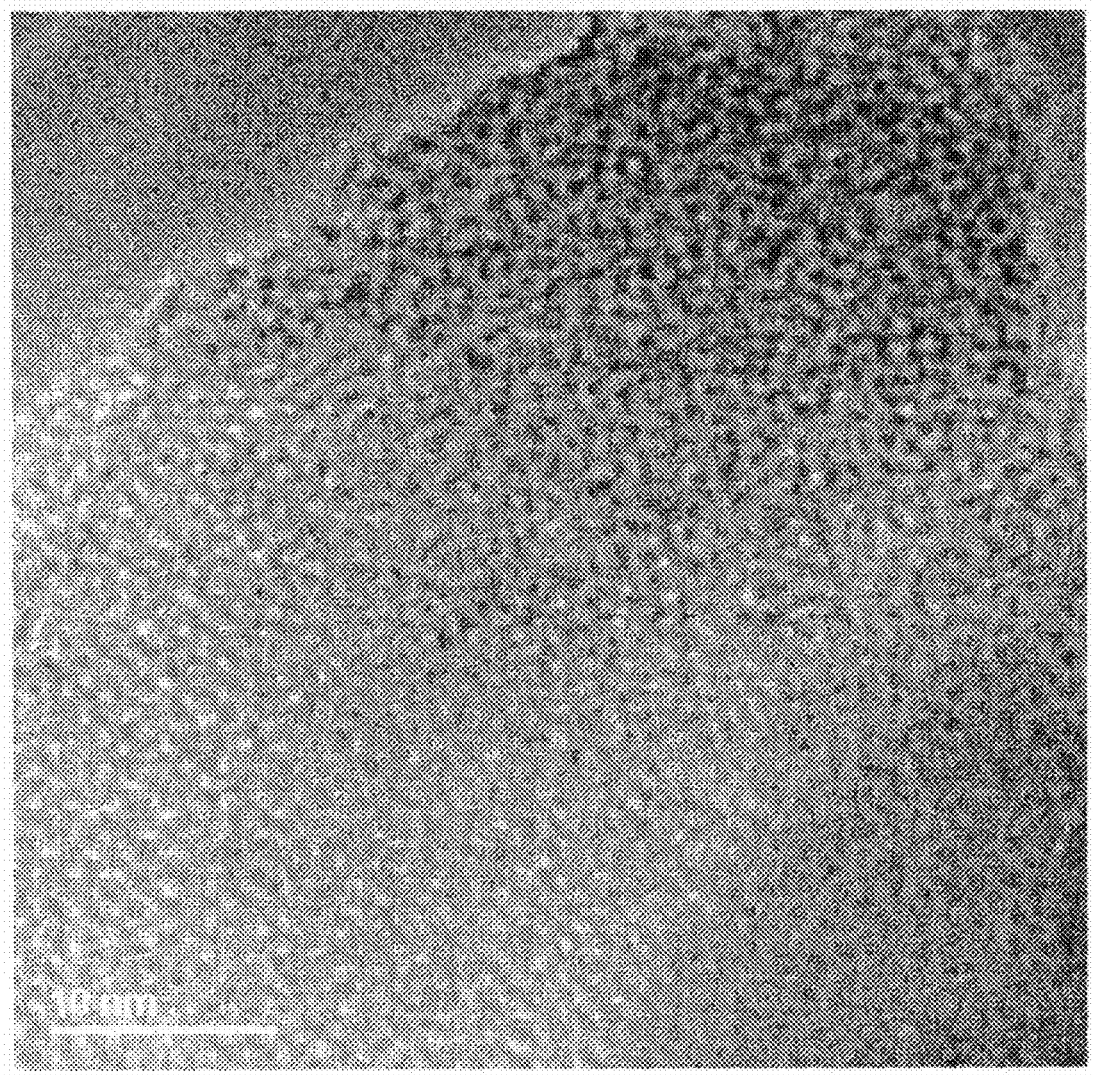

FIG. 14. HR-TEM for sample CMP-3A

Figure 15:
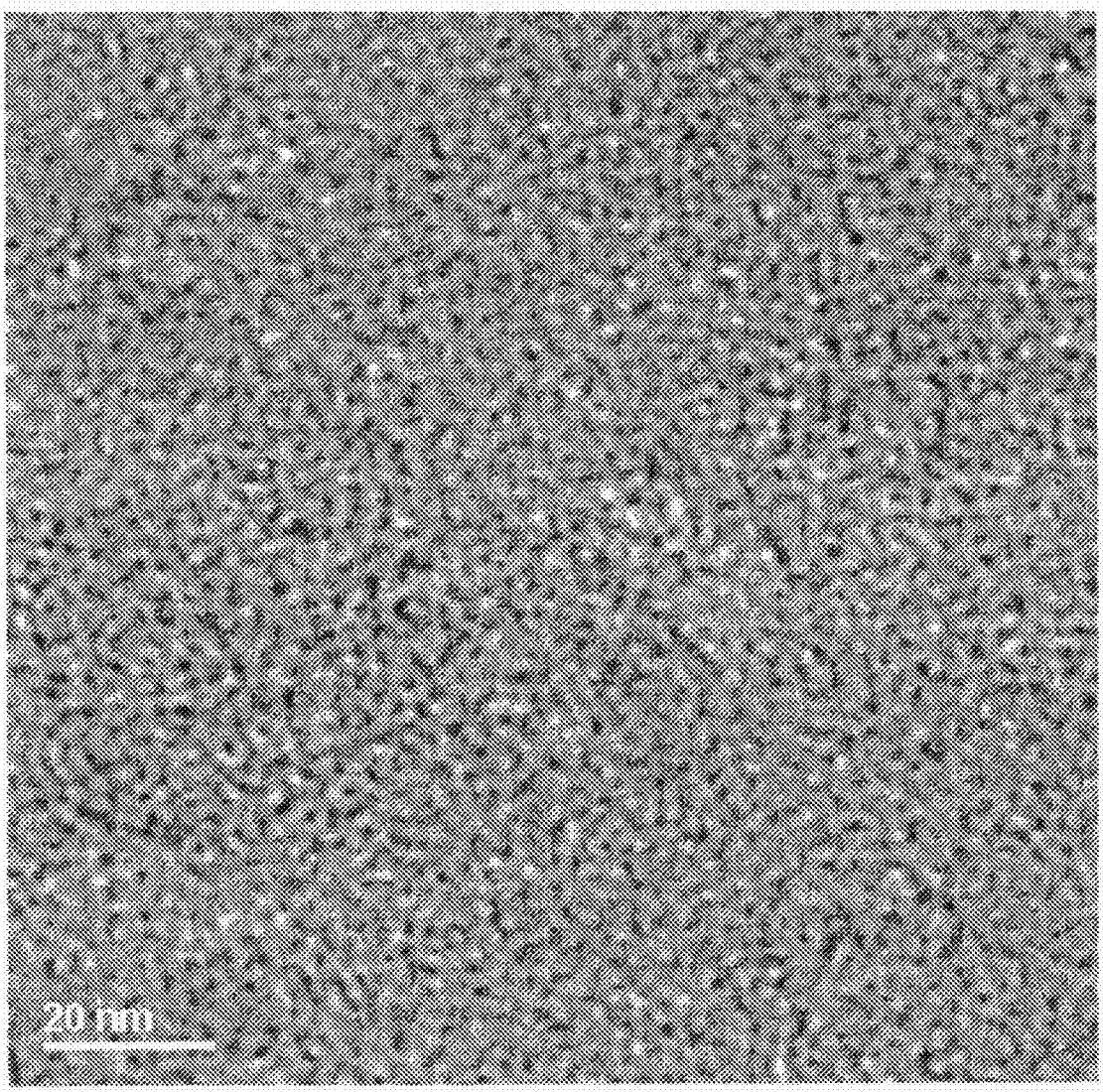

FIG. 15. HR-TEM for sample CMP-3A

Figure 16:
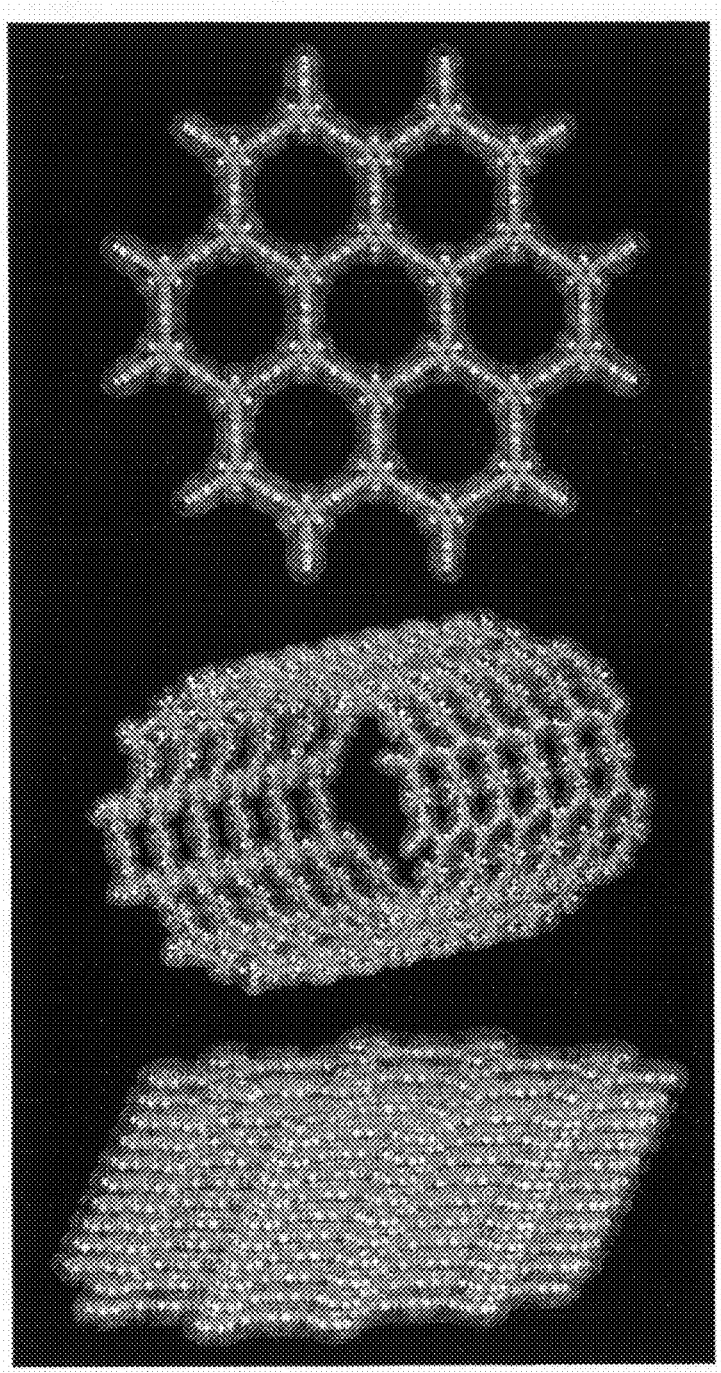
FIG. 16 shows molecular simulations of alternative structures for a polymer network according to the present invention, which structures are more ordered than that shown in FIG. 3.

FIG. 16. Molecular simulations showing alternative, more ordered structures for network CMP-1, Top: planar graphyne-like sheet; Middle: tubular structure; Bottom: stacked spiral layers. A solvent accessible surface is shown for a solvent diameter of 0.182 nm. Terminating halogen atoms are replaced with hydrogen. Each of these models had higher free energy than the disordered network shown in FIG. 3.

Figure 17:
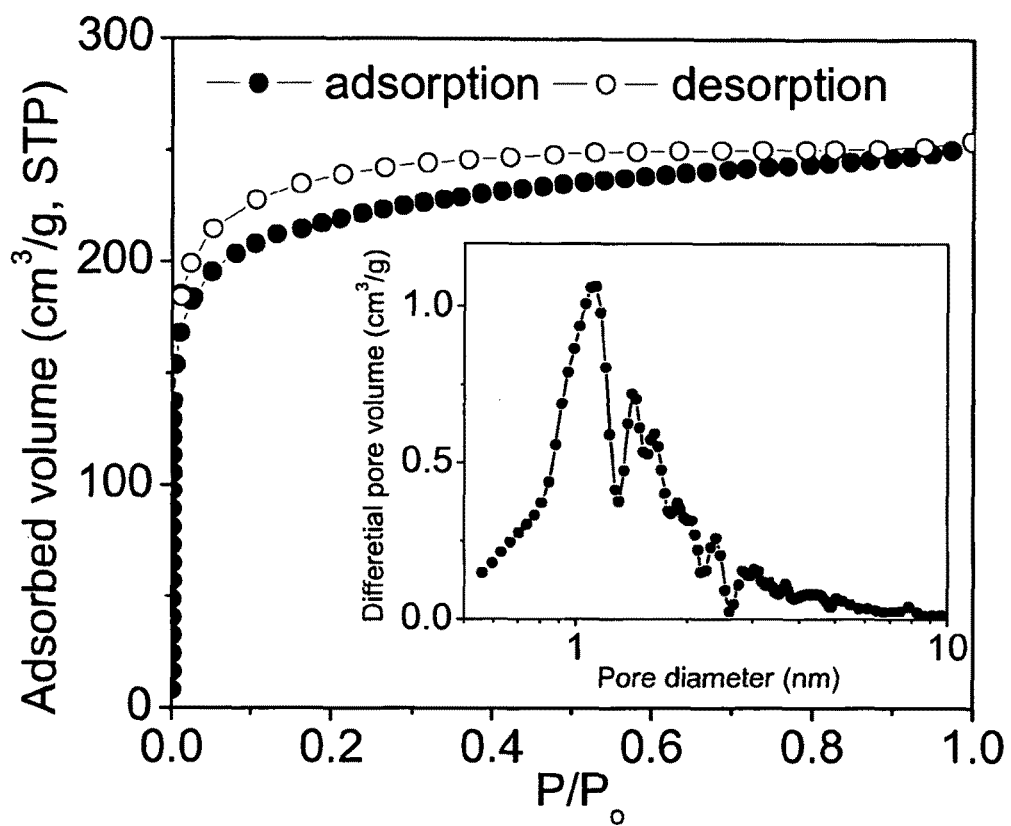
FIG. 17 shows nitrogen sorbtion data for a further polymer according to the present invention.

FIG. 17. Nitrogen sorption data for microporous polyyne network CMP-4. Inset shows micropore size distribution as calculated by NLDFT.

Figure 18:
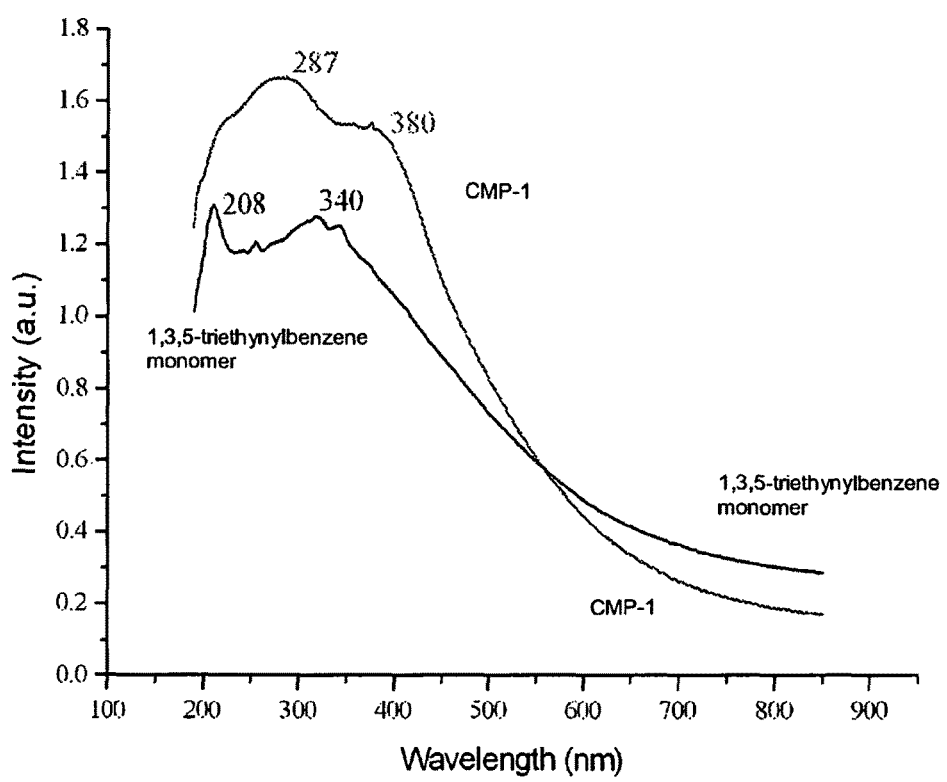
FIG. 18 shows UV-visible absorption spectra for a polymer network according to the present invention and for a monomer used in making this polymer network.

FIG. 18. UV-visible adsorption spectra for polymer network CMP-1 and 1,3,5-triethynylbenzene monomer.

Figure 19:
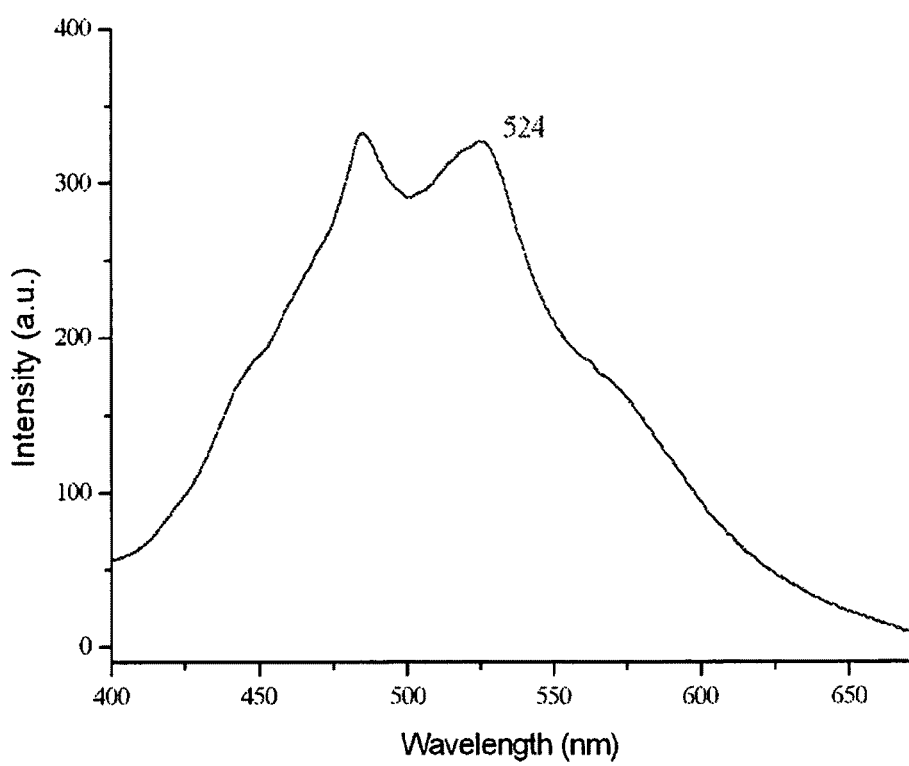
FIG. 19 shows a fluorescence spectrum for a polymer network according to the present invention.

FIG. 19. Fluorescence spectrum for microporous polymer network CMP-1 (excitation wavelength=325 nm).

Figure 20:
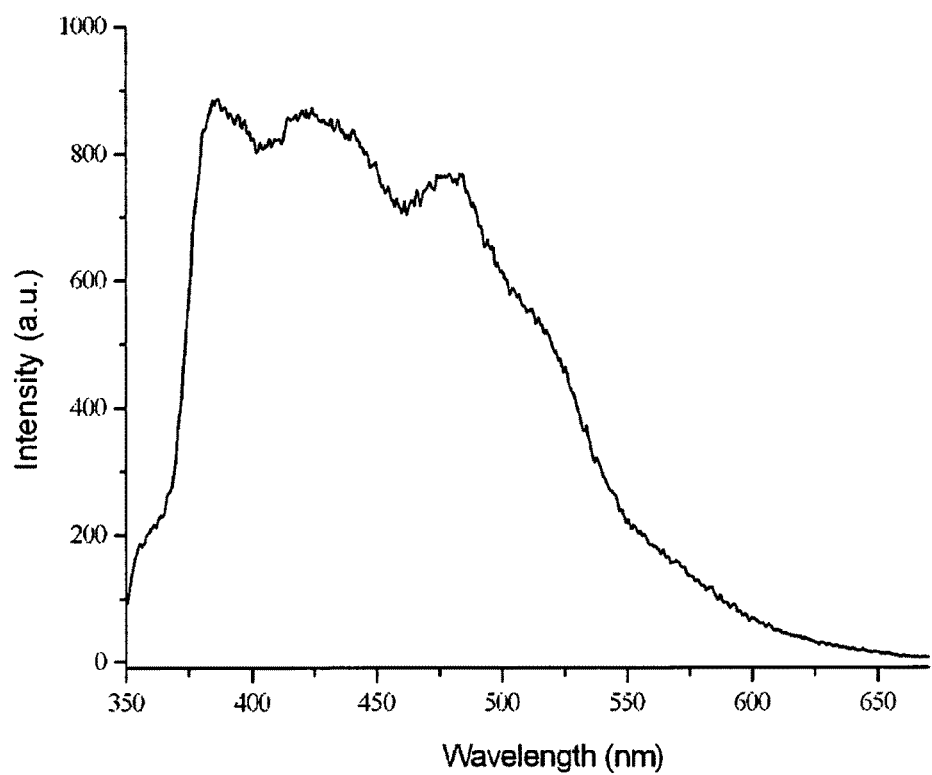
FIG. 20 shows a fluorescence spectrum for a monomer used in making the polymer network to which FIG. 19 relates.

FIG. 20. Fluorescence spectrum for 1,3,5-triethynylbenzene monomer (excitation wavelength=325 nm).

Figure 21:
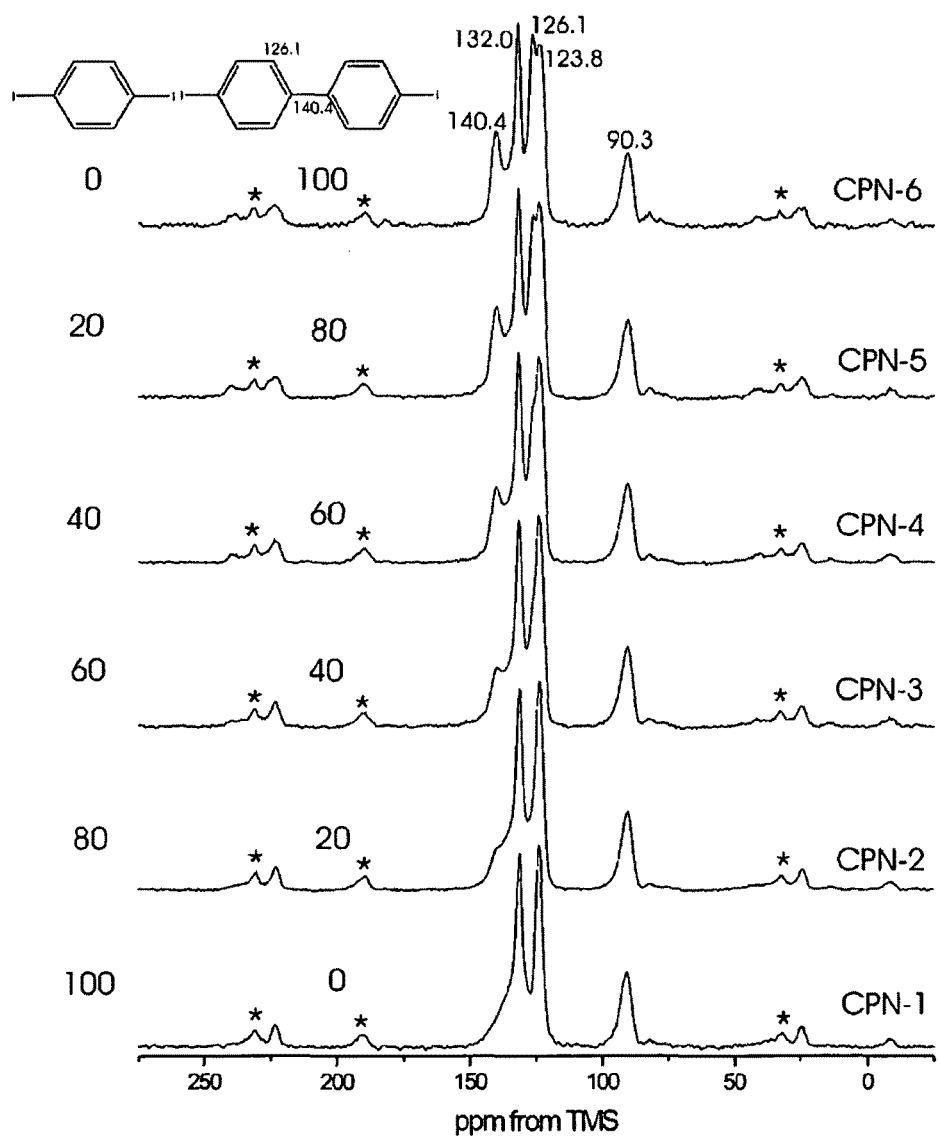
FIGS. 21 to 33 show data for further examples in accordance with the present invention.

FIG. 21. Solid-state $^1H$-$^{13}C$ CP/MAS NMR spectra NMR for conjugated microporous CPN networks recorded at MAS rate of 10 kHz, asterisks denote spinning sidebands.

Figure 22:
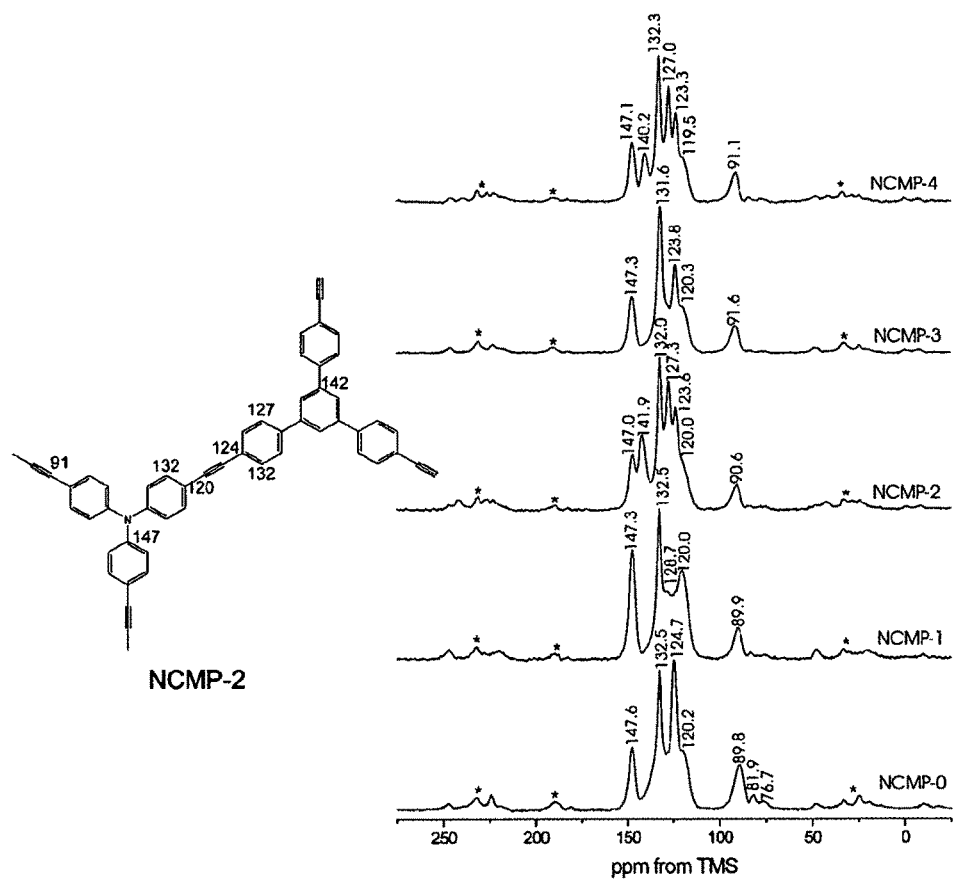

FIG. 22. Solid-state $^1H$-$^{13}C$ CP/MAS NMR spectra of NCMP-0-4 networks recorded at MAS rate of 10 kHz. Asterisks denote spinning sidebands.

Figure 23:
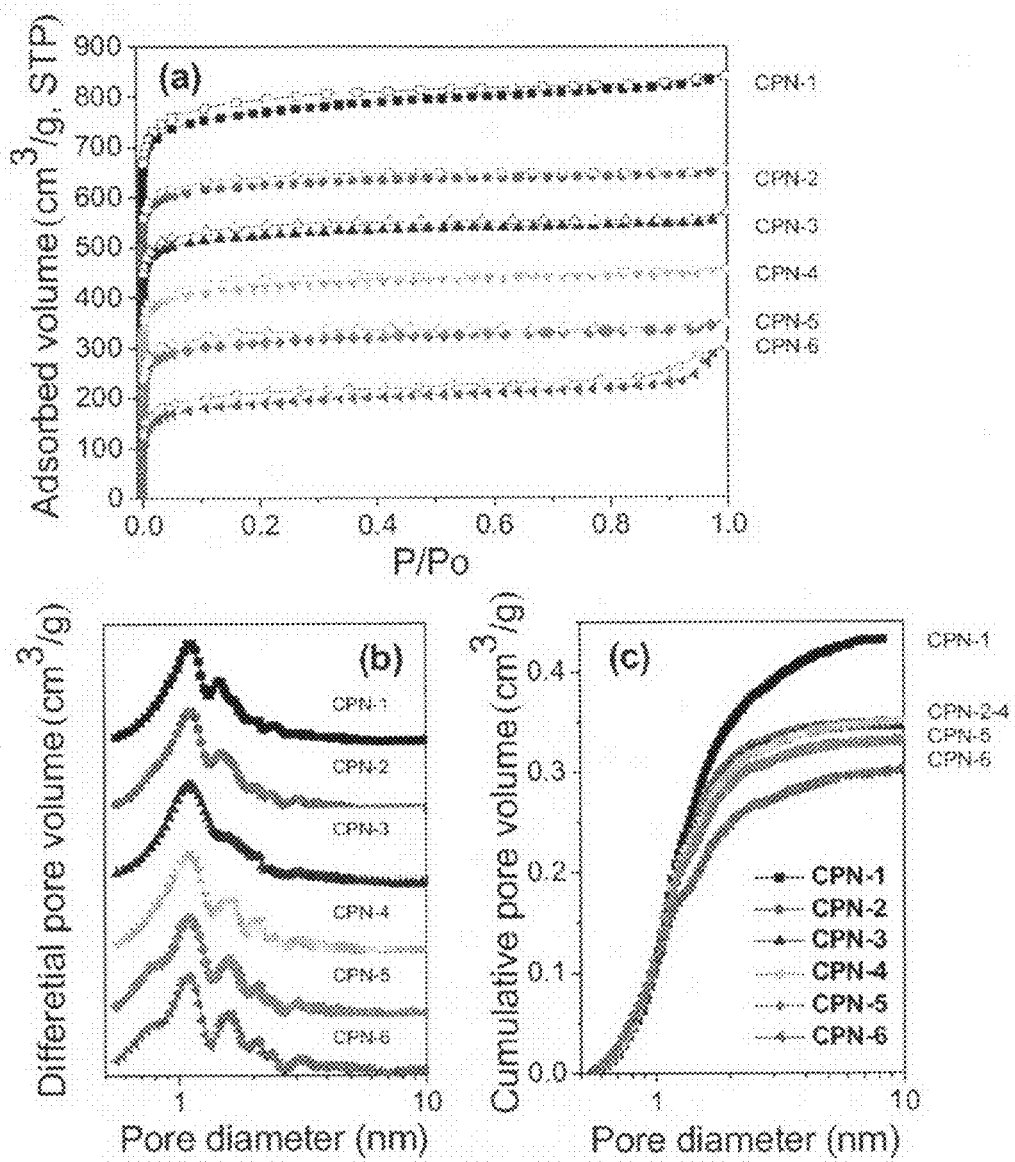

FIG. 23. (a) $N_2$ adsorption-desorption isotherms measured at 77.3 K (adsorption branch is labeled with filled symbols and desorption is labelled with empty) for CPN-1 to CPN-6. For clarity, the isotherms of CPN-1, CPN-2, CPN-3, CPN-4, and CPN-5 were shifted vertically by 500, 400, 300, 200, and 100 $cm^3$/g, respectively. (b) Pore size distribution curves. (c) NL-DFT cumulative pore volume curve.

Figure 24:
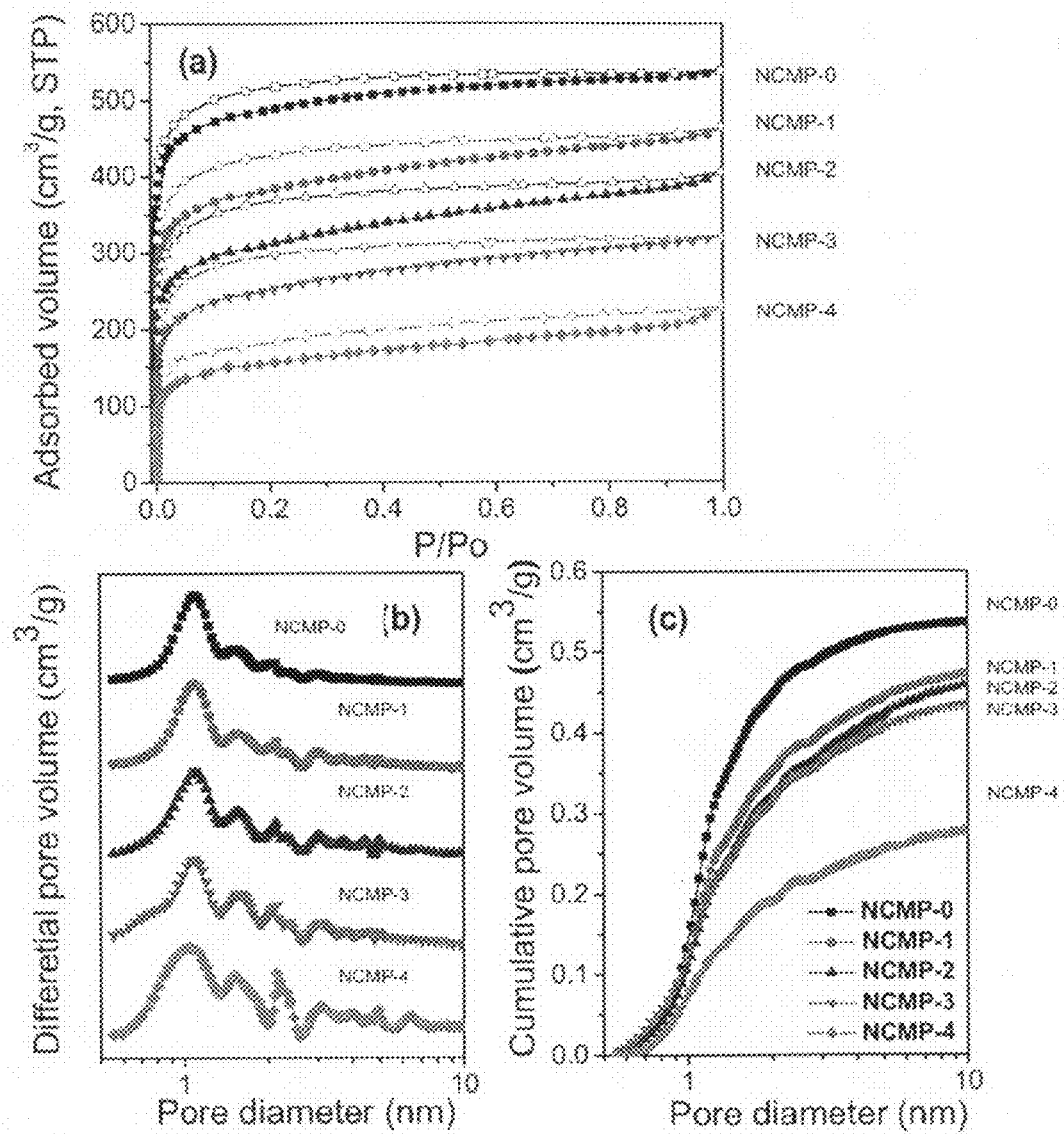

FIG. 24. (a) $N_2$ adsorption-desorption isotherms measured at 77.3 K (adsorption branch is labeled with filled symbols) for NCMP-0 to NCMP-4. For clarity, the isotherms of NCMP-0, NCMP-1, and NCMP-2 were shifted vertically by 150, 100 and 50 $cm^3$/g, respectively. (b) NL-DFT pore size distribution curves. (c) Cumulative pore volume curve calculated by application of NL-DFT.

Figure 25:
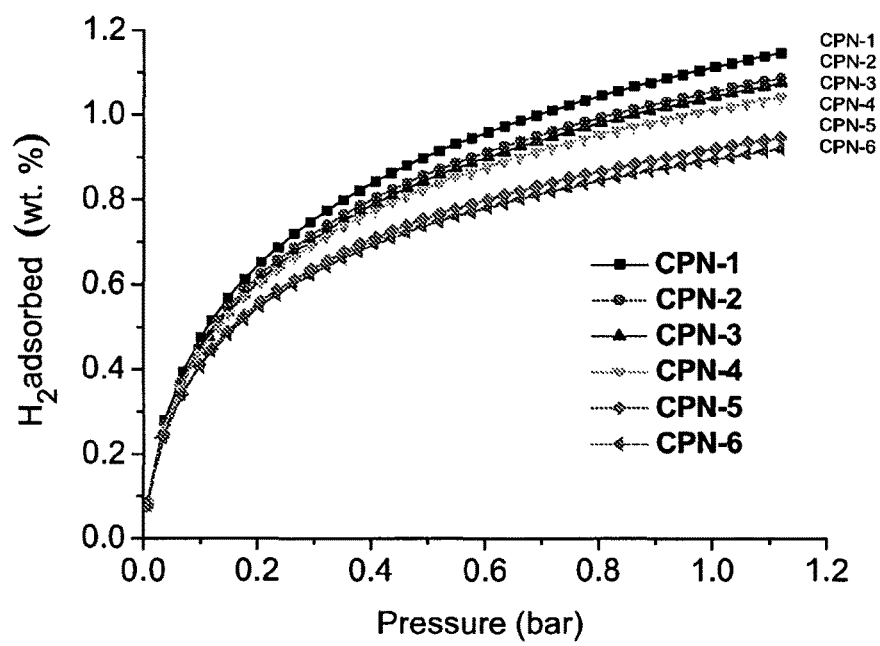

FIG. 25. Volumetric $H_2$ adsorption for polymer networks CPN-1-6 at 77.3 K.

Figure 26:
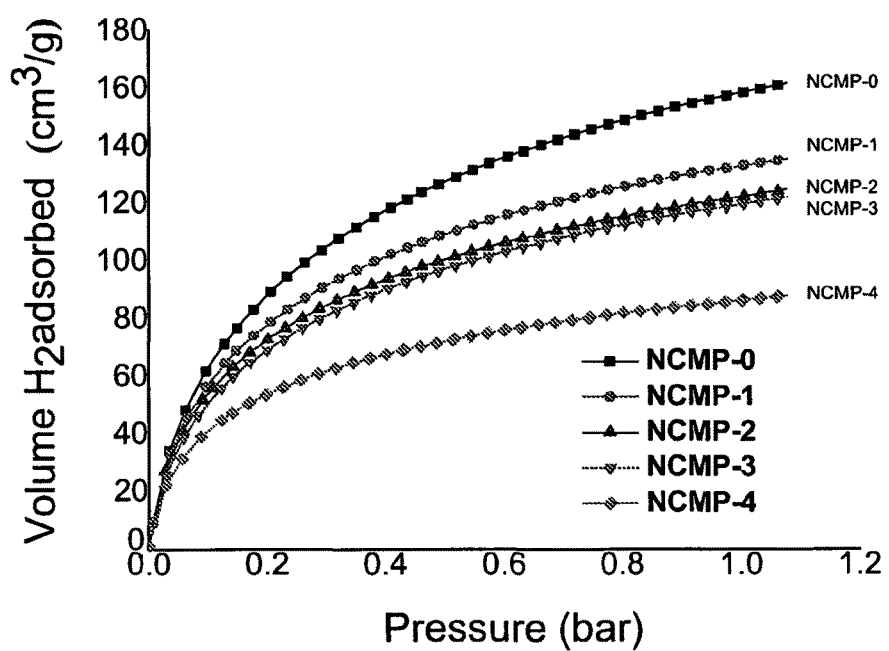

FIG. 26. Volumetric $H_2$ adsorption isotherms for NCMP-0-4 at 77.3 K.

Figure 27:
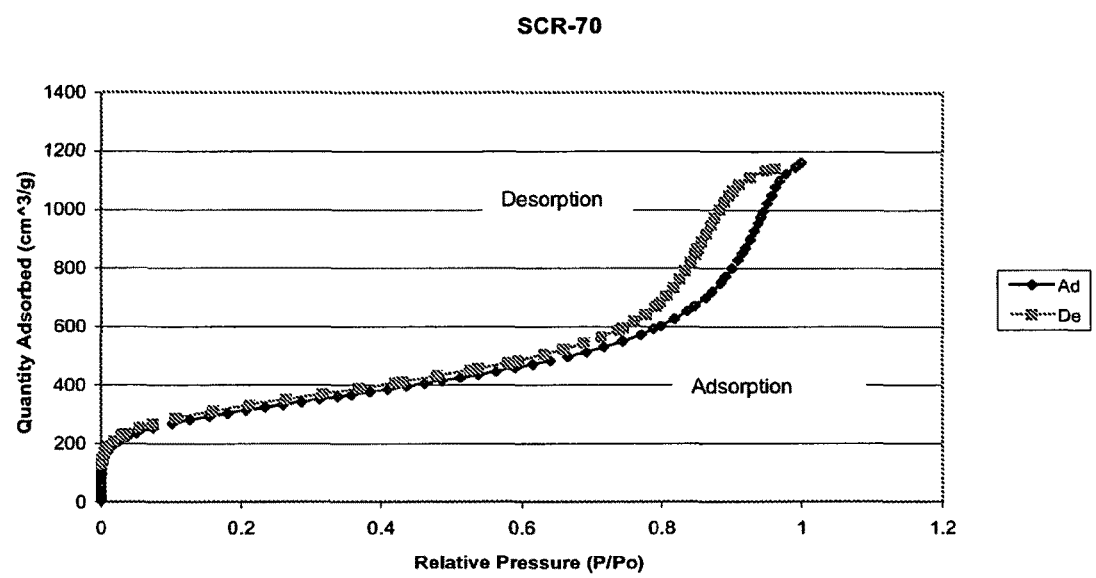

FIG. 27. Nitrogen adsorption/desorption isotherm at 77K for SCR-70

Figure 28:
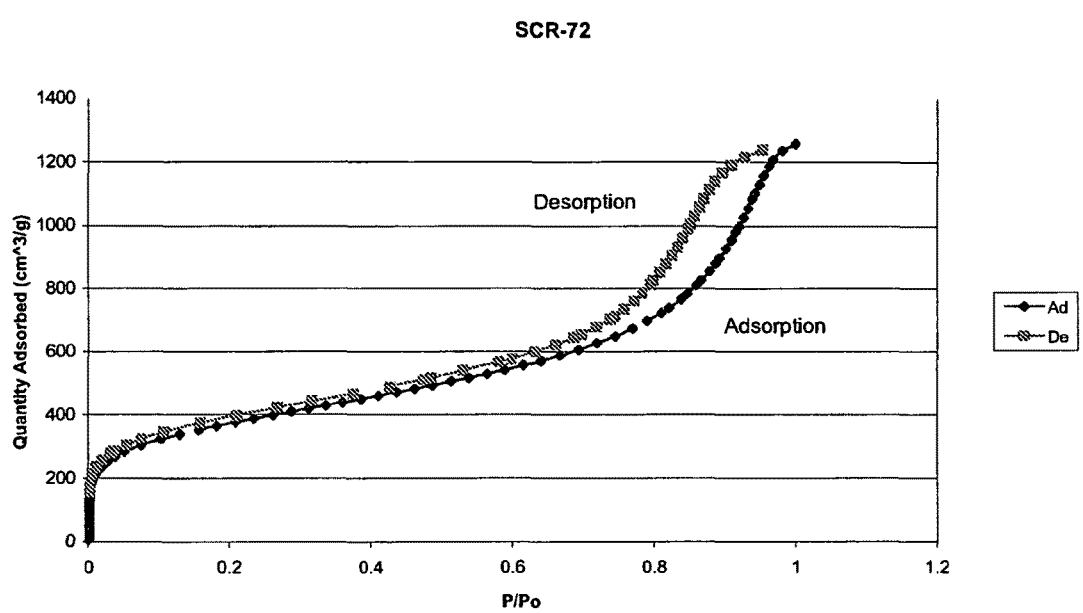

FIG. 28. Nitrogen adsorption/desorption isotherm at 77K for SCR-72

Figure 29:
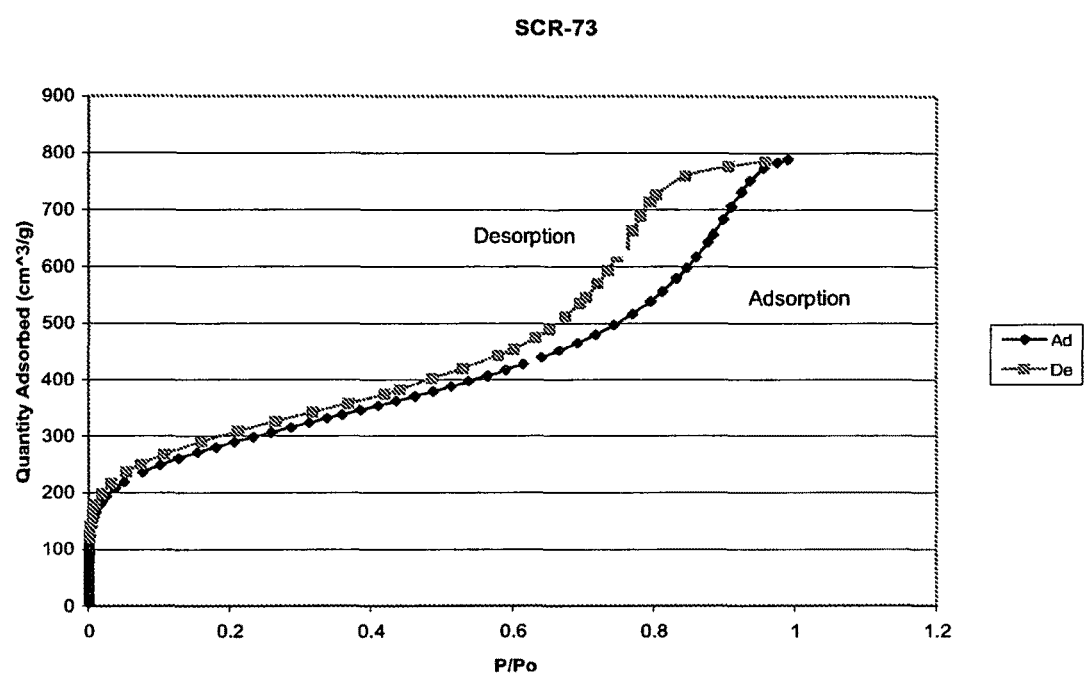

FIG. 29. Nitrogen adsorption/desorption isotherm at 77K for SCR-73

Figure 30:
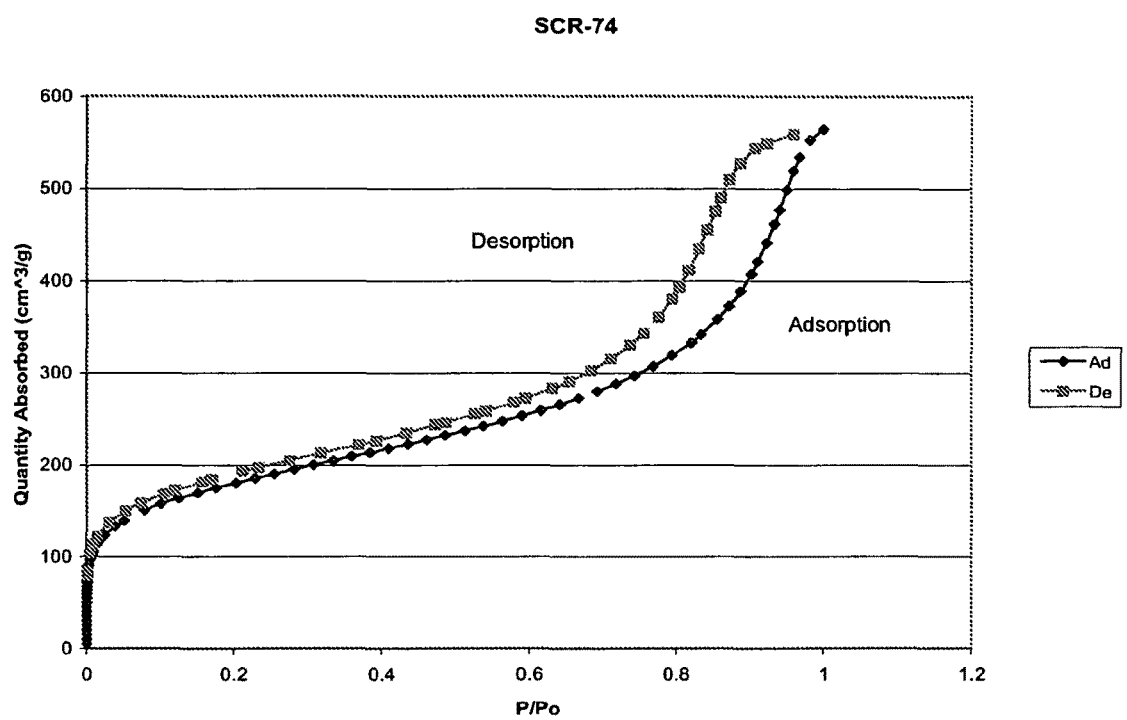

FIG. 30. Nitrogen adsorption/desorption isotherm at 77K for SCR-74

Figure 31:
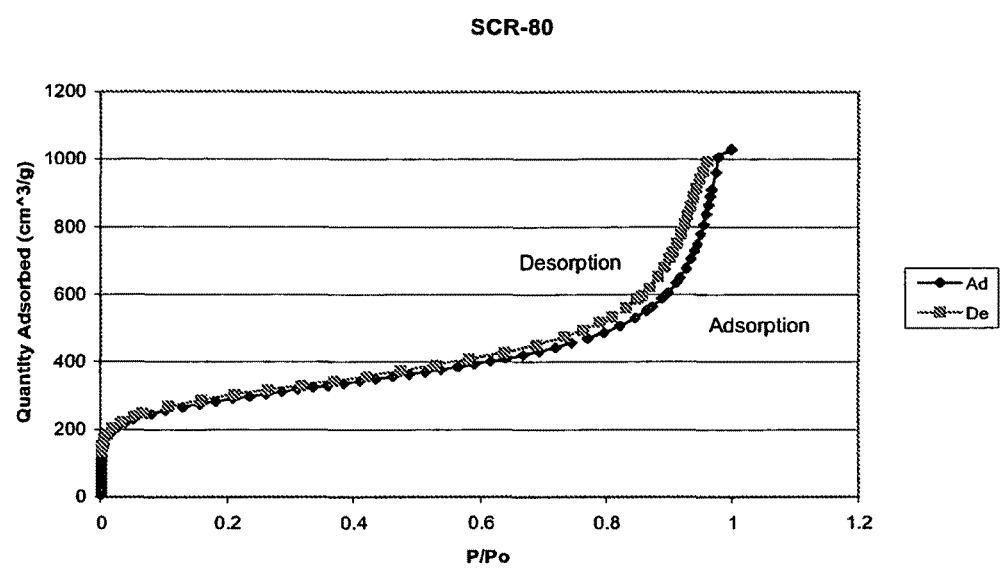

FIG. 31. Nitrogen adsorption/desorption isotherm at 77K for SCR-80

Figure 32:
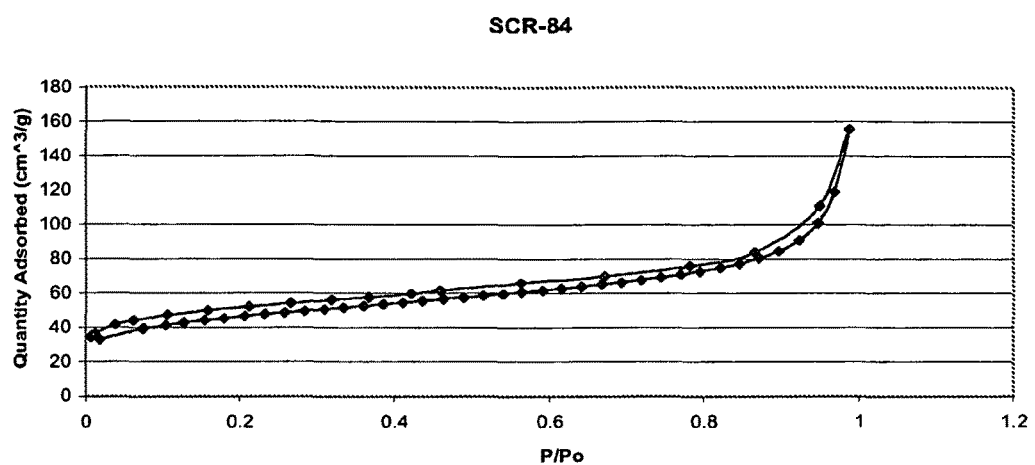

FIG. 32. Nitrogen adsorption/desorption isotherm at 77K for SCR-84

Figure 33:
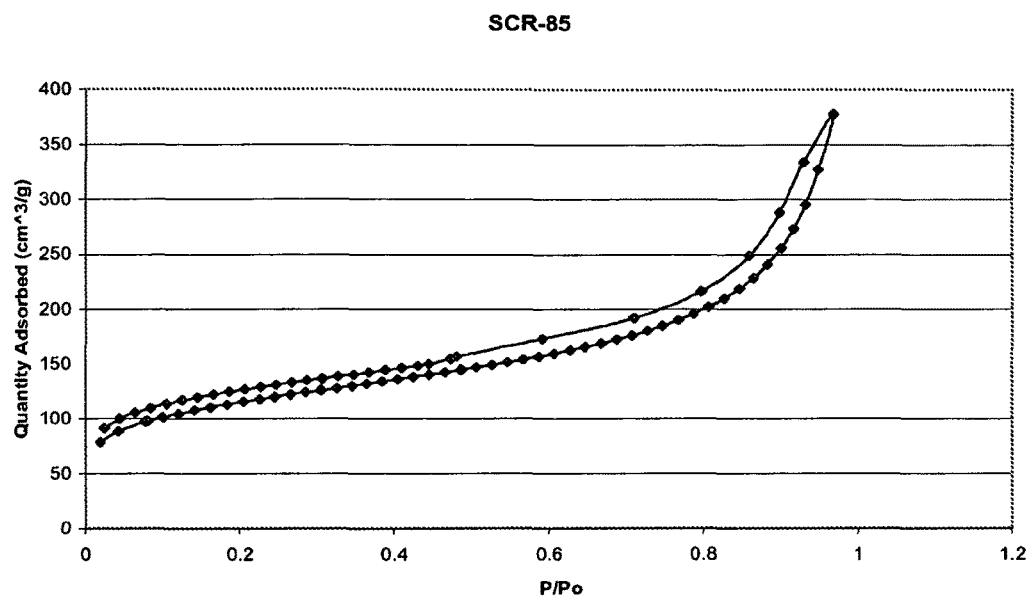

FIG. 33. Nitrogen adsorption.desorption isotherm at 77K for SCR-85

EXAMPLES CMP-1 to CMP-4

Polymer networks to which FIGS. 1-20 relate are denoted by codes CMP-1, CMP-2, CMP-3 and CMP-4. The monomers employed in making these polymers, and the physical properties of these polymers, are shown in Table 1.

TABLE 1

Starting materials and physical properties for polymer networks CMP-1 to CMP-4

|  | Alkyne monomer | Halogen monomer | $S_{BET}$ $(m^2/g)^{[a]}$ | $S_{micro}$ $(m^2/g)$ (t-plot)$^{[b]}$ | $V_{micro}$ $(cm^3/g)^{[b]}$ | $V_{tot}$ $(cm^3/g)^{[c]}$ | $L_{av}$ (strut) $(nm)^{[d]}$ |
|---|---|---|---|---|---|---|---|
| CMP-1 | 1,3,5-triethynylbenzene | 1,4-diiodobenzene | 834 (728) | 675 | 0.33 (0.34) | 0.47 | 1.107 |
| CMP-2 | 1,3,5-triethynylbenzene | 4,4'-diiodobiphenyl | 634 (562) | 451 | 0.25 (0.24) | 0.53 | 1.528 |

TABLE 1-continued

Starting materials and physical properties for polymer networks CMP-1 to CMP-4

| | Alkyne monomer | Halogen monomer | $S_{BET}$ $(m^2/g)^{[a]}$ | $S_{micro}$ $(m^2/g)$ (t-plot)$^{[b]}$ | $V_{micro}$ $(cm^3/g)^{[b]}$ | $V_{tot}$ $(cm^3/g)^{[c]}$ | $L_{av}$ (strut) $(nm)^{[d]}$ |
|---|---|---|---|---|---|---|---|
| CMP-3 | | I | 522 (409) | 350 | 0.18 (0.17) | 0.26 | 1.903 |
| CMP-4 | | Br | 744 (645) | 596 | 0.29 (0.26) | 0.39 | 1.107 |

[a]Surface area calculated from the N₂ adsorption isotherm using the Brunauer-Emmett-Teller method (figure in parentheses is the Langmuir surface area calculated using the H₂ sorption isotherm).
[b]The micropore surface area and micropore volume, respectively, derived using the t-plot method based on the Halsey Thickness Equation.
[c]Total pore volume at $P/P_0 = 0.99$.
[d]Average node-to-node strut length (measured between connected quaternary carbons) derived from polymer fragment models (FIG. 3).

Each of networks CMP-1 to CMP-3 is based on a 1,3,5-substituted benzene node connected by rigid phenyleneethynylene struts. For example, network CMP-1 consists of 1,3,5-substituted benzene nodes connected by struts containing one phenylene moiety and two ethynylene groups. A series of three networks, CMP-1, CMP-2, and CMP-3, was synthesized, each possessing two ethynyl "modules" per rigid strut while the number of phenylene moieties in each linker increases from one (CMP-1) to three (CMP-3).

The networks were observed to precipitate from solution during polymerization as brown-coloured powders which were totally insoluble in all solvents tested. At higher monomer concentrations macroscopic gelation of solutions was observed, but these gels fragmented into powders upon washing and drying, as opposed to forming stable coherent monoliths. The materials exhibited high thermal stability (decomposition temperature>400° C., FIGS. 6 & 7) and were chemically stable, for example, to acids and bases. As prepared, these networks were found to be non-conducting (pressed-pellet conductivity for CMP-1=$10^{-12}$ S/cm). Polymers were characterized at the molecular level by $^1$H-$^{13}$C CP/MAS NMR and assignment of the resonances (FIG. 1) was confirmed using $^1$H$^{13}$C CP/MAS kinetics and dipolar dephasing experiments. The low intensity lines at ca. 76 and 82 ppm can be ascribed to —C≡CH end-groups (the line at 82 ppm corresponds to quaternary acetylene carbon). The ratio of intensities of aromatic/acetylene peaks was calculated using variable contact time $^1$H-$^{13}$C CP/MAS NMR spectra as follows: CMP-1: 0.27 (expected value 0.29); CMP-2: 0.18 (expected value 0.17); CMP-3: 0.10 (expected value 0.15). These values were verified using $^{13}$C($^1$H) MAS NMR spectra (not shown). The spectrum of CMP-1 shows a broad shoulder at ca. 137 ppm which may originate from the protonated carbons of an aromatic end groups bearing residual iodine atoms.

The porous properties of the networks were investigated by sorption analyses using nitrogen (FIGS. 2 & 5) and hydrogen gas (FIGS. 8 & 9). All networks gave rise to Type I nitrogen gas sorption isotherms according to IUPAC classifications (K. S. W. Sing, D. H. Everett, R. A. W. Haul, L. Moscou, R. A. Pierotti, J. Rouquerol, T. Siemieniewska, *Pure Appl. Chem.* 1985, 57, 603) indicating that the materials are microporous. The nitrogen sorption isotherm, BET surface area, and pore size distribution for CMP-1 were all similar to those observed for the covalent organic framework, COF-1 (A. P. Côté, A. I. Benin, N. W. Ockwig, M. O'Keeffe, A. J. Matzger, O. M. Yaghi, *Science* 2005, 310, 1166), despite the fact that the latter material is crystalline and CMP-1 is completely amorphous. The BET surface area for these networks varied between 522 and 834 m²/g. The increased nitrogen uptake above a partial pressure of 0.2 and the rise in uptake at $P/P_0$>0.8 in the isotherm for CMP-2 may stem from interparticulate porosity associated with the complex meso- and macrostructure of this sample (FIG. 11). The inset in FIG. 2$a$ shows a semi-logarithmic plot for the isotherms in the low relative pressure range ($P/P_0$<0.01). These data suggest that the proportion of ultramicropores (<0.7 inn) decreases in this series of samples. FIG. 2$b$ shows the non-local density functional theory (NLDFT) pore size distribution curves for the three networks. In general, the micropore size distribution is shifted to larger pore diameters for the series of networks CMP-1 to CMP-3. This is shown by NLDFT cumulative pore volume plots for the three networks (FIG. 2$b$, right). In particular, CMP-3 exhibits almost no micropore volume below a pore diameter of about 0.9 nm. These observations are consistent with the trends in physical surface areas calculated using both the BET model ($N_2$ as the sorbate gas) and a Langmuir model (with $H_2$ as the sorbate; Table 1).

Thus the present inventors have found that the pore structure in these CMP networks can be tuned by controlling the length of the rigid connecting strut, much as for crystalline MOFs and COFs and that this effect was highly reproducible for repeat-synthesized samples (FIG. 4). To rationalize this, the present inventors characterized the polymers by SEM, TEM, and X-ray diffraction. The present inventors also carried out atomistic simulations for fragments of the networks. It is possible to build a number of plausible structural models for these networks including two-dimensional graphyne-like sheets, spiral structures, and nanotube structures, as illustrated in FIG. 16. The most energetically favourable models that were found, however, were relatively disordered three-dimensional nets (FIGS. 3a and 3b).

The three-dimensional structure of the networks arises from a combination of bending of the struts out of the plane of the benzene nodes, from the dihedral angle between struts on adjacent connected nodes, from bending of the struts themselves (especially for CMP-3), and from in-plane deviations of the angle between struts from the hypothetical 120° imposed by the 1,3,5-substituted geometry. The degree of angular distortion depends on the length of the strut, $L_{av}$ (Table 1), the local structure of the node, and the nature of the groups within the strut. CMP-1 has the most rigid structure with the fewest interconnecting atoms ($L_{av}$=1.107 nm; FIG. 3b, left). The out-of-plane bending of struts in the CMP-1 fragment model ranges from 0° to 10° while in-plane angles range from 115° to 130°. For the CMP-2 model, the adjacent benzene rings in the biphenyl moieties are twisted at 26° which, along with an increase in $L_{av}$ (1.528 nm), allows for greater flexibility in the structure. A wider range of in-plane and out-of-plane bending angles is observed for the struts (108-138° and 3-26°, respectively) in the CMP-2 model. The CMP-3 model is comprised of the longest struts ($L_{av}$=1.903 nm) and thus there is more scope for geometric distortions in the structure (FIG. 3b, right). There is a broader distribution range of in-plane and out-of-plane bending angles in this model (104-138° and 3-70°, respectively). Three-dimensional nets from three-connecting ligands such as 1,3,5-benzenetricarboxylate are common in MOF chemistry and often give rise to chiral helical frameworks. It should be noted that our models represent fragments of the networks rather than the pore structure itself. It is likely, for example, that there is significantly more catenation and entanglement of fragments in the actual samples, consistent with the fact that these fragment models significantly overestimate the micropore volume.

SEM analysis revealed a complex mixed morphology for the network powders comprising both fused hollow nanotubes and solid spheres with sub-micron dimensions (FIG. 3c). X-ray diffraction (not shown) for CMP-1 revealed an amorphous halo with no evidence for characteristic reflections from a crystalline phase or layered sheets. This is consistent with an amorphous network structure (FIG. 3a,b) with an absence of short- and long-range order. Similarly, TEM analysis (FIG. 3c) showed that the polymers had low densities, as expected for microporous materials, and the homogeneous contrast observed gave no evidence of ordering. There are two broad schemes for explaining microporosity in amorphous polymers; first, a homogeneous network model where the porosity is "molecular" in nature and, second, a more heterogeneous model in which denser microgel particles are connected by tie chains. Atomistic simulations, TEM analysis, gas sorption isotherms, and the correlation of micropore size with strut length all support a homogeneous, molecularly-porous network model for these materials. A fourth network, CMP-4, which was topologically equivalent to CMP-1, showed porous properties which were very similar to those of CMP-1 (Table 1; FIG. 17).

Thus, the present inventors have demonstrated the synthesis of amorphous microporous polyyne networks in which, like MOFs and COFs, the micropore size is closely related to the rigid monomer structure. These polymers have good chemical and thermal stability in comparison with MOF and COF materials and there is broad scope for robust anchoring of specific functionality to the networks via carbon-carbon bonding forming reactions. The polymer networks are conjugated and there is a wealth of opportunity for producing microporous materials with useful coupled chemical, electrical, or optical properties; for example, microporous network CMP-1 was shown to be photoluminescent ($\lambda_{max}$=500-550 nm, FIG. 19). Moreover, this work challenges the notion of crystallinity being a prerequisite for molecular control over micropore size in rigid networks. It is surprising that highly desirable properties can be reliably obtained in an amorphous polymer network.

Experimental methods and materials used in the preparation, characterization and analysis of these products will now be described.

Syntheses

Typical Procedure for CMP-1

1,3,5-triethynylbenzene (300 mg, 2.0 mmol), 1,4-diiodobenzene (659 mg, 2.0 mmol), tetrakis-(triphenylphosphine) palladium (100 mg), and copper iodide (30 mg) were dissolved in the mixture of toluene (3 ml) and $Et_3N$ (3 ml). The reaction mixture was heated to 80° C., stirred for 24 h under a nitrogen atmosphere, and then cooled to room temperature. The precipitated network polymer was filtered and washed four times with chloroform, water, methanol, and acetone to remove any unreacted monomer or catalyst residues. The product was dried in vacuum for 24 h at 70° C. (Yield, 67.7%). IR (KBr, cm-1): 3298.2 (—C≡C—H), 2200.9 (—C≡C—).

Further Syntheses

To ensure consistency between syntheses and to exclude for example concentration effects, networks CMP1-3 were synthesized at a fixed overall molar concentration of 400 mmol/L, a fixed reaction temperature of 80° C., and a constant molar ratio of ethynyl to halogen functionalities of 1.5:1.

CMP-1: 1,3,5-triethynylbenzene (300 mg, 2.0 mmol), 1,4-diiodobenzene (660 mg, 2.0 mmol), tetrakis-(triphenylphosphine)palladium (100 mg), and copper iodide (30 mg) were dissolved in the mixture of toluene (2.5 ml) and $Et_3N$ (2.5 ml). The reaction mixture was heated to 80° C., stirred for 72 h under a nitrogen atmosphere in order to rigorously exclude oxygen and to prevent homocoupling of the alkyne monomers. The mixture was cooled to room temperature and the precipitated network polymer was filtered and washed four times with chloroform, water, methanol, and acetone to remove any unreacted monomer or catalyst residues. The further purification of the polymers was carried out by Soxhlet extraction from methanol for 48 h. The product was dried in vacuum for 24 h at 70° C. (Yield, 65.4%). IR (KBr cm$^{-1}$): 3298.2 (—C≡C—H), 2200.9 (—C≡C—). Elemental combustion analysis (%) Calcd for $C_{21}H_9$: C, 96.55, H, 3.45. Found: C, 83.62, H, 3.66. Found by EDX analysis (wt. %): C, 95.79, Pd, 1.03, 12.27, P, 0.45.

CMP-2: This network was synthesized by the same method as CMP-1. 1,3,5-triethynylbenzene (300 mg, 2.0 mmol), 4,4'-diiododiphenyl (812 mg, 2.0 mmol), tetrakis-(triphenylphosphine)palladium (120 mg), and copper iodide (35 mg) were used in this case. (Yield, 60.5%). IR (KBr cm$^{-1}$): 3297.3 (—C≡C—H), 2206.7 (—C≡C—). Elemental combustion analysis (%) Calcd for $C_{30}H_{15}$: C, 96.0, H, 4.0. Found: C, 87.40, H, 4.00. Found by EDX analysis (wt. %): C, 96.39, Pd, 1.80, Cu, 0.93, I, 1.19.

CMP-3: This network was synthesized from 1,4-diethynylbenzene (284 mg, 2.25 mmol), 1,3,5-tris(4'-iodophenyl)benzene (684 mg, 1.0 mmol), tetrakis-(triphenylphosphine)palladium (100 mg), and copper iodide (30 mg). (Yield, 55.7%). IR (KBr cm$^{-1}$): no peak observed from (—C≡C—H), 2207.5 (—C≡C—). Elemental combustion analysis (%) Calcd for $C_{39}H_{21}$: C, 95.71, H, 4.29. Found: C, 85.78, H, 4.34. Found by EDX analysis (wt. %): C, 86.74, Pd, 3.94, 10.87, P, 0.25.

CMP-4: 1,4-diethynylbenzene (500 mg, 3.96 mmol), 1,3,5-tribromobenzene (498 mg, 1.58 mmol), tetrakis-(triphenylphosphine)palladium (110 mg), and copper iodide (35 mg) were used in the polymerization. (Yield, 62.2%). IR (KBr cm$^{-1}$): 3300.9 (—C≡C—H), 2203.8 (—C≡C—). Elemental combustion analysis (%) Calcd for $C_{21}C_9$: C, 96.55, H, 3.45. Found: C, 87.35, H, 3.87. Found by EDX analysis (wt. %): C, 96.86, Pd, 2.86, P, 0.28, Br, (none detectable).

Repeat Reactions

Networks CMP-1, CMP-2, and CMP-3 were synthesized a second time to generate networks CMP-1A, CMP-2A, and CMP-3A. Apart from very small differences in the molar ratio between ethynyl- and halo-substituted monomers, the reaction conditions were essentially the same. The high degree of reproducibility of the gas sorption data and NMR spectra for the two sets of samples is illustrated by FIGS. 4 and 5.

CMP-1A: 1,3,5-triethynylbenzene (300 mg, 2.0 mmol), 1,4-diiodobenzene (659 mg, 2.0 mmol), tetrakis-(triphenylphosphine)palladium (100 mg), and copper iodide (30 mg) were dissolved in the mixture of toluene (3 ml) and Et$_3$N (3 ml). The reaction mixture was heated to 80° C., stirred for 24 h under a nitrogen atmosphere in order to rigorously exclude oxygen and to prevent homocoupling of the alkyne monomers. The mixture was cooled to room temperature and the precipitated network polymer was filtered and washed four times with chloroform, water, methanol, and acetone to remove any unreacted monomer or catalyst residues. The product was dried in vacuum for 24 h at 70° C. (Yield, 67.7%). IR (KBr cm$^{-1}$): 3298.2 (—C≡C—H), 2200.9 (—C≡C—). Elemental analysis (%) Calcd for $C_{21}H_9$: C, 96.55, H, 3.45. Found: C, 87.34, H, 3.60.

CMP-2A: This network was synthesized by broadly the same method as CMP-1. 1,3,5-triethynylbenzene (300 mg, 2.0 mmol), 4,4'-diiododiphenyl (812 mg, 2.0 mmol), tetrakis-(triphenylphosphine)palladium (120 mg), and copper iodide (35 mg) were used in this case. (Yield, 58.3%). IR (KBr cm$^{-1}$): 3297.3 (—C≡C—H), 2206.7 (—C≡C—). Elemental analysis (%) Calcd for $C_{30}H_{15}$: C, 96.0, H, 4.0. Found: C, 90.23, H, 4.09.

CMP-3A: This network was synthesized from 1,4-diethynylbenzene (400 mg, 3.17 mmol), 1,3,5-tris(4'-iodophenyl)benzene (1085 mg, 1.58 mmol), tetrakis-(triphenylphosphine)palladium (120 mg), and copper iodide (40 mg). (Yield, 52.3%). IR (KBr cm$^{-1}$): no peak observed from (—C≡C—H), 2207.5 (—C≡C—). Elemental analysis (%) Calcd for $C_{39}H_{21}$: C, 95.71, H, 4.29. Found: C, 85.90, H, 4.13.

Electron Microscopy

SEM (Scanning Electron Microscopy)

High resolution imaging of the polymer morphology was achieved using a Hitachi S-4800 cold Field Emission Scanning Electron Microscope (FE-SEM). The dry polymers samples were prepared on 15 mm Hitachi M4 aluminium stubs using either silver dag or an adhesive high purity carbon spectro tab. The samples were then coated with a 2 nm layer of gold using an Emitech K550X automated sputter coater. The FE-SEM measurement scale bar was first calibrated using certified SIRA calibration standards and elemental quantification standards were also used to calibrate the Oxford Instruments EDX detector. Imaging was conducted at a working distance of 8 mm and a landing voltage of 3 kV using a mix of upper and lower secondary electron detectors. An Oxford Instruments 7200 EDX detector was used to conduct elemental analysis of polymer composition. EDX analysis for these samples showed atomic percentage contents for copper and iodine of <0.2%.

TEM (Transmission Electron Microscopy)

HRTEM (high resolution TEM) was carried out on a Jcol JEM-2011 electron microscope with a LaB$_6$ filament operated at 200 kV. The dry polymers for TEM examination were ground, suspended in acetone, and deposited on a copper specimen grid supported by a holey carbon film. TEM images were recorded with a Gatan 794 CCD camera at magnifications of 40,000 to 800,000.

Solid State NMR

Solid-state NMR spectra were measured on a Bruker Avance 400 DSX spectrometer operating at 100.61 MHz for $^{13}$C and 400.13 MHz for $^1$H. $^1$H-$^{13}$C Cross Polarisation Magic Angle Spinning (CP/MAS) NMR experiments were carried out at MAS of 10.0 kHz using zirconia rotors of 4 mm in diameter. The $^1$H π/2 pulse was 3.3 μs and TPPM decoupling was used during the acquisition. The Hartmann-Hahn condition was set using hexamethylbenzene. The spectra were measured using contact time of 2.0 ms and relaxation delay of 10.0 s. Typically 2048 scans were accumulated. The $^1$H-$^{13}$C dipolar dephasing spectra were recorded at the MAS rate of 10 kHz and using depasing delays of 20, 50, 100 and 200 μs. The variable contact time $^1$H-$^{13}$C CP/MAS NMR spectra were measured using $t_m$=0.02-12.0 ms. The $^{13}$C{$^1$H} MAS NMR spectra were measured at MAS rate of 10.0 kHz using TPPM decoupling. The $^{13}$C π/2 pulse was 3.5 μs. The spectra were measured using the recycle delay of 30.0 s. Typically 1024 scans were accumulated. The values of chemical shift are referred to TMS. The analysis of the spectra (deconvolution and integration) was carried out using Bruker TOPSPIN software.

$^1$H-$^{13}$C CP/MAS NMR spectra of the polymer networks provide important information on their structure. The assignment of the resonances was confirmed out using $^1$H-$^{13}$C CP/MAS kinetics and dipolar dephasing experiments. All networks show resonance at ca. 91 ppm attributable to the acetylene carbons, peak at ca. 123.5 ppm corresponding to quaternary aromatic carbons connected with —C≡C— bridges and a peak at ca. 131.5 ppm corresponding to non-quaternary aromatic carbons in close proximity with —C≡C— bridges. In addition, polymeric networks of CMP-2 and CMP-3 show resonances at ca. 141 ppm attributable to quaternary aromatic sites and ca. 127 ppm from non-quaternary aromatic resonances originating from their respective halogen monomers. The low intensity lines at ca. 76 and 82 ppm can be ascribed to the end —C≡CH groups (the line at 82 ppm corresponds to quaternary acetylene carbon). These resonances account for ca. 10% of intensity of acetylene lines for CMP-1 and CMP-3 and have a much lower contribution to the acetylene carbons in the spectra of CMP-2. The ratio of intensities of aromatic/acetylene peaks was calculated using variable contact time $^1$H-$^{13}$C CP/MAS NMR spectra:

CMP-1: 0.27 (expected value 0.29)
CMP-2: 0.18 (expected value 0.17)
CMP-3: 0.10 (expected value 0.15)

These values have been verified using $^{13}$C {$^1$H} MAS NMR spectra (not shown).

The $^{13}$C{$^1$H} MAS NMR spectra for repeat samples CMP1A-3A were found to be almost identical to those recorded for CMP1-3 (c.f., FIG. 1 and FIG. 4).

The spectra of CMP1 and CMP1A (FIGS. 1 and 4) show a broad shoulder at ca. 137 ppm. This feature could originate from the protonated carbons from aromatic end groups bearing residual iodine atoms. One should also consider a possibility of motional broadening of such resonances. Careful inspection of the solid state NMR gave no evidence for homo-coupled diyne linkages in the networks, suggesting that these units if present do not represent a significant (>2%) proportion of the structure, at least in terms of determining pore size distributions. (Even a small percentage of diyne links may be important, however, with respect to properties such as conductivity.)

Powder X-Ray Diffraction (PXRD)

PXRD data was collected at room temperature on a Philips Analytical XPert PRO diffractometer (CoKα radiation, λ=1.788965 Å) operating in Bragg-Brentano para-focusing geometry (scan range: θ/2θ=2–135)°. Data analysis was performed with the PANanalytical XPert HighScore Plus programme.

Gas Sorption

The porous properties of the networks were investigated by nitrogen adsorption and desorption at 77.3 K using an ASAP2020 volumetric adsorption analyzer (Micromeritics Instrument Corporation). Samples were degassed at 110° C. for 15 h under vacuum (10$^{-5}$ bar) before analysis. Hydrogen isotherms were measured at 77.3 K up to 1.13 bar using a Micromeritics ASAP2420 volumetric sorption analyzer.

Atomistic Simulations

Molecular models for the network fragments were generated using the Materials Studio Modeling 4.0 package (Accelrys Inc., San Diego, Calif., 2005). The fragments were constructed by adding the repeating unit for each system in a stepwise manner. All models fully relaxed using the Discover molecular mechanics and dynamics simulation module with the COMPASS forcefield. A seed molecule was constructed for each system by fully substituting the 1,3,5-benzene node monomer with three of the corresponding linear connecting monomers. Each model was built to contain a total of 65 repeat units. Any terminal halogen atoms on the periphery of the fragments were replaced with hydrogen atoms for clarity.

Fluorescence Spectra

The fluorescence spectra of solid CMP-1 polymer network (FIGS. 19) and 1,3,5-triethynylbenzene monomer (FIG. 20) were measured with a fluorescence spectrometer (FSM, Perkin Elmer Cop.). The polymer was luminescent under excitation wavelength of 325 nm.

Thermogravimetric Analysis

The thermal properties of the polymer networks were evaluated using a thermogravimetric analysis (TGA)—differential thermal analysis instrument (EXSTAR6000) over the temperature range 50 to 700° C. under a nitrogen atmosphere with a heating rate of 5° C./min.

Differential Scanning Calorimetry

DSC measurements were carried out on a Perkin Elmer Diamond HyperDSC under a helium atmosphere with a heating rate of 5° C./min in the range +30° C. to 200° C., calibrated using an indium primary standard.

FURTHER EXAMPLES

The present invention allows a range of polymers to be prepared with various functionality. Features of the polymers, including pore size and shape, can be altered by adjusting the nature of the monomers. Some further examples are given below.

EXAMPLES SCR-31 & QHS-1

An amino-substituted bromo-aryl monomer was used as monomer to produce a polymer with pendant NH$_2$ groups, and its surface area and hydrogen uptake determined:

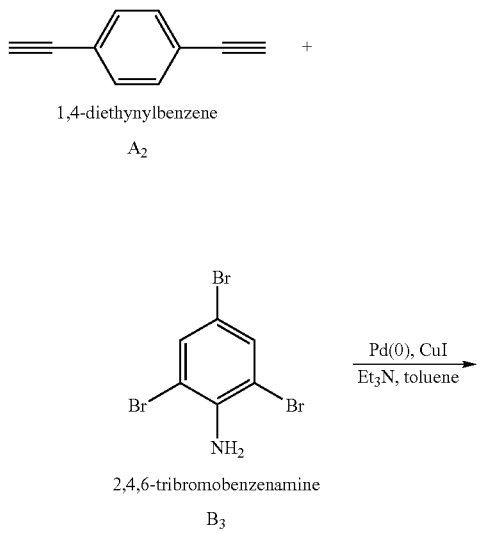

-continued

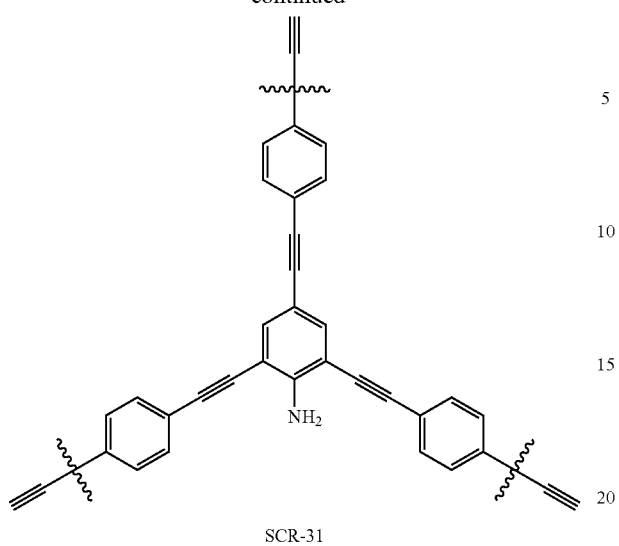

SCR-31

| Polymer | Ratio ($A_2/B_3$) | SA ($m^2/g$) | $H_2$ (max) (wt %) | Elemental Analysis Theoretical/Found | | |
|---|---|---|---|---|---|---|
| | | | | C | H | N |
| SCR-31 | 2.5:1 | 330 | 0.69 | (91.31) 76.48 | (3.62) 3.65 | (5.07) 2.59 |

This amino-containing network was then quaternized:

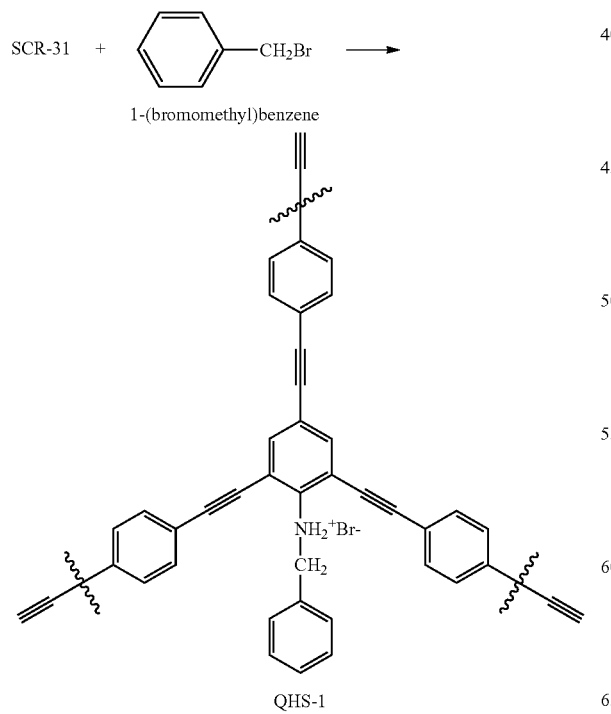

QHS-1

| Polymer | SA ($m^2/g$) | $H_2$(max) (wt %) |
|---|---|---|
| QHS-1 | 19 | 0.5 |

EXAMPLES SCR-n₆ (SCR-38 AND SCR-39), QHS-2 AND QHS-3

Pyridine was used as the aryl component in the halo-aryl monomer, to produce a polymer network containing pyridine rings:

| Polymer | Ratio ($A_3/B_2$) | Yield (%) | SA ($m^2/g$) | $H^2$(max) (wt %) |
|---|---|---|---|---|
| SCR-38 | 1:1 | 68.5 | 216 | 0.55 |
| SCR-39 | 1.5:1 | 68.2 | 335 | 0.63 |

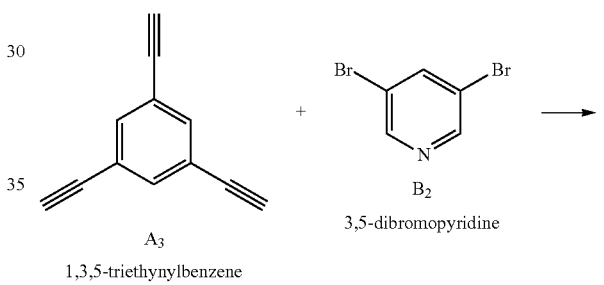

A₃
1,3,5-triethynylbenzene

B₂
3,5-dibromopyridine

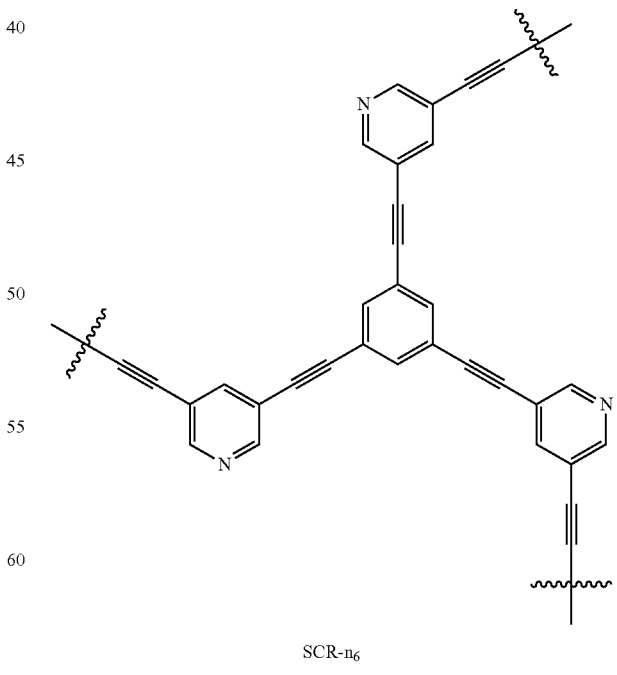

SCR-n₆

The pyridine nitrogen atoms were then derivatized:
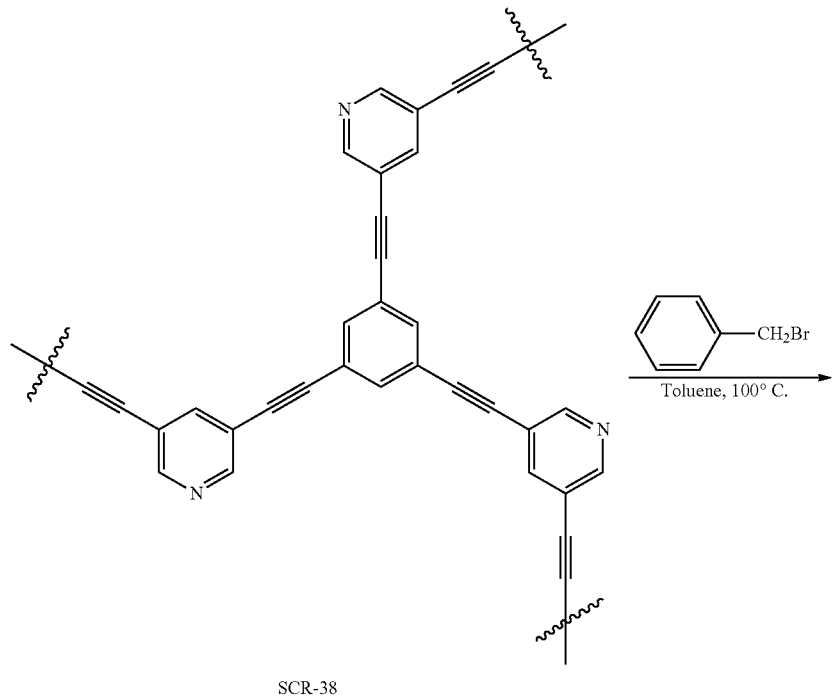
SCR-38
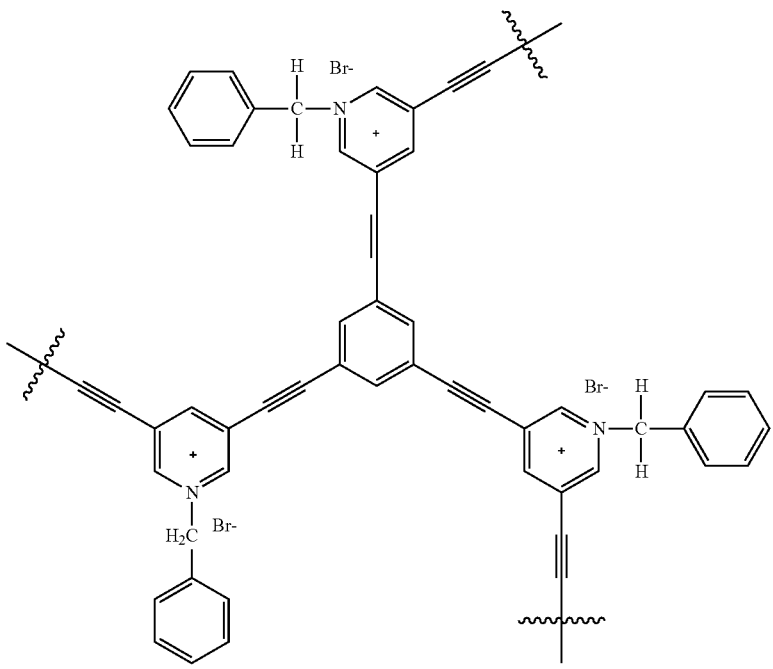
QHS-2

-continued
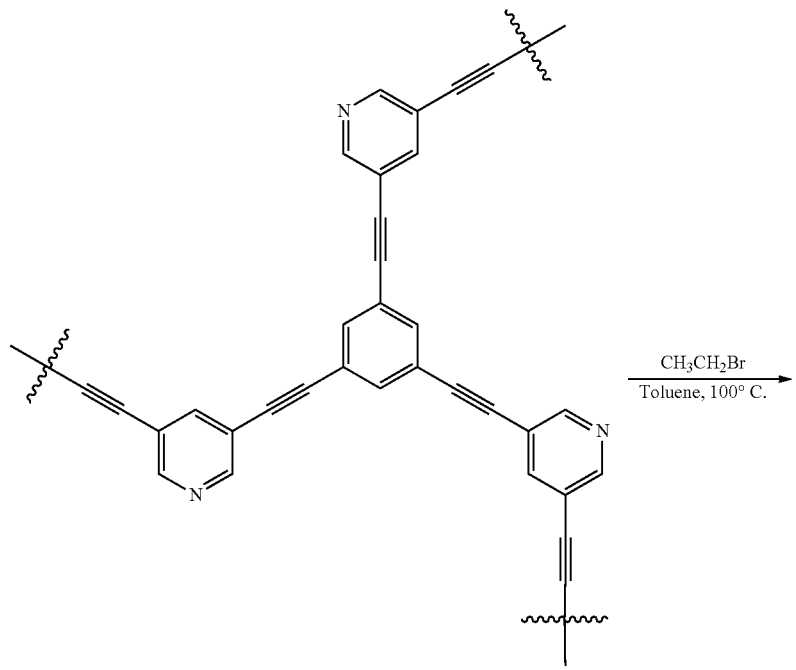
SCR-39
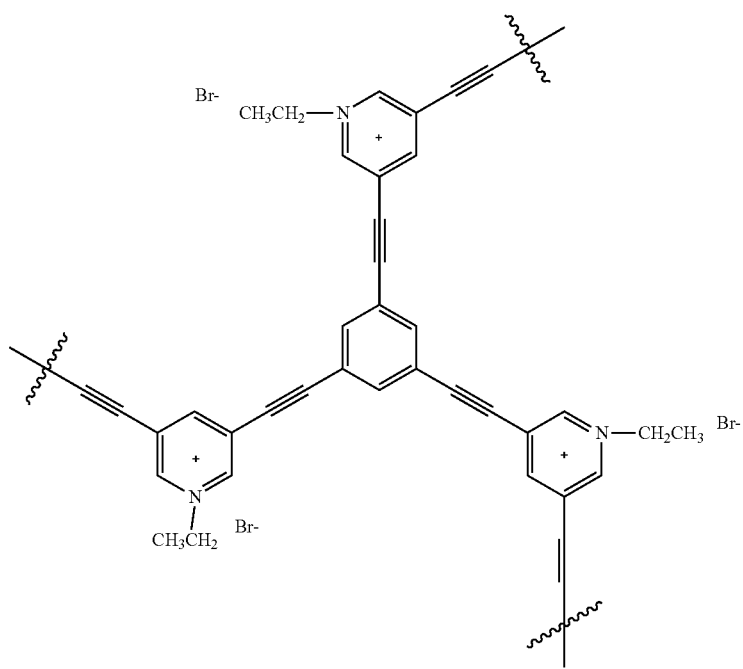
QHS-3

| Polymer | SA (m²/g) | H₂(max) (wt %) |
|---|---|---|
| SCR-38 | 216 | 0.54 |
| QHS-2 | 48 | 0.15 |
| SCR-39 | 335 | 0.63 |
| QHS-3 | 364 | 0.69 |
EXAMPLE SCR-41
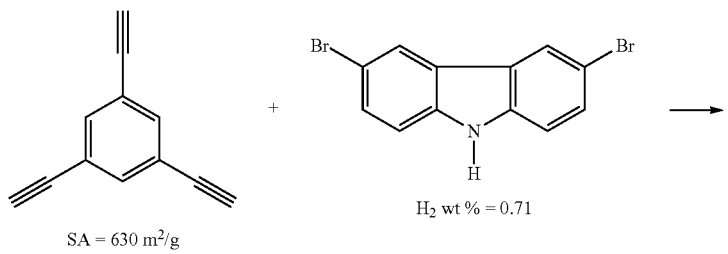
SA = 630 m²/g
H₂ wt % = 0.71
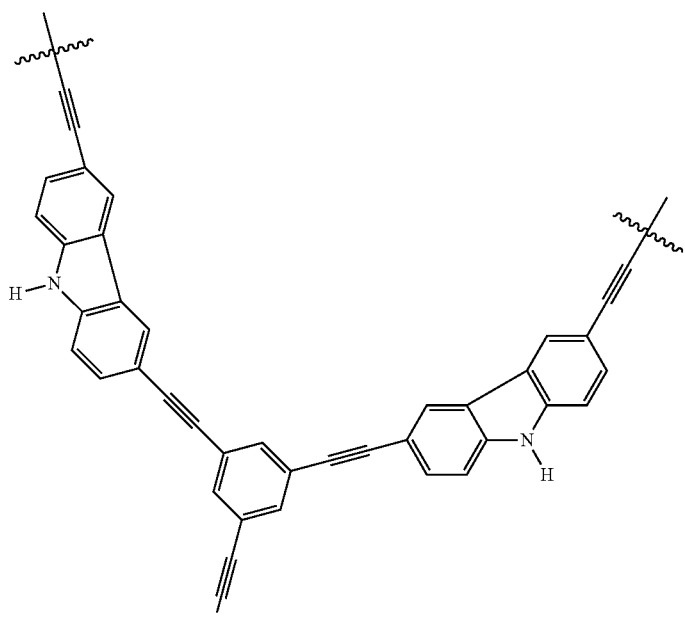
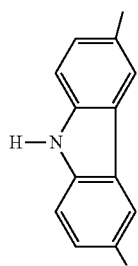

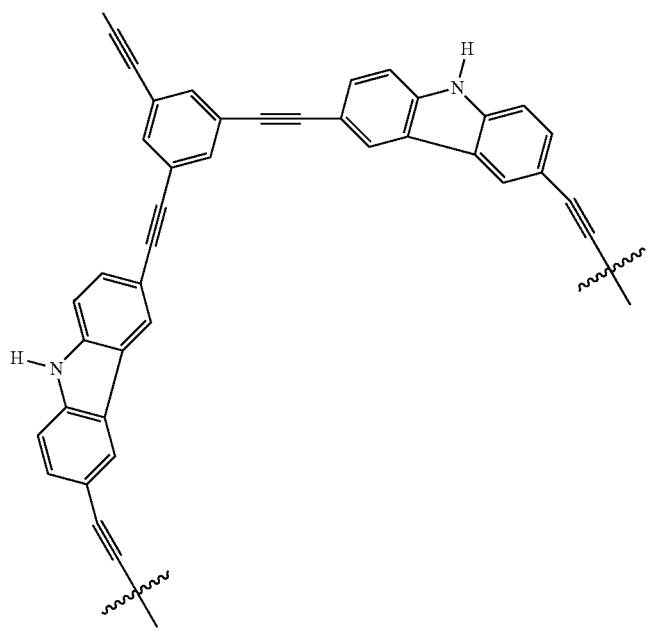
SCR-41
⑦ indicates text missing or illegible when filed
EXAMPLE SCR-42
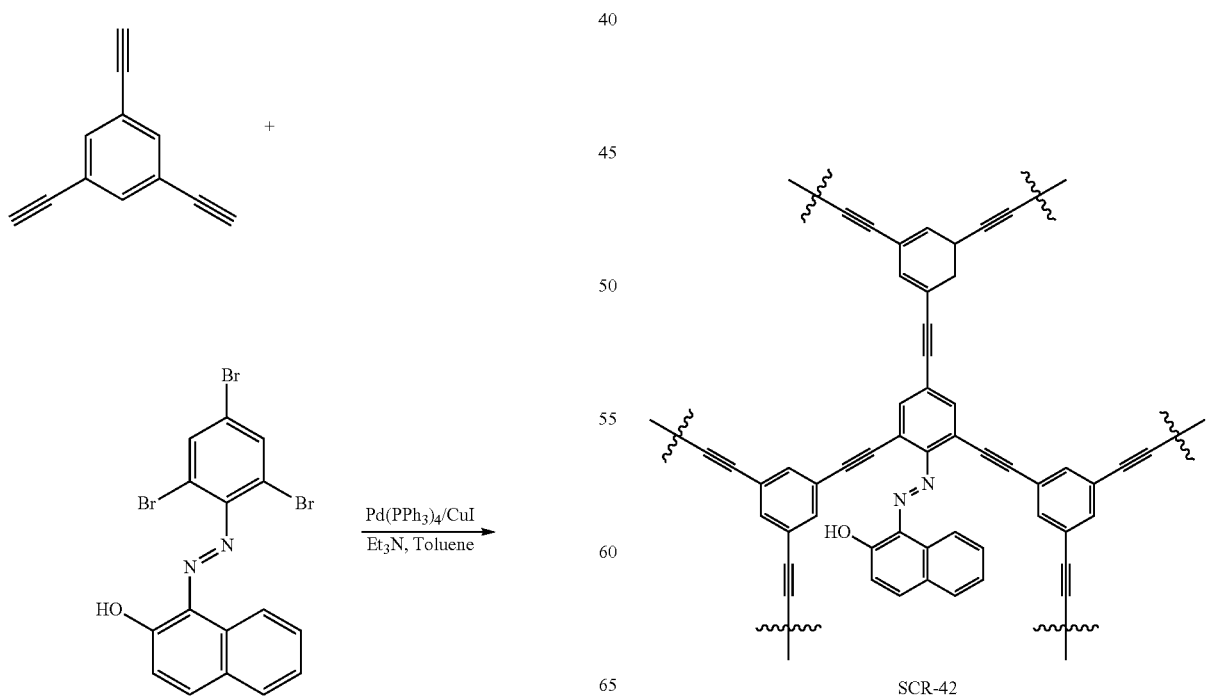
SCR-42

EXAMPLE SCR-50
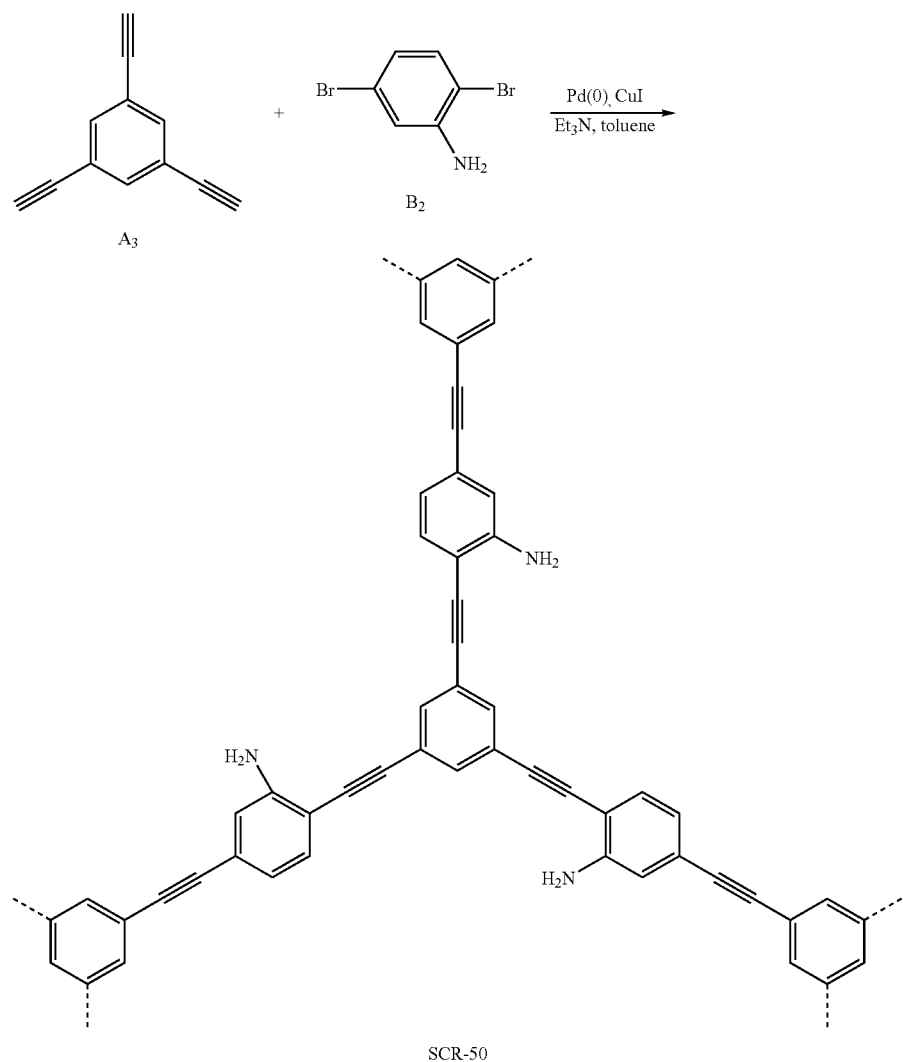
SCR-50 was also quaternized with benzyl bromide in toluene at 100° C. The surface area was 514 m²/g before quaternization and 548 m²/g after quaternization.
EXAMPLE SCR-53
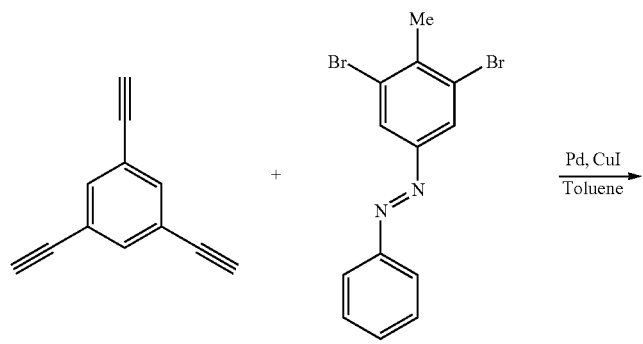

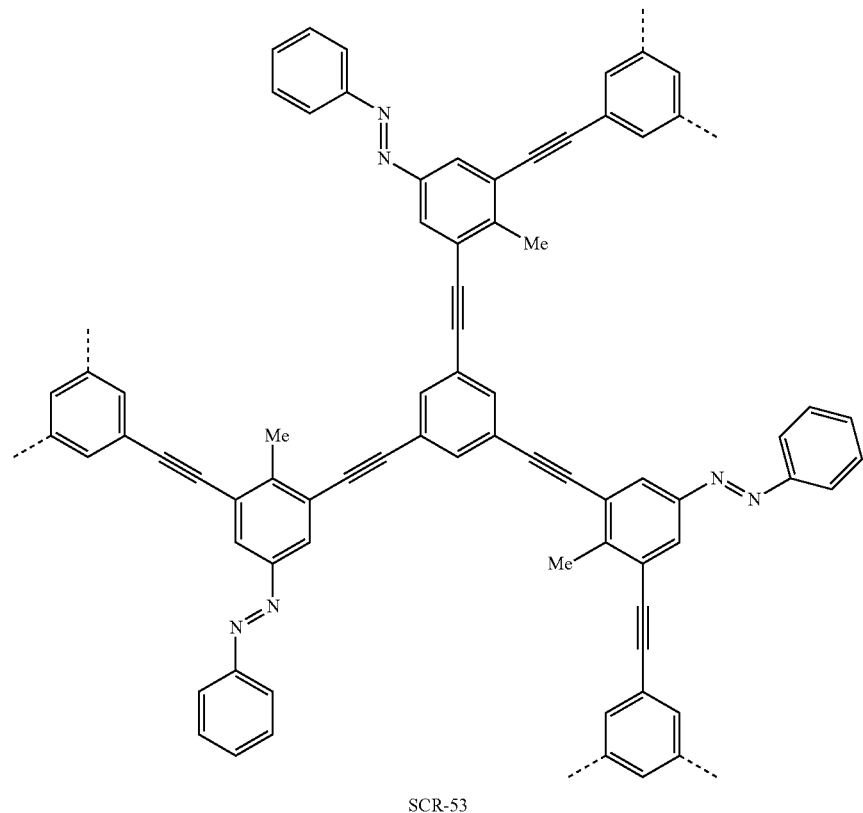
SCR-53
⑦ indicates text missing or illegible when filed
EXAMPLE SCR-56 & 58
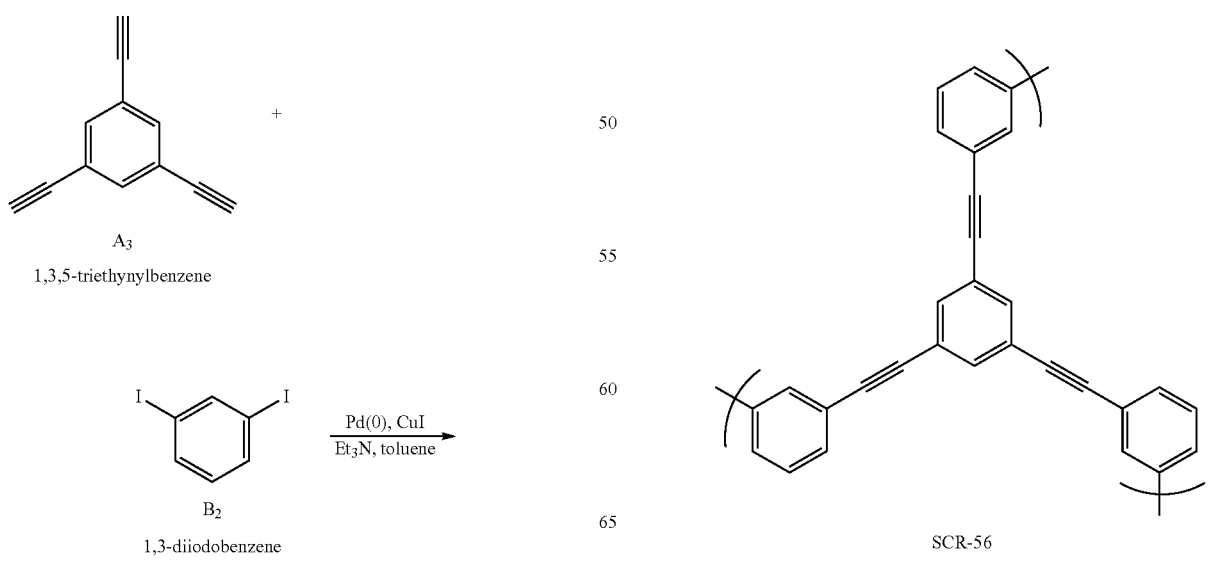
SCR-56

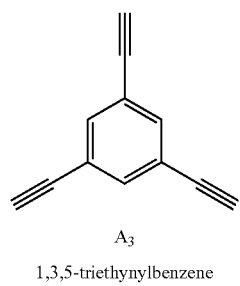
A₃
1,3,5-triethynylbenzene
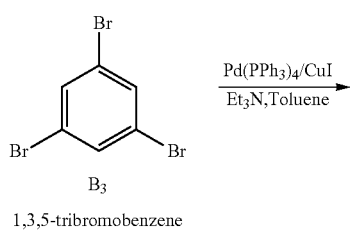
B₃
1,3,5-tribromobenzene
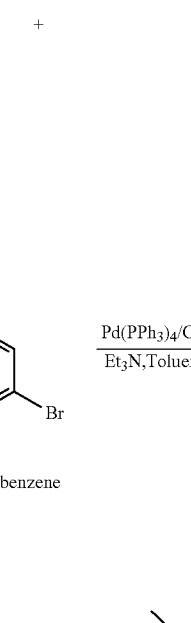
SCR-58
ratio = 1.5:1
EXAMPLE SCR-63 & SCR-60
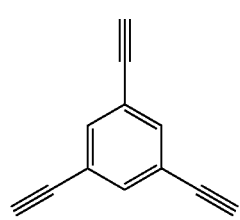
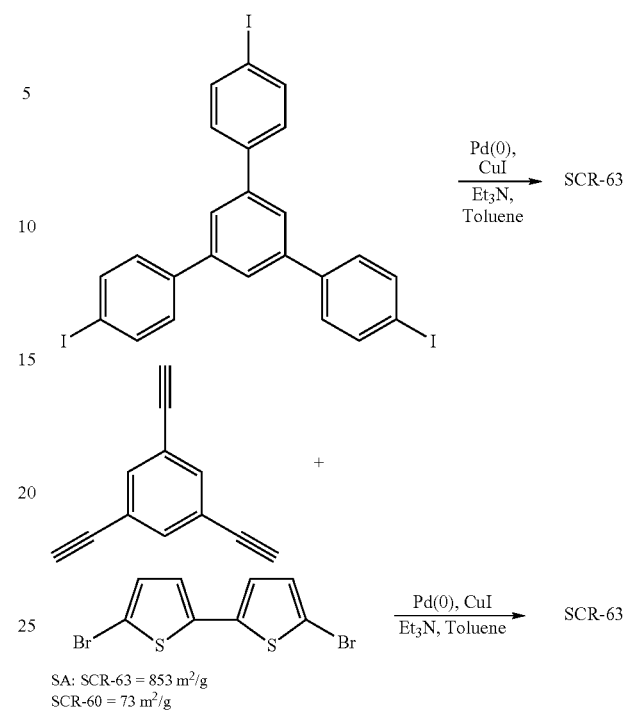
SCR-63
SA: SCR-63 = 853 m²/g
SCR-60 = 73 m²/g
EXAMPLE SCR-64, SCR-65 & SCR-66
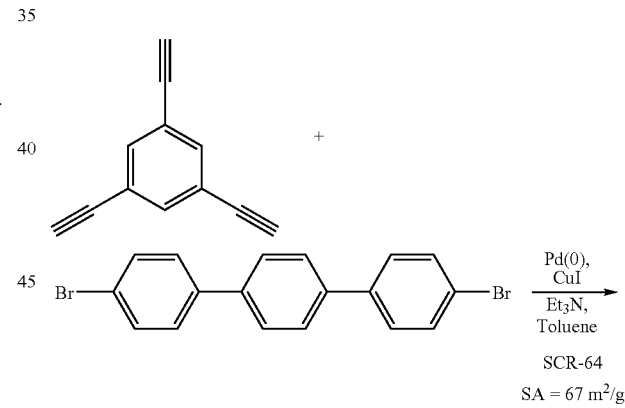
SCR-64
SA = 67 m²/g
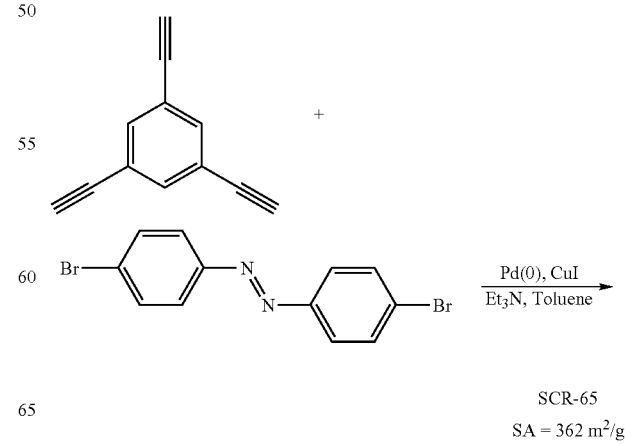
SCR-65
SA = 362 m²/g

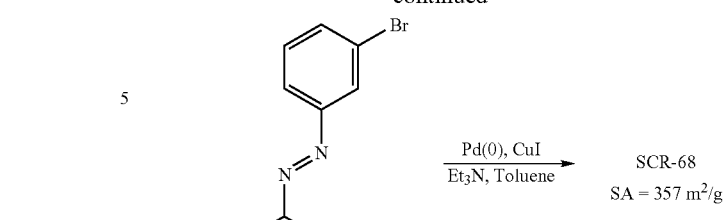
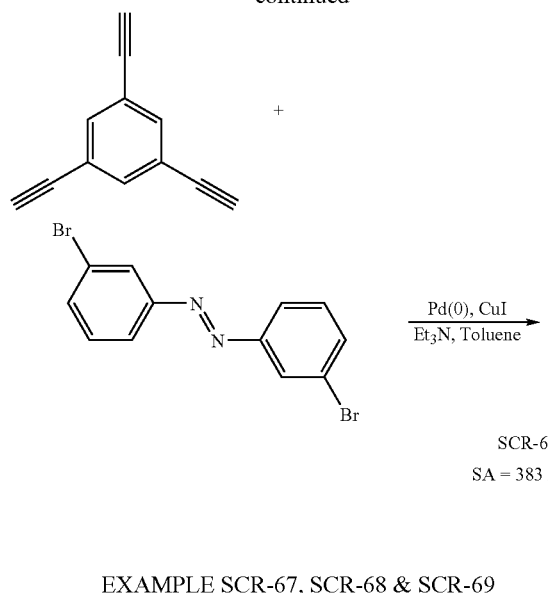
SCR-66
SA = 383 m²/g
EXAMPLE SCR-67, SCR-68 & SCR-69
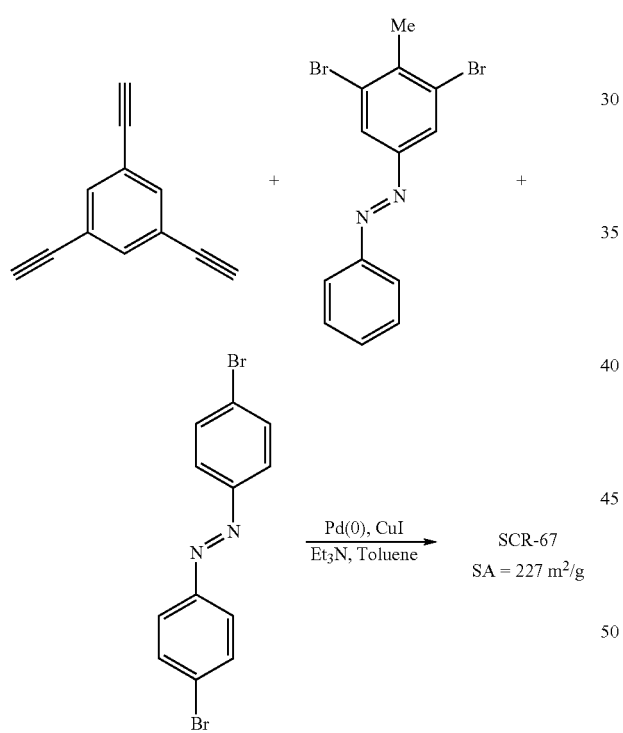
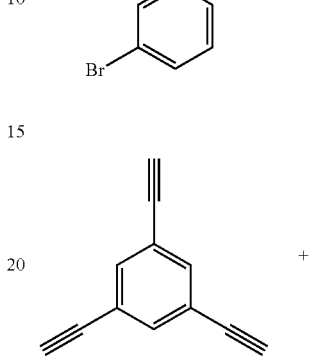
SCR-68
SA = 357 m²/g
SCR-69
SA = 272 m²/g
EXAMPLE SCR-59
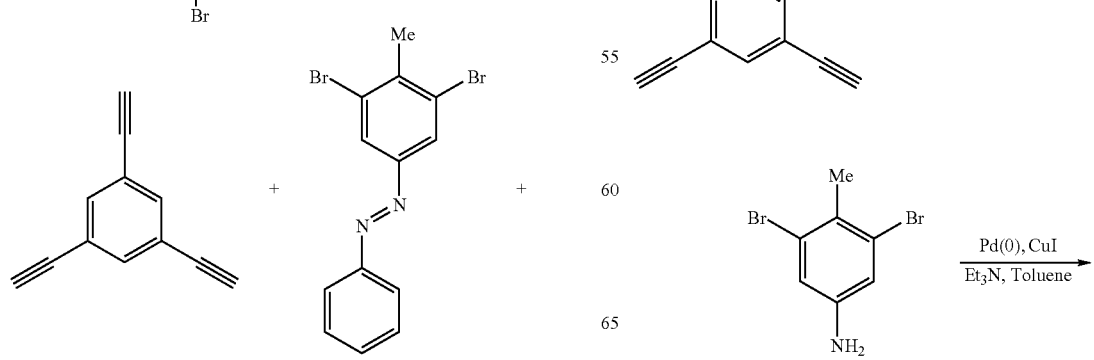

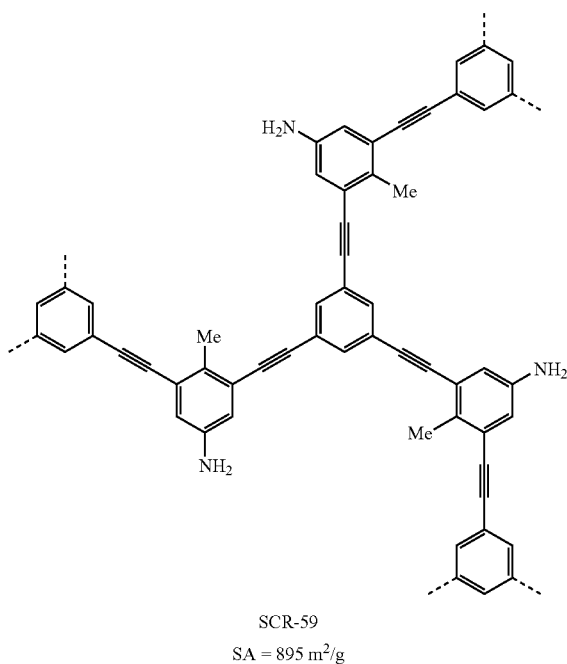

SCR-59
SA = 895 m²/g

EXAMPLES CMP-0 AND CMP-5

CMP-0: 1,3,5-triethynylbenzene (450 mg, 3 mmol), 1,3,5-tris-(4'-iodophenyl)benzene (1368 mg, 2.0 mmol), tetrakis-(triphenylphosphine)palladium(0) (100 mg), and copper(I) iodide (30 mg) were dissolved in the mixture of toluene (2.5 ml) and Et₃N (2.5 ml). The reaction mixture was heated to 80° C., stirred for 72 h under a nitrogen atmosphere in order to rigorously exclude oxygen and to prevent homocoupling of the alkyne monomers. The mixture was cooled to room temperature and the precipitated network polymer was filtered and washed four times with chloroform, water, methanol, and acetone to remove any unreacted monomer or catalyst residues. The further purification of the polymers was carried out by Soxhlet extraction from methanol for 48 h. The product was dried in vacuum for 24 h at 70° C. (Yield: 67.3%). IR (KBr cm⁻¹): 3297.6 (—C≡C—H), 2201.7 (—C≡C—). Elemental combustion analysis (%) Calcd for $C_{36}H_{18}$: C, 95.25, H, 4.75. Found: C, 86.15, H, 4.41. The synthetic route of CMP-0 as follows:

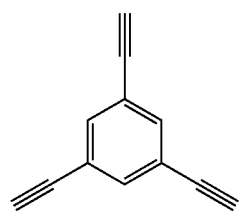

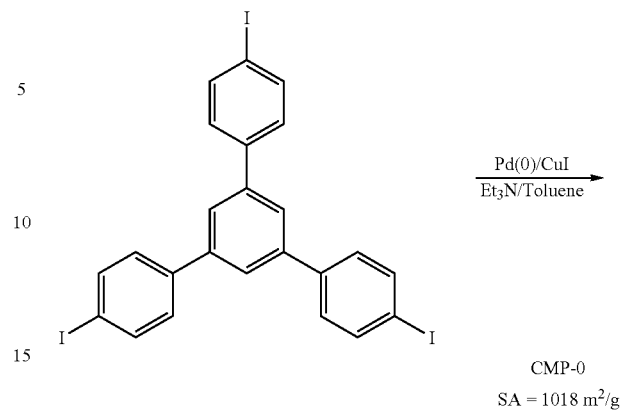

CMP-0
SA = 1018 m²/g

CMP-5: This network was synthesized by the same method as CMP-0. 4,4'-diethynylbiphenyl (454 mg, 2.25 mmol), 1,3,5-tris(4'-iodophenyl)benzene (684 mg, 1.0 mmol), tetrakis-(triphenylphosphine)palladium (100 mg), and copper iodide (25 mg) were employed in this polymerization. (Yield, 65.4%). IR (KBr cm⁻¹): no peak observed from (—C≡C—H), 2207.5 (—C≡C—). Elemental combustion analysis (%) Calcd for $C_{48}H_{27}$: C, 95.52, H, 4.48. Found: C, 87.57, H, 4.52. The synthetic route of CMP-5 as follows:

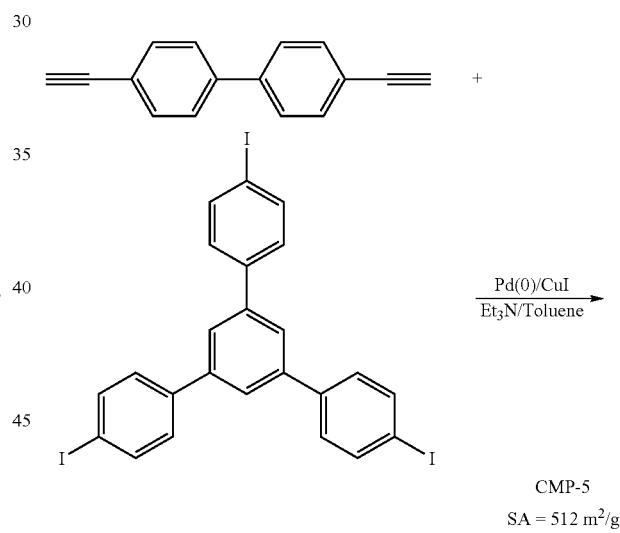

CMP-5
SA = 512 m²/g

EXAMPLES CPN-1 To CPN-6

All of the series of polymer networks were synthesized at a fixed ratio of ethynyl to halogen functionalities of 1.5:1, a fixed total molar concentration of 800 mmol/L, a reaction temperature of 80° C., and a reaction time of 72 h.

CPN-1: 1,3,5-triethynylbenzene (300.3 mg, 2.0 mmol), 1,4-diiodobenzene (659.8 mg, 2.0 mmol), tetrakis-(triphenylphosphine)palladium(0) (100 mg), and copper(I) iodide (30 mg) were dissolved in the mixture of toluene (2.5 ml) and Et₃N (2.5 ml). The reaction mixture was heated to 80° C., stirred for 72 h under a nitrogen atmosphere in order to rigorously exclude oxygen and to prevent homocoupling of the alkyne monomers. The mixture was cooled to room tem perature and the precipitated network polymer was filtered and washed four times with chloroform, water, methanol, and acetone to remove any unreacted monomer or catalyst residues. The further purification of the polymers was carried out by Soxhlet extraction from methanol for 48 h. The product was dried in vacuum for 24 h at 70° C. Yield: 66.9%. Elemental combustion analysis (%) Found: C, 87.24, H, 4.59.

CPN-2: 1,3,5-triethynylbenzene (300.3 mg, 2.0 mmol), 1,4-diiodobenzene (527.8 mg, 1.6 mmol), 4,4'-diiodobiphenyl (162.4 mg, 0.4 mmol), tetrakis-(triphenylphosphine)palladium(0) (100 mg), and copper(I) iodide (30 mg) were used in this case. Yield: 68.4%. Elemental combustion analysis (%) Found: C, 86.46, H, 4.47.

CPN-3: 1,3,5-triethynylbenzene (300.3 mg, 2.0 mmol), 1,4-diiodobenzene (395.8 mg, 1.2 mmol), 4,4'-diiodobiphenyl (324.8 mg, 0.8 mmol), tetrakis-(triphenylphosphine)palladium(0) (100 mg), and copper(I) iodide (30 mg) were used in the polymerization. Yield: 65.8%. Elemental combustion analysis (%) Found: C, 88.73, H, 4.52.

CPN-4: 1,3,5-triethynylbenzene (300.3 mg, 2.0 mmol), 1,4-diiodobenzene (263.9 mg, 0.8 mmol), 4,4'-diiodobiphenyl (487.2 mg, 1.2 mmol), tetrakis-(triphenylphosphine)palladium(0) (100 mg), and copper(I) iodide (30 mg) were used in the polymerization. Yield: 66.8%. Elemental combustion analysis (%) Found: C, 89.24, H, 4.47.

CPN-5: 1,3,5-triethynylbenzene (300.3 mg, 2.0 mmol), 1,4-diiodobenzene (131.9 mg, 0.4 mmol), 4,4'-diiodobiphenyl (649.6 mg, 1.6 mmol), tetrakis-(triphenylphosphine)palladium(0) (100 mg), and copper(I) iodide (30 mg) were used in the polymerization. Yield: 68.8%. Elemental combustion analysis (%) Found: C, 86.36, H, 4.35.

CPN-6: 1,3,5-triethynylbenzene (300.3 mg, 2.0 mmol), 4,4'-diiodobiphenyl (812 mg, 2.0 mmol), tetrakis-(triphenylphosphine)palladium(0) (100 mg), and copper(I) iodide (30 mg) were used in the polymerization. Yield: 67.6%. Elemental combustion analysis (%) Found: C, 86.85, H, 4.51.

The synthetic route of co-polymerization for CPN-1-6 as follows:

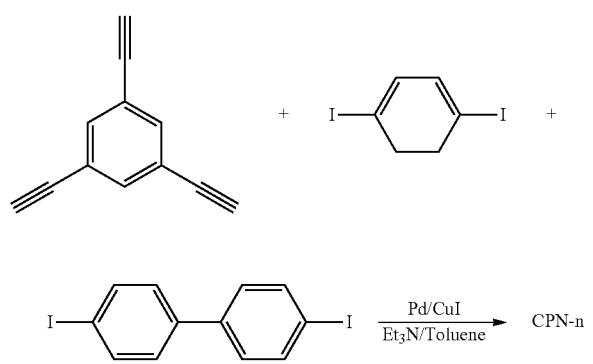

n = 1, 2, 3, 4, 5, 6

EXAMPLES NCMP-0 To NCMP-4

All of the five poly(tris-ethynylphenyl)amine networks were synthesized by using palladium-catalyzed Sonogashira-Hagihara cross-coupling polycondensation of aryl ethynylenes and aryhalides. The five polymer networks were designed to have a three-dimensional net structure arising from the three-pronged aryleneethynylene linkages. The polymerization reactions were carried out at a fixed total molar monomer concentration (625 mmol/L) and a fixed reaction temperature and reaction time (80° C./72 h). The molar ratio of ethynyl to halogen functionalities was set at 1.5:1. Typical experimental procedures for NCMP-0 are given below:

NCMP-0: 1,3,5-triethynylbenzene (450.5 mg, 3 mmol), tris-(4-iodophenyl)amine (1246 mg, 2.0 mmol), tetrakis-(triphenylphosphine)palladium(0) (35 mg, 0.03 mmol), and copper(I) iodide (7 mg, 0.03 mmol) were dissolved in the mixture of toluene (4 ml) and Et$_3$N (4 ml). The reaction mixture was heated to 80° C., stirred for 72 h under a nitrogen atmosphere in order to rigorously exclude oxygen and to prevent homocoupling of the alkyne monomers. The mixture was cooled to room temperature and the precipitated network polymer was filtered, and washed four times with chloroform, water, methanol, and acetone to remove any unreacted monomers or catalyst residues. The further purification of the polymers was carried out by Soxhlet extraction from methanol for 48 h. The product was dried in vacuum for 24 h at 70° C. (Yield: 73.4%). Elemental combustion analysis (%) Calcd for $C_{30}H_{15}N$: C, 92.54; H, 3.86; N, 3.60. Found: C, 86.55; H, 4.08; N, 2.89, 11.21.

NCMP-1: This network was produced from tris-(4-ethynylphenyl)amine (951 mg, 3.0 mmol), 1,3,5-tris-(4-iodophenyl)amine (1246 mg, 2.0 mmol), tetrakis-(triphenylphosphine)palladium (35 mg), and copper iodide (7 mg). (Yield, 75.4%). Calcd for $C_{21}H_{12}N$: C, 90.64; H, 4.32; N, 5.04. Found: C, 87.65; H, 3.89; N, 4.36.

NCMP-2: This network was synthesized from tris-(4-ethynylphenyl)amine (951 mg, 3.0 mmol), 1,3,5-tris(4'-iodophenyl)benzene (1368 mg, 2.0 mmol), tetrakis-(triphenylphosphine)palladium (35 mg), and copper iodide (7 mg). (Yield, 79.5%). Elemental combustion analysis (%) Calcd for $C_{48}H_{27}N$: C, 93.35; H, 4.38; N, 2.27. Found: C, 88.92, H, 3.79, N, 1.98.

NCMP-3: This network was synthesized from tris-(4-ethynylphenyl)amine (634 mg, 2.0 mmol), 1,4-diiodobenzene (660 mg, 2.0 mmol), tetrakis-(triphenylphosphine)palladium (25 mg), and copper iodide (5 mg). (Yield, 75.4%). Elemental combustion analysis (%) Calcd for $C_{33}H_{12}N$: C, 93.84; H, 2.84; N, 3.32. Found: C, 87.65; H, 2.56; N, 2.03.

NCMP-4: tris-(4-ethynylphenyl)amine (634 mg, 2.0 mmol), 4,4'-diiodobiphenyl (812 mg, 2.0 mmol), tetrakis-(triphenylphosphine)palladium (25 mg), and copper iodide (5 mg) were employed in this polymerization. (Yield, 74.5%). Elemental combustion analysis (%) Calcd for $C_{42}H_{24}N$: C, 92.98; H, 4.42; N, 2.58. Found: C, 89.25, H, 3.84, N, 1.95.

The representative molecular structures for networks NCMP-0-4 are as follows.

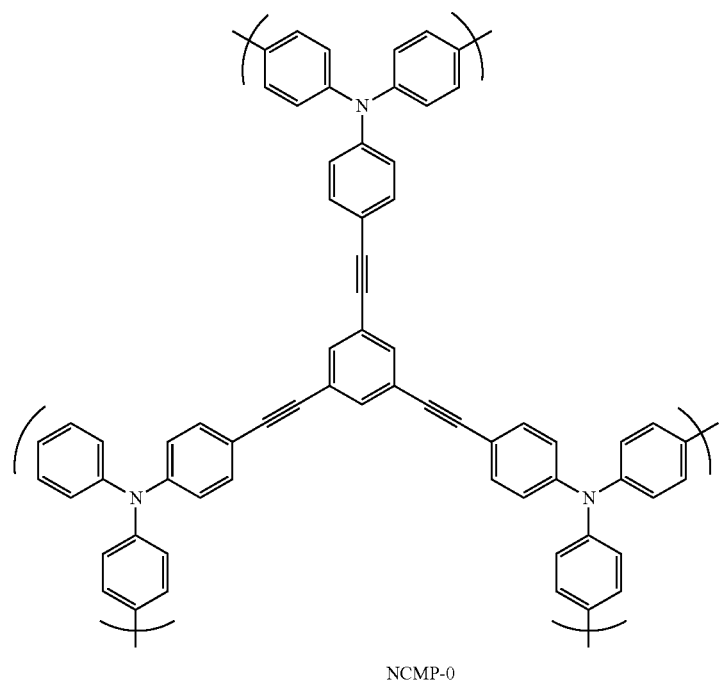
NCMP-0
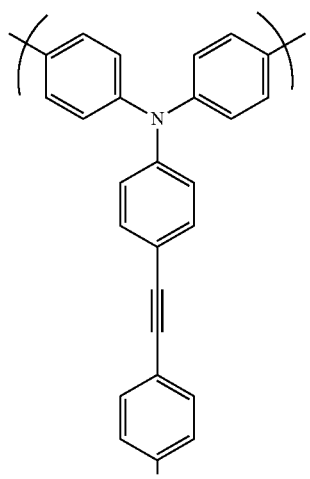
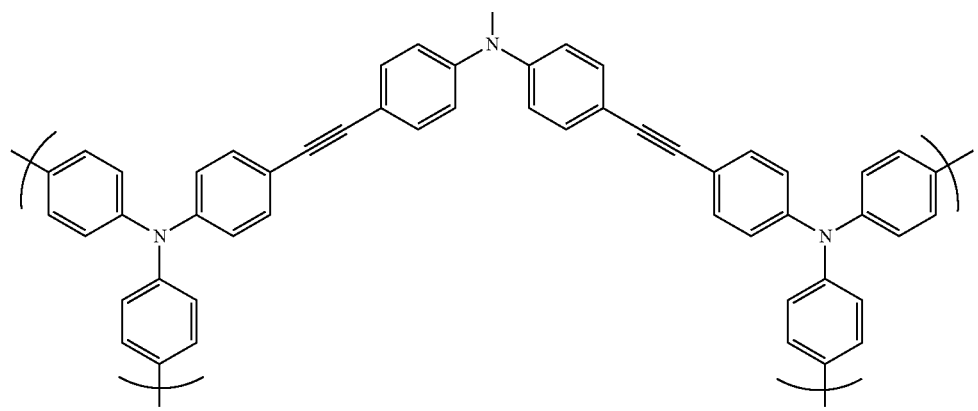
NCMP-1

-continued
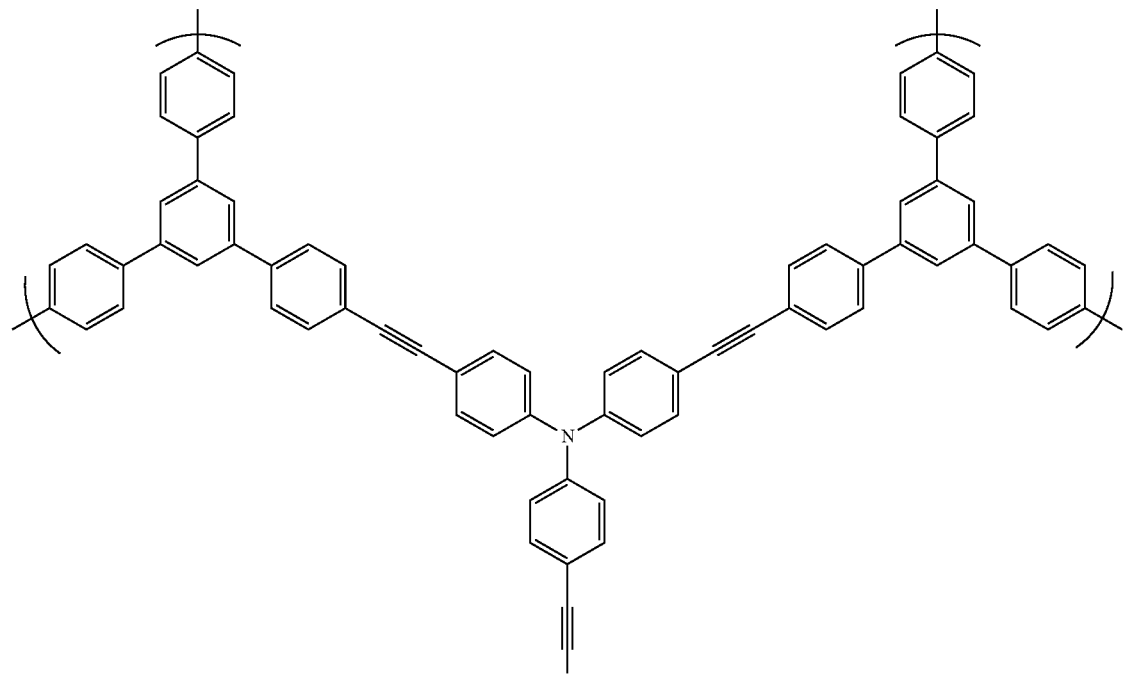
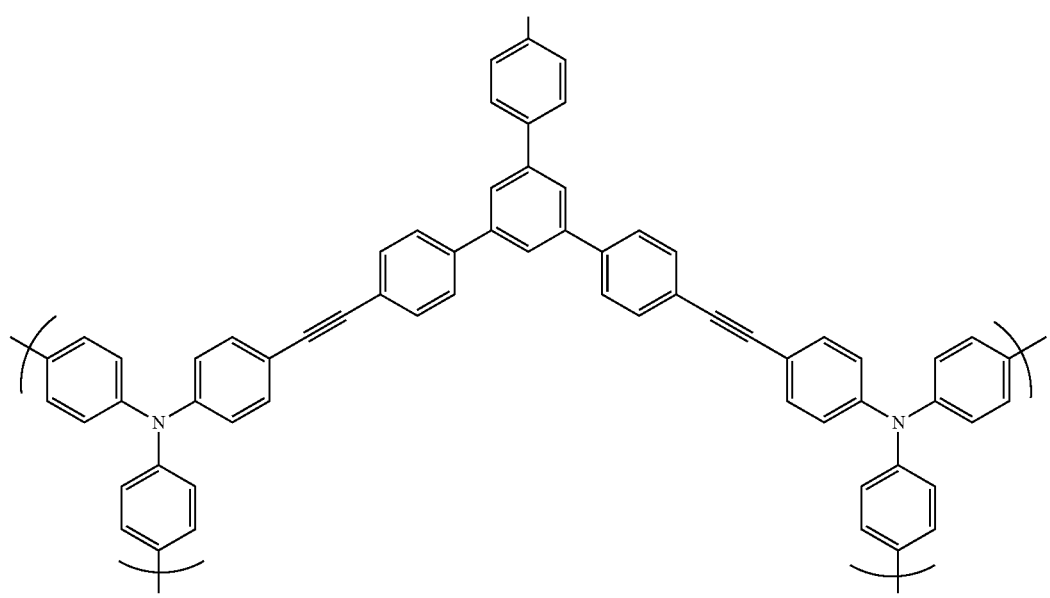
NCMP-2

-continued
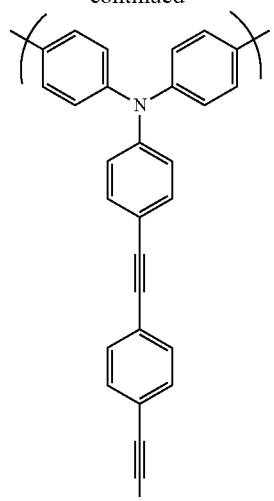
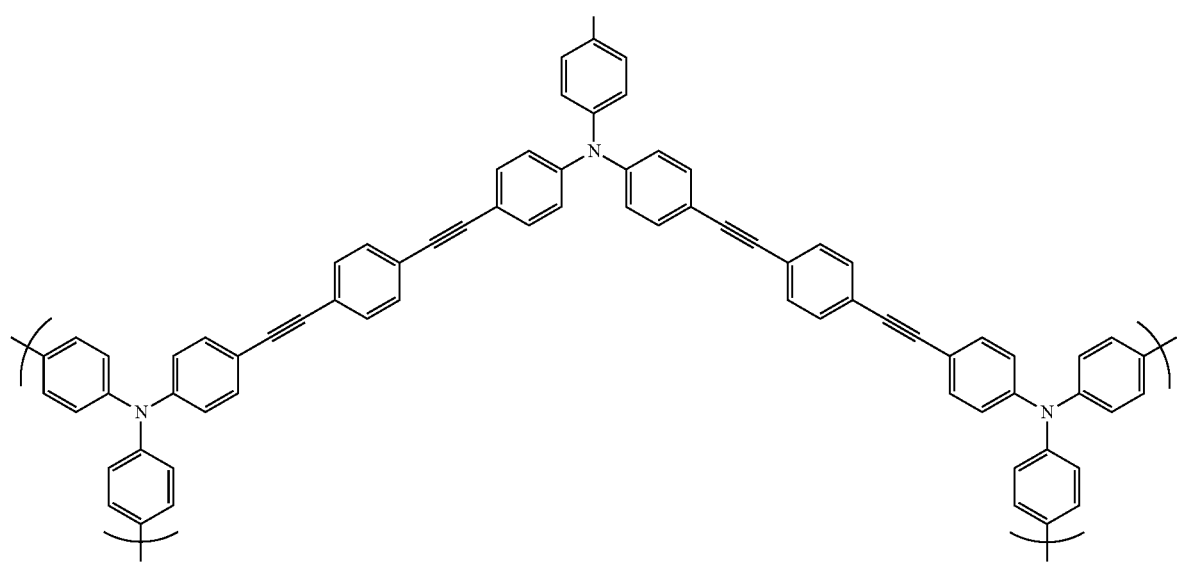
NCMP-3
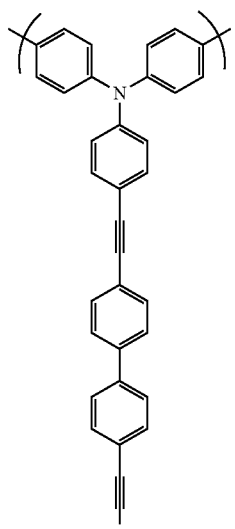

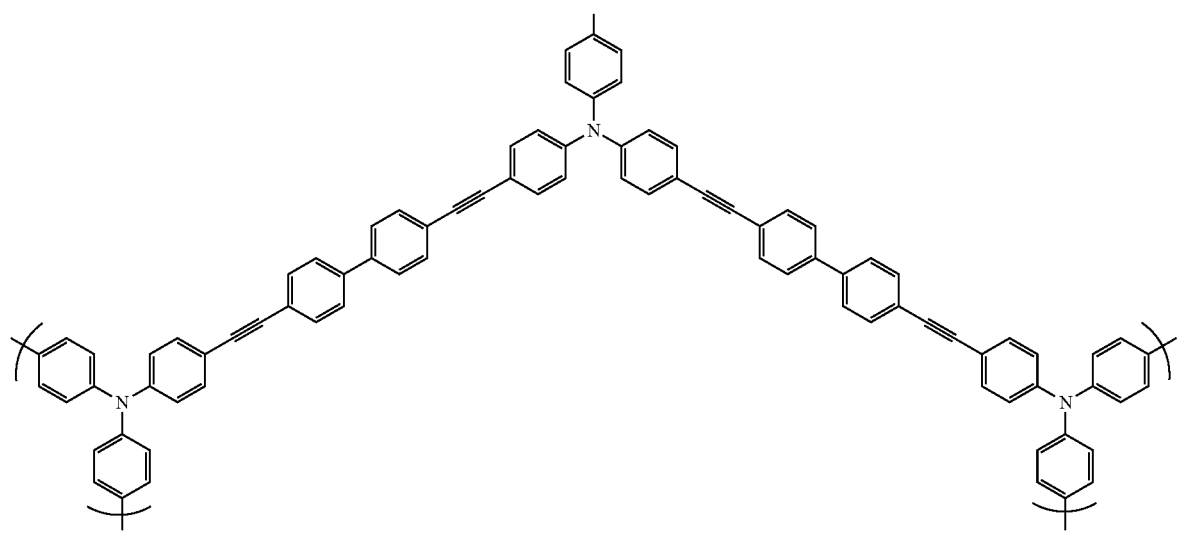

NCMP-4

Ⓢ indicates text missing or illegible when filed

TABLE 2

Halogen starting materials and physical properties for polymer networks CPN-1 to CPN-6[a]

| | I—⟨⟩—I | I—⟨⟩—⟨⟩—I | $S_{BET}$ $(m^2/g)$[b] | $S_{micro}$ $(m^2/g)$[c] | $V_{total}$ $(cm^3/g)$[d] | $V_{micro}$ $(cm^3/g)$[e] | $H_2$ uptake (wt. %)[f] |
|---|---|---|---|---|---|---|---|
| CPN-1 | 100 | 0 | 856 (726) | 665 | 0.53 | 0.32 | 1.14 |
| CPN-2 | 80 | 20 | 775 (710) | 584 | 0.42 | 0.31 | 1.09 |
| CPN-3 | 60 | 40 | 757 (669) | 580 | 0.39 | 0.30 | 1.07 |
| CPN-4 | 40 | 60 | 749 (638) | 576 | 0.40 | 0.29 | 1.04 |
| CPN-5 | 20 | 80 | 722 (575) | 526 | 0.39 | 0.29 | 0.95 |
| CPN-6 | 0 | 100 | 643 (556) | 504 | 0.46 | 0.25 | 0.92 |

[a]All reactions were carried out under the monomer concentration of 400 mmol/L, 80° C./72 h;

[b]Surface area calculated from the $N_2$ adsorption isotherm using the BET method.

Number in parentheses is the Langmuir surface area calculated from the $H_2$ adsorption isotherm by application of the Langmuir equation;

[c]Micropore surface area calculated from the $N_2$ adsorption isotherm using t-plot method;

[d]Total pore volume at $P/P_0 = 0.99$;

[e]The micropore volume derived using the t-plot method based on the Halsey Thickness Equation;

[f]Data were obtained at 1.13 bar and 77.3 K.

TABLE 3

Starting materials and pore structure for polymer networks NCMP-0 to NCMP-4

| polymer | Alkyne monomer | Halogen monomer | $S_{BET}$ [m²/g][a] | $S_{micro}$ [m²/g][b] | $V_{total}$ [cm³/g][c] | $V_{micro}$ [cm³/g][d] |
|---|---|---|---|---|---|---|
| NCMP-0 | 1,3,5-triethynylbenzene | tris(4-iodophenyl)amine | 1108 | 825 | 0.60 | 0.51 |
| NCMP-1 | tris(4-ethynylphenyl)amine | tris(4-iodophenyl)amine | 968 | 648 | 0.56 | 0.41 |
| NCMP-2 | tris(4-ethynylphenyl)amine | 1,3,5-tris(4-iodophenyl)benzene | 900 | 586 | 0.55 | 0.32 |
| NCMP-3 | tris(4-ethynylphenyl)amine | 1,4-diiodobenzene | 866 | 559 | 0.50 | 0.31 |

TABLE 3-continued

Starting materials and pore structure for polymer networks NCMP-0 to NCMP-4

| polymer | Alkyne monomer | Halogen monomer | $S_{BET}$ $[m^2/g]^{[a]}$ | $S_{micro}$ $[m^2/g]^{[b]}$ | $V_{total}$ $[cm^3/g]^{[c]}$ | $V_{micro}$ $[cm^3/g]^{[d]}$ |
|---|---|---|---|---|---|---|
| NCMP-4 | | | 546 | 327 | 0.35 | 0.20 |

[a]Surface area calculated from the N$_2$ adsorption isotherm using the BET method.
[b]Micropore surface area calculated from the N$_2$ adsorption isotherm using t-plot method.
[c]Total pore volume at P/P$_0$ = 0.99.
[d]The micropore volume derived using the t-plot method based on the Halsey Thickness Equation.

EXAMPLE SCR-70 To SCR-83

To a radleys reaction tube was weighed 1,3,5-triethynylbenzene (75 mg, 0.5 mmol), Copper I iodide (3 mg), palladium tetrakis(triphenylphosphine) (10 mg), dibromo monomer (0.5 mmol), anhydrous toluene (1.5 mL) and triethylamine (1.5 mL). The reaction tubes were heated to 80° C. for 3 days, after which the resulting solid product was washed with CHCl$_3$ and methanol.

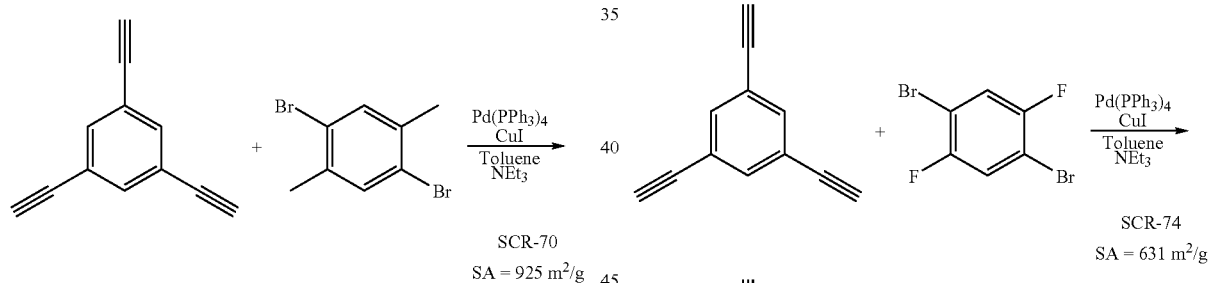

SCR-70
SA = 925 m$^2$/g

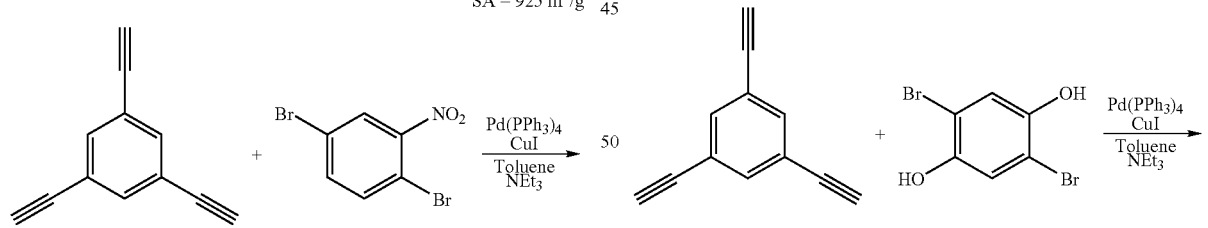

SCR-71
SA = 45 m$^2$/g

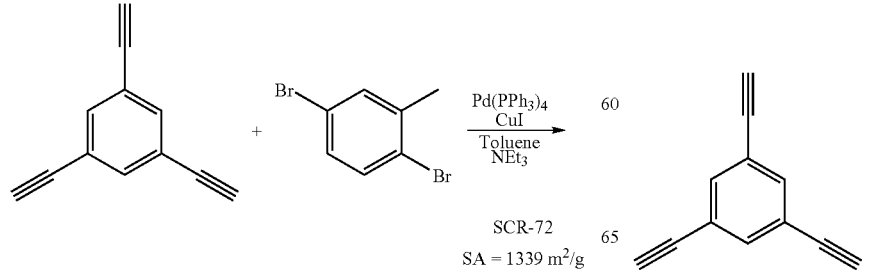

SCR-72
SA = 1339 m$^2$/g

-continued

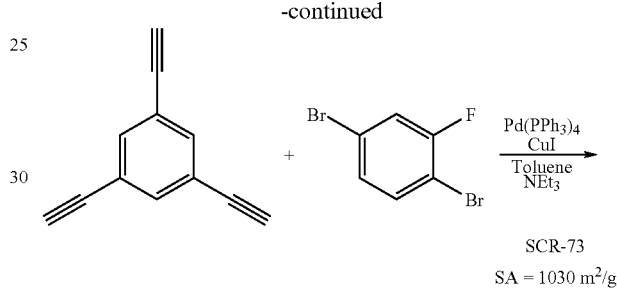

SCR-73
SA = 1030 m$^2$/g

SCR-74
SA = 631 m$^2$/g

SCR-75
SA = 603 m$^2$/g

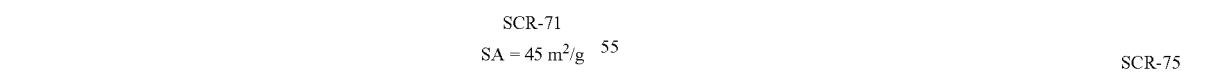

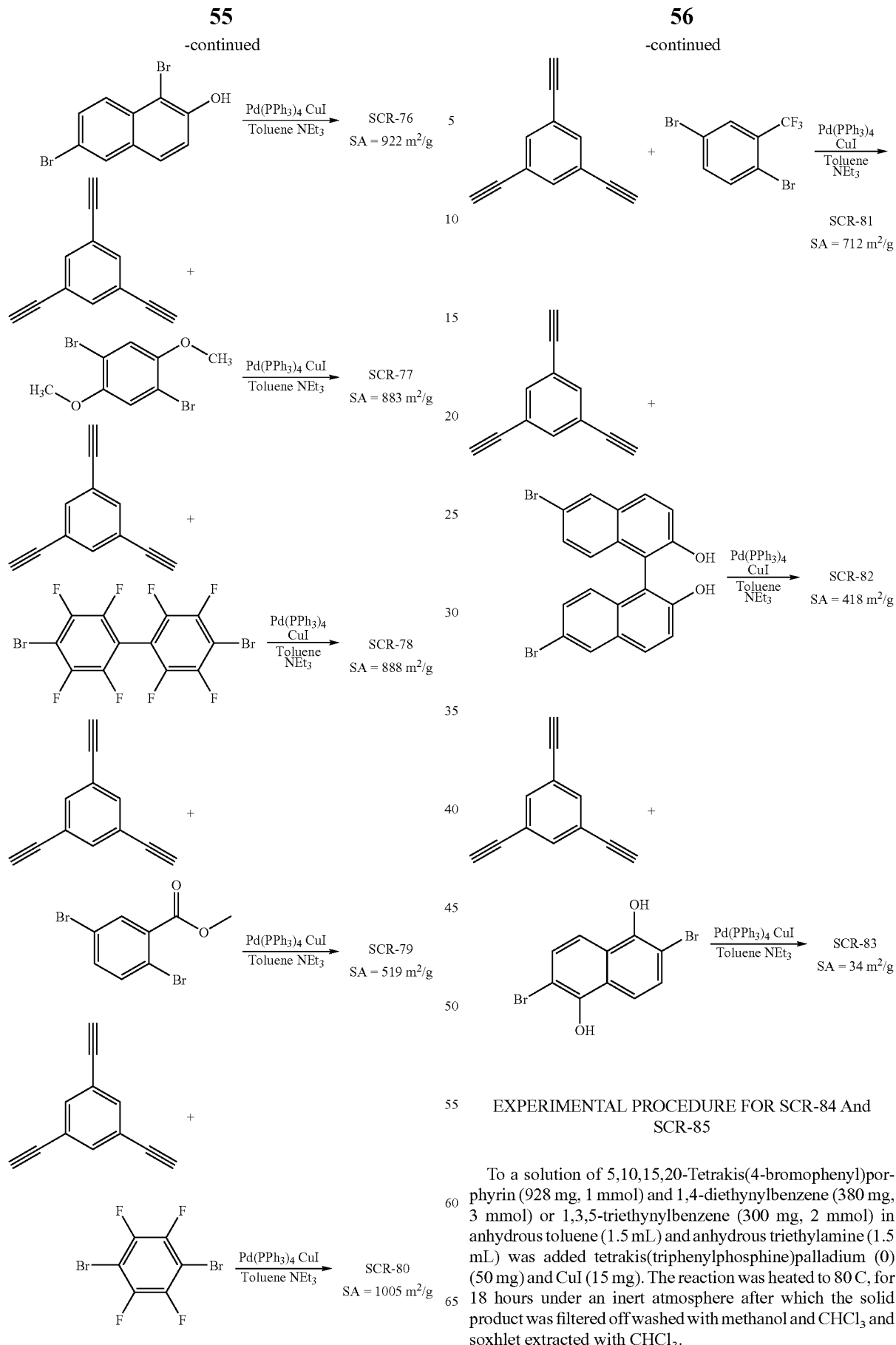

EXPERIMENTAL PROCEDURE FOR SCR-84 And SCR-85

To a solution of 5,10,15,20-Tetrakis(4-bromophenyl)porphyrin (928 mg, 1 mmol) and 1,4-diethynylbenzene (380 mg, 3 mmol) or 1,3,5-triethynylbenzene (300 mg, 2 mmol) in anhydrous toluene (1.5 mL) and anhydrous triethylamine (1.5 mL) was added tetrakis(triphenylphosphine)palladium (0) (50 mg) and CuI (15 mg). The reaction was heated to 80 C, for 18 hours under an inert atmosphere after which the solid product was filtered off washed with methanol and CHCl₃ and soxhlet extracted with CHCl₃.

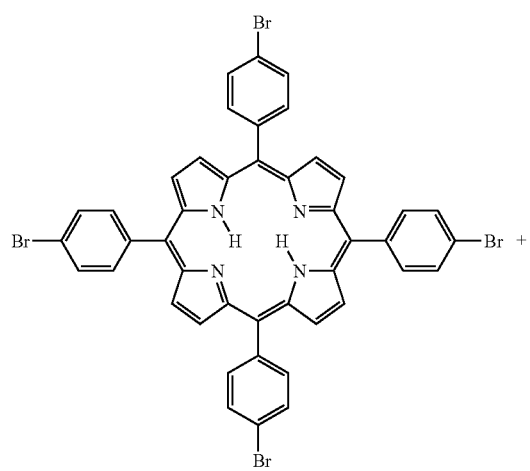

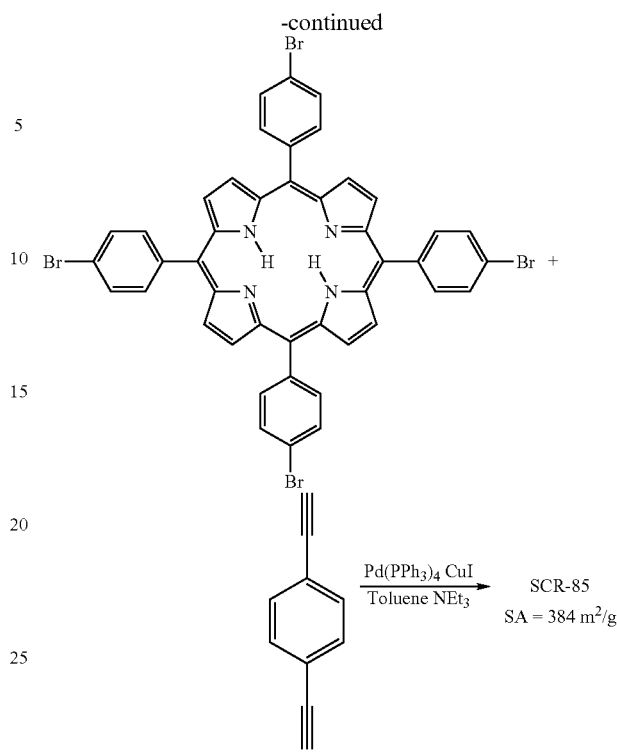

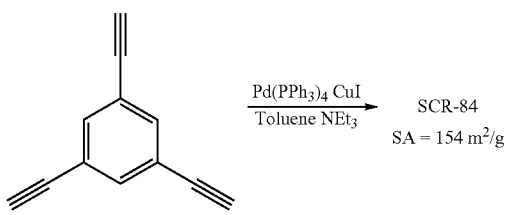

COMPARATIVE EXAMPLE PD-1

A polymer ("PD-1") was prepared using Pd(II) catalysis in place of Pd(0) catalysis. PD-1 had a higher residual halogen content and a lower surface area than polymers in accordance with the present invention. The reaction conditions for the preparation of comparative example PD-1, as well as a polymer in accordance with the present invention (CMP-1A), are summarized in the following table:

| Polymer | Ethynyl monomer | Halogen monomer | Mass concentration (w/v, %) |
|---------|-----------------|-----------------|------------------------------|
| CMP-1A  |                 |                 | 15 |
| PD-1    |                 |                 | 15 |

| Polymer | Catalyst/Co-catalyst | Ratio of catalyst | Solvent/Ratio | T (°C.) | Time (h) |
|---------|----------------------|-------------------|---------------|---------|----------|
| CMP-1A  | Pd(0)/CuI            | Pd(0) 2 mol % CuI 4 mol % | Et$_3$N/toluene (1:1) | 80 | 24 |
| PD-1    | PD(II)/CuI, PPh$_3$  | Pd(II) 0.05 mol % CuI 1.1 mol % PPh$_3$ 1.5 mol % | Et$_3$N/pyridine (1.5:1) | 90 | 16 |

The procedure in D. L. Trumbo, C. S. Marvel, *J. Polym. Sci., A, Polym. Chem.* 1986, 24, 2311 ("Trumbo") was used for the preparation of PD-1. Trumbo did not specify the concentration of monomers; a concentration of 15% was chosen because this concentration was used in the preparation of CMP-1A. Furthermore Trumbo did not specify the ratio of catalyst in the preparation of PD-1 and accordingly the values for CuI (1.1 mol %), $PPh_3$ (1.5 mol %) and Pd(II) (0.05 mol %) were chosen based on the procedures specified elsewhere in Trumbo, namely the first paragraph of page 2315 and the last paragraph of page 2316.

The BET surface area and elemental analysis results of PD-1 (comparative example) and CMP-1A (an example according to the present invention) were as follows:

| Polymer | BET surface area/$m^2$/g | C/% | H/% | N/% | Br/% | I/% |
|---|---|---|---|---|---|---|
| PD-1 | 393 | 79.07 | 3.23 | 0 | 14.77 | — |
| CMP-1A | 793 | 86.39 | 3.65 | <0.3 | — | 2.73 |

The invention claimed is:

1. A conjugated microporous polymer comprising:

nodes comprising at least one aryl unit; and struts comprising at least one alkyne unit and at least one aryl unit;

wherein a node is bonded from its aryl unit or units to at least two struts via alkyne units;

wherein the conjugated microporous polymer has a halogen content of not more than 10% by mass, a microporosity, and a surface area of at least 34 $m^2$/g; and wherein:

the nodes are selected from the group consisting of:

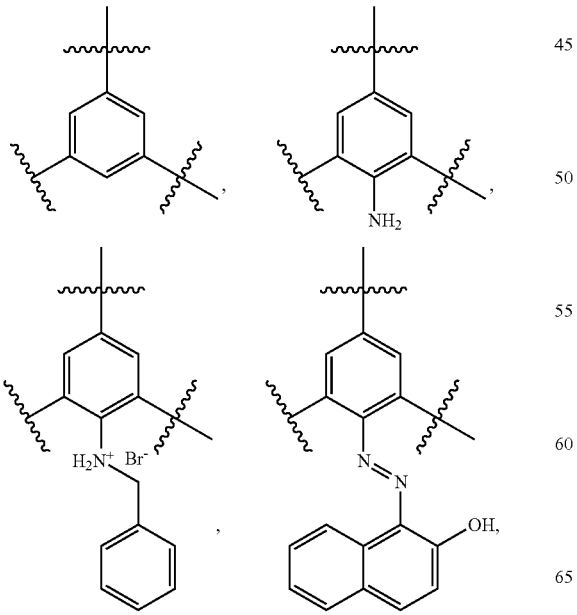

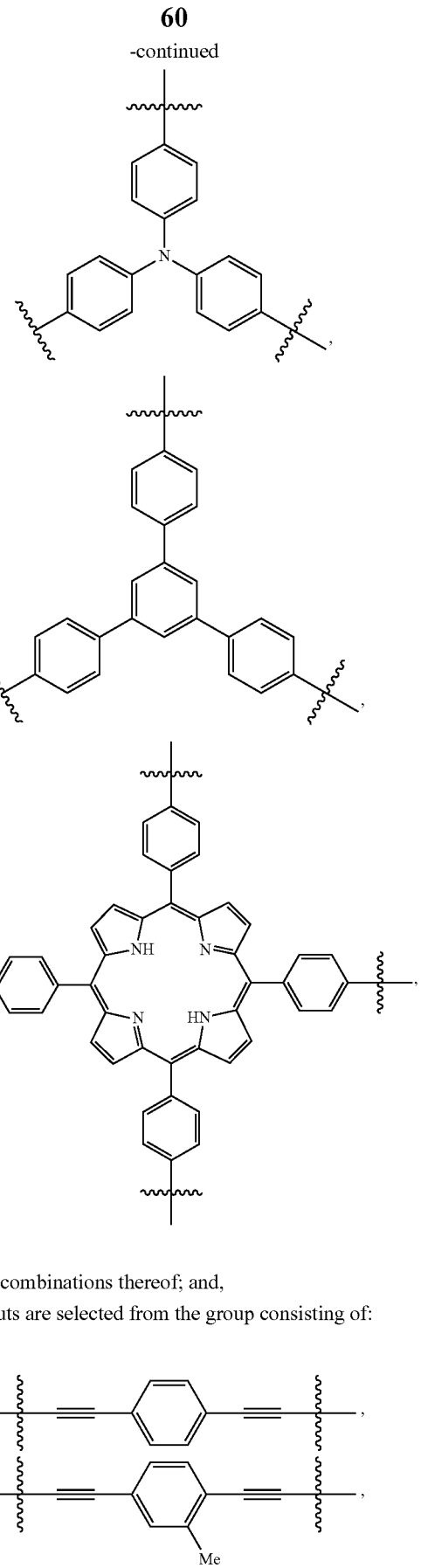

and combinations thereof; and, the struts are selected from the group consisting of:

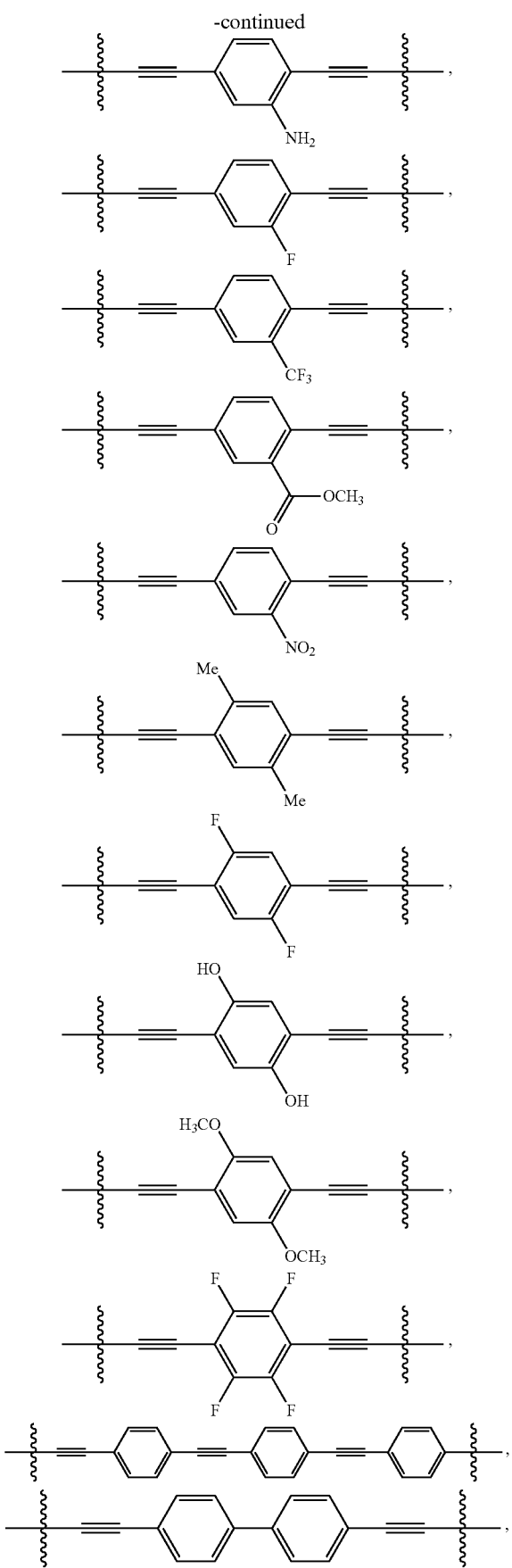
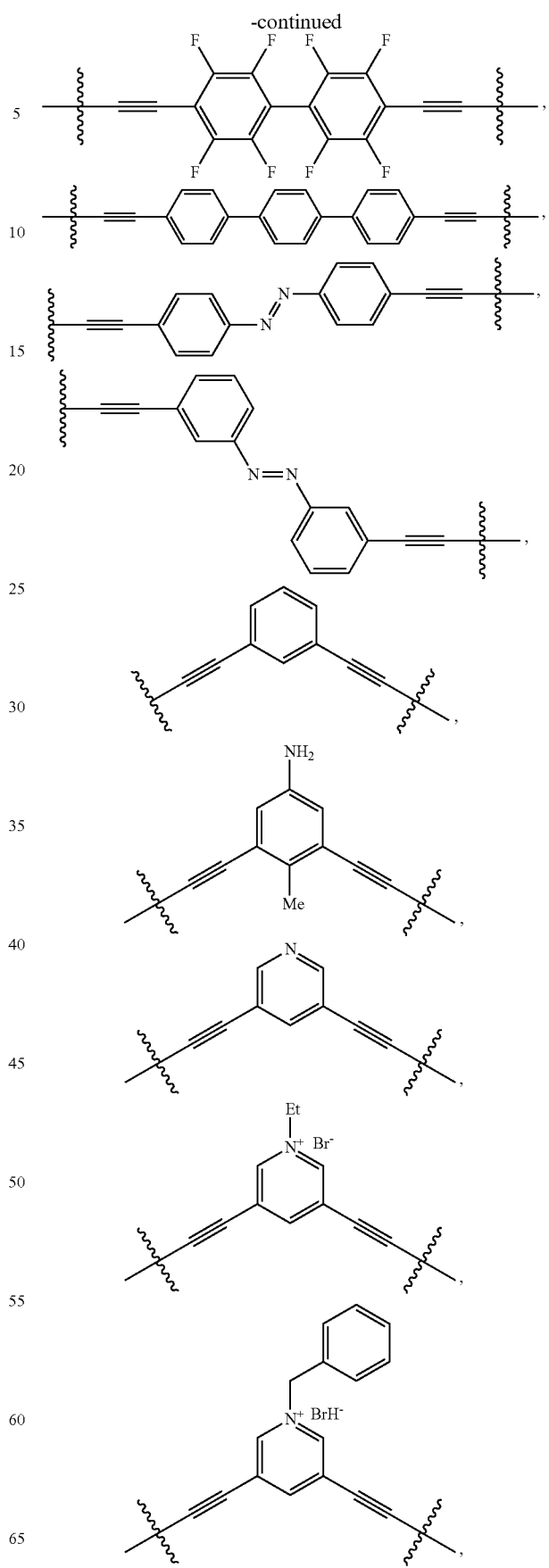

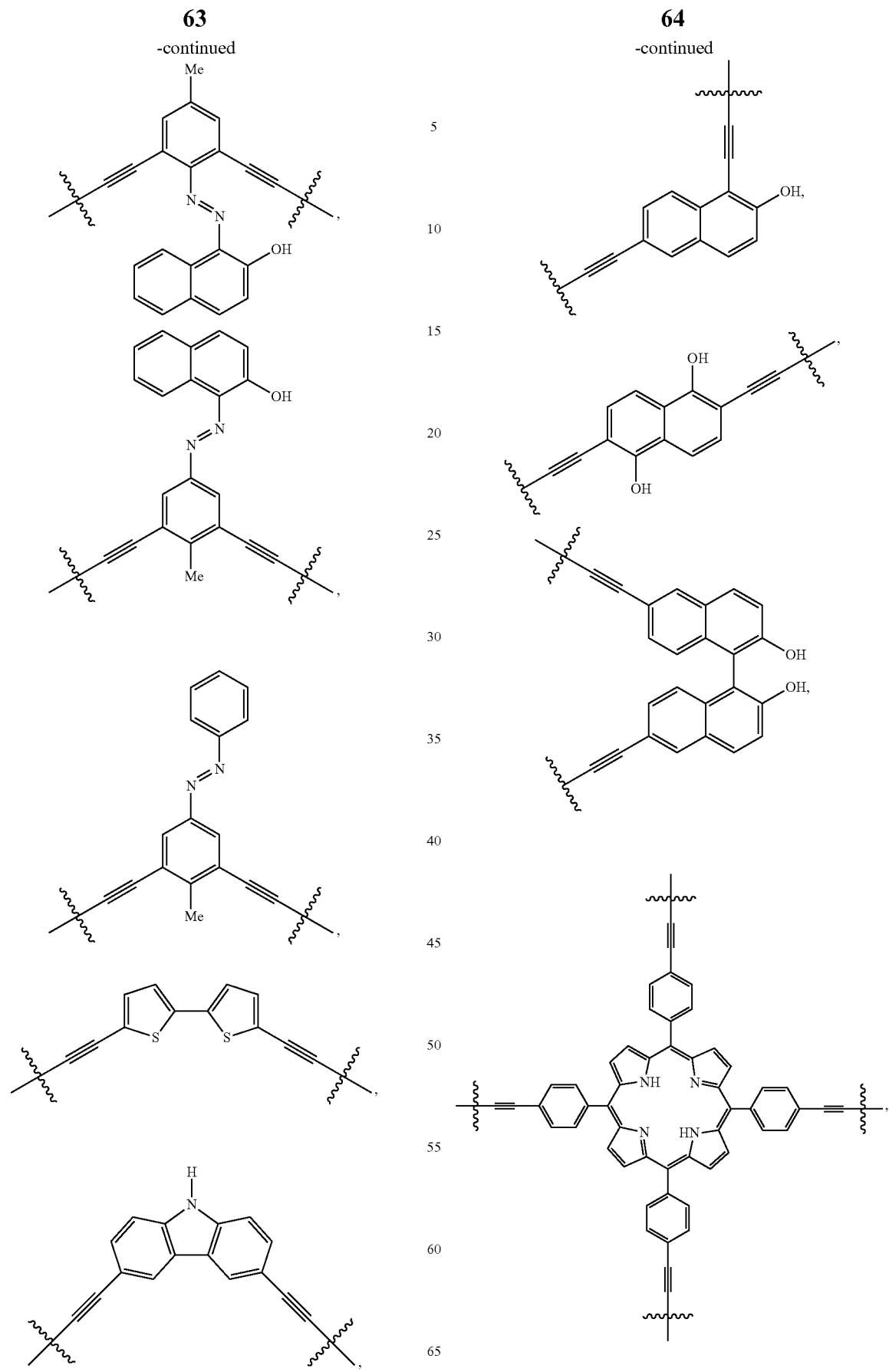
and combinations thereof.

2. A conjugated microporous polymer comprising:

nodes comprising at least one aryl unit; and struts comprising at least one alkyne unit and at least one aryl unit;

wherein a node is bonded from its aryl unit or units to at least two struts via alkyne units;

wherein the conjugated microporous polymer is microporous, having a BET surface area of at least 400 m$^2$/g;

and wherein the nodes are selected from the group consisting of:

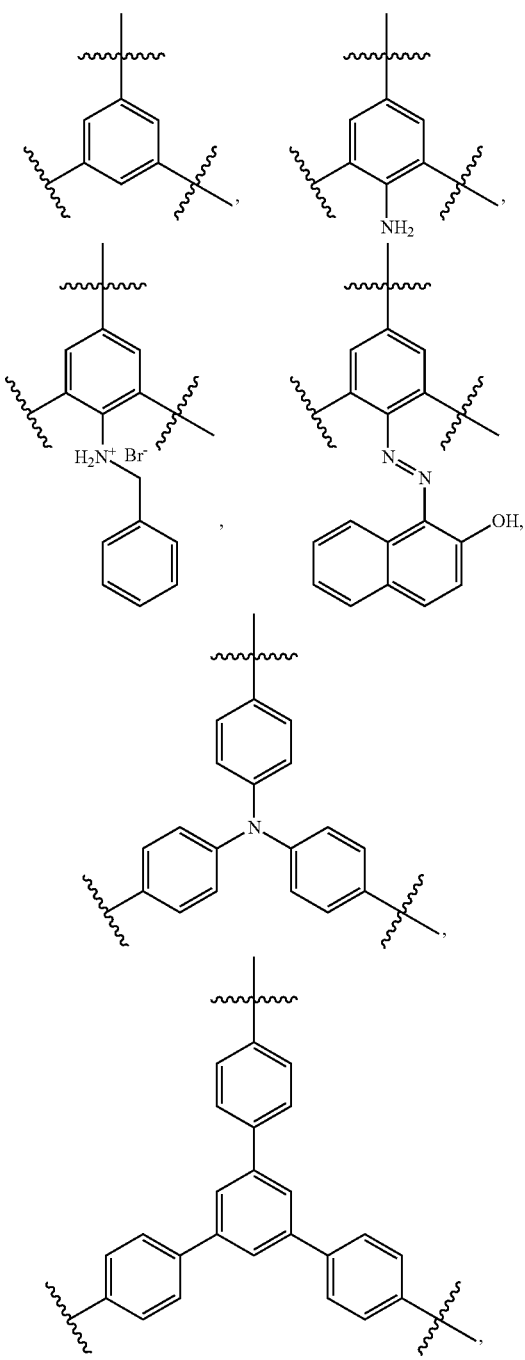

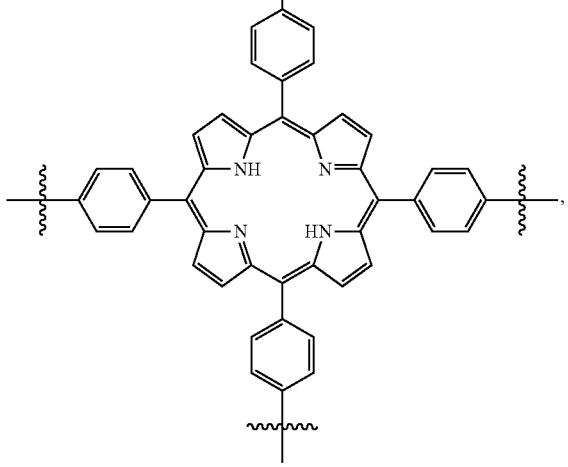

and combinations thereof; and, the struts are selected from the group consisting of:

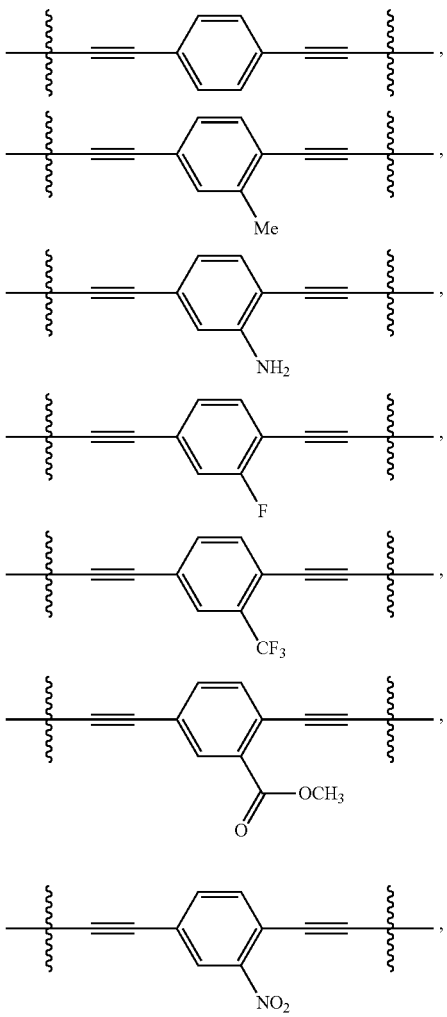

-continued
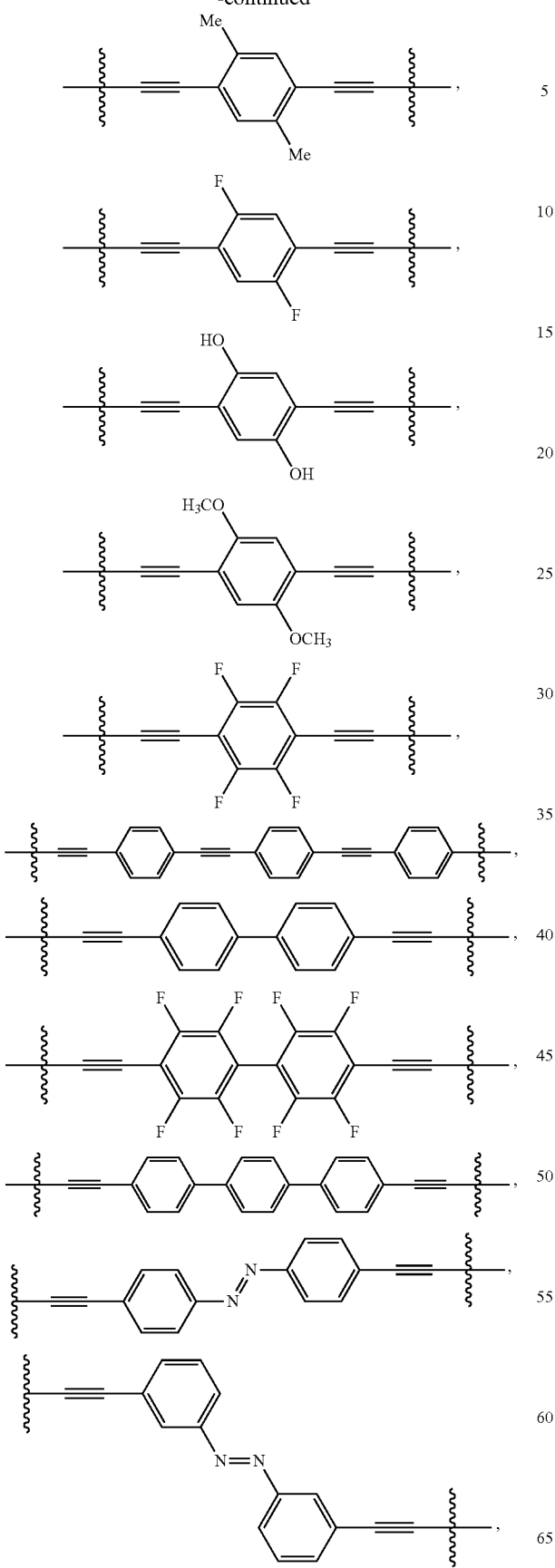
-continued
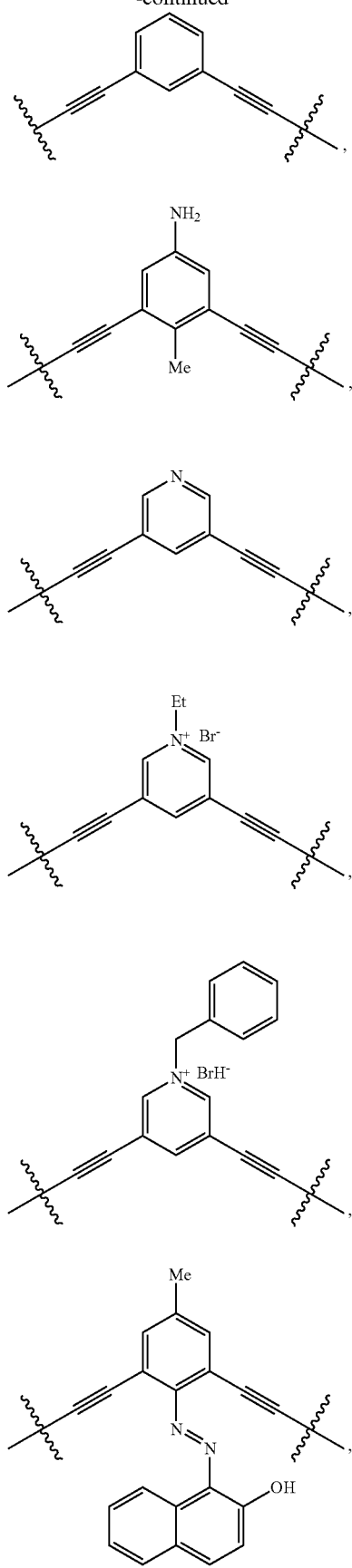

69
-continued
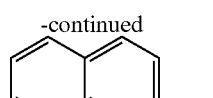
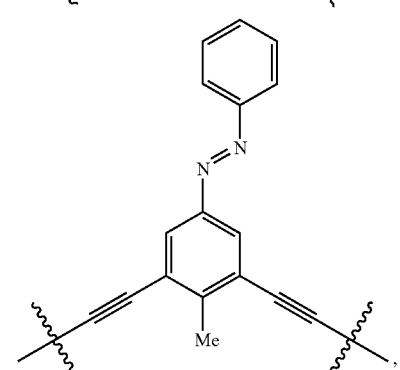
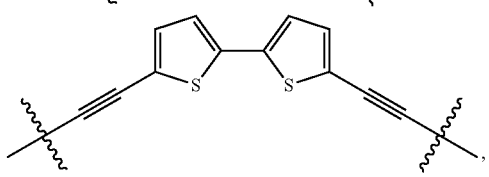
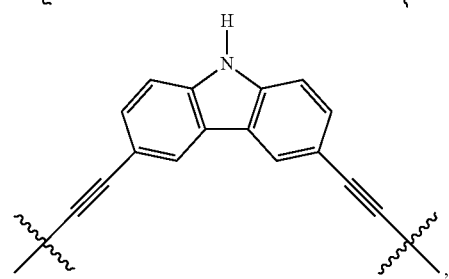
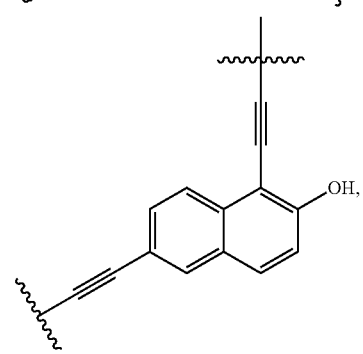
70
-continued
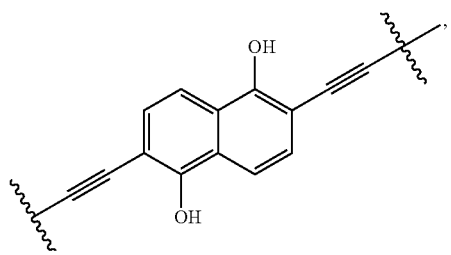
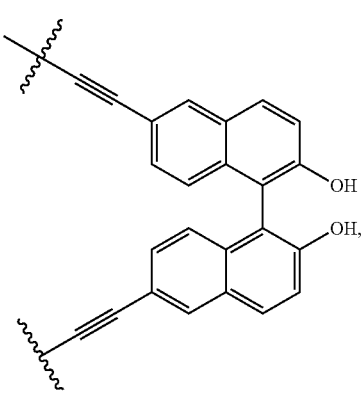
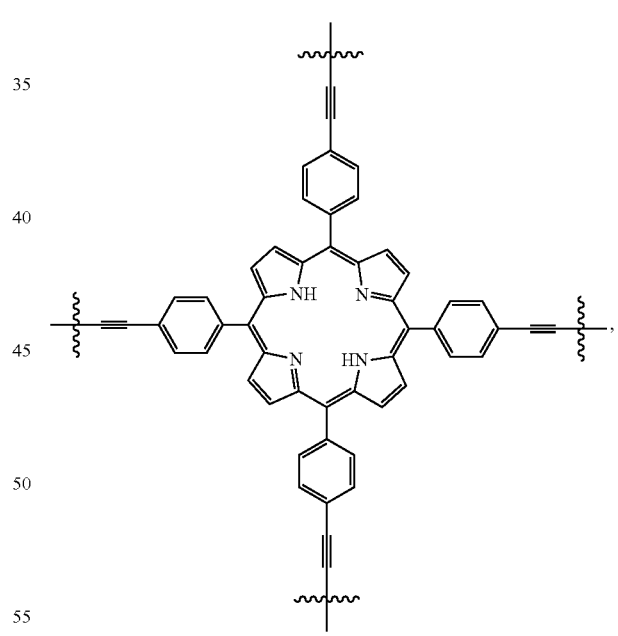
and combinations thereof.
* * * * *